US00RE43082E

(19) United States
(12) Reissued Patent
Gutowitz

(10) Patent Number: US RE43,082 E
(45) Date of Reissued Patent: Jan. 10, 2012

(54) TOUCH-TYPABLE DEVICES BASED ON AMBIGUOUS CODES AND METHODS TO DESIGN SUCH DEVICES

(75) Inventor: Howard A. Gutowitz, New York, NY (US)

(73) Assignee: Eatoni Ergonomics, Inc., New York, NY (US)

(21) Appl. No.: 11/796,720

(22) Filed: Apr. 26, 2007

Related U.S. Patent Documents

Reissue of:
(64) Patent No.: 6,885,317
Issued: Apr. 26, 2005
Appl. No.: 09/856,863
PCT Filed: Dec. 9, 1999
PCT No.: PCT/US99/29343
§ 371 (c)(1),
(2), (4) Date: May 24, 2001
PCT Pub. No.: WO00/35091
PCT Pub. Date: Jun. 15, 2000

U.S. Applications:
(60) Provisional application No. 60/111,665, filed on Dec. 10, 1998.

(51) Int. Cl.
*H03K 17/94* (2006.01)
*H03M 11/00* (2006.01)

(52) U.S. Cl. ..... 341/22; 341/20; 704/1; 704/9; 704/10; 704/251; 715/811

(58) Field of Classification Search ..... 341/20, 341/22; 704/1, 9, 10, 251; 715/811
See application file for complete search history.

(56) References Cited

U.S. PATENT DOCUMENTS 3,833,765 A 9/1974 Hilborn et al.
3,929,216 A 12/1975 Einbinder
4,042,777 A 8/1977 Bequaert et al.
4,058,795 A 11/1977 Balm
4,360,892 A 11/1982 Endfield
4,447,692 A 5/1984 Mierzwinski
4,475,013 A 10/1984 Lee et al.
4,522,518 A 6/1985 Schmidt
4,555,193 A 11/1985 Stone
4,608,457 A 8/1986 Fowler et al.
4,615,629 A 10/1986 Power
4,650,349 A 3/1987 Westreich
4,650,927 A 3/1987 James
4,674,112 A 6/1987 Kondraske et al.
4,677,659 A 6/1987 Dargan (Continued)

FOREIGN PATENT DOCUMENTS

AU 2005325740 B2 8/2006

(Continued)

OTHER PUBLICATIONS

ARB-2007Demand—2007 Demand for Arbitration before JAMS, 8 Pages.

(Continued)

*Primary Examiner* — Timothy Edwards, Jr.

(57) ABSTRACT

The design of typable devices, in particular, touch-typable devices embodying ambiguous codes, presents numerous ergonomic problems. Solutions for these problems are herein disclosed. This invention teaches methods for the selection of ambiguous codes from the classes of strongly-touch-typable ambiguous codes and substantially optimal ambiguous codes for touch-typable devices such as computers, telephones, pagers, personal digital assistants, smart cards, television set-top devices and other information appliances, given design constraints such as the size, shape, and computational capacity of the device, the typical uses of the device, and conventional constraints such as respect of alphabetic ordering or Qwerty ordering.

120 Claims, 54 Drawing Sheets

U.S. PATENT DOCUMENTS

| | | | | |
|---|---|---|---|---|
| 4,679,951 | A | | 7/1987 | King et al. |
| 4,680,572 | A | | 7/1987 | Meguire |
| 4,680,728 | A | | 7/1987 | David, II et al. |
| 4,715,736 | A | | 12/1987 | McGunnigle |
| 4,737,980 | A | | 4/1988 | Curtin et al. |
| 4,754,474 | A | | 6/1988 | Feinson |
| 4,775,255 | A | | 10/1988 | Langley |
| 4,791,556 | A | | 12/1988 | Vilkaitis |
| 4,817,129 | A | | 3/1989 | Riskin |
| 4,836,700 | A | | 6/1989 | Jensen |
| 4,866,759 | A | | 9/1989 | Riskin |
| 4,868,750 | A | | 9/1989 | Kucera et al. |
| 4,891,777 | A | | 1/1990 | Lapeyre |
| 5,003,503 | A | | 3/1991 | Lapeyre |
| 5,031,206 | A | | 7/1991 | Riskin |
| 5,040,479 | A | | 8/1991 | Thrash |
| 5,087,910 | A | | 2/1992 | Guyot-sionnest |
| 5,098,476 | A | | 3/1992 | Baker et al. |
| 5,121,472 | A | | 6/1992 | Danish et al. |
| 5,128,672 | A | | 7/1992 | Kaehler |
| 5,175,803 | A | | 12/1992 | Yeh |
| 5,200,988 | A | | 4/1993 | Riskin |
| 5,210,689 | A | | 5/1993 | Baker et al. |
| 5,255,310 | A | | 10/1993 | Kim et al. |
| 5,288,158 | A | | 2/1994 | Matias |
| 5,297,041 | A | | 3/1994 | Kushler et al. |
| 5,305,238 | A | | 4/1994 | Starr et al. |
| 5,332,322 | A | | 7/1994 | Gambaro |
| 5,339,358 | A | | 8/1994 | Danish et al. |
| 5,367,298 | A | | 11/1994 | Axthelm |
| 5,392,338 | A | | 2/1995 | Danish et al. |
| D357,011 | S | | 4/1995 | Paull et al. |
| D357,476 | S | | 4/1995 | Paull et al. |
| 5,410,333 | A | | 4/1995 | Conway |
| 5,432,510 | A | | 7/1995 | Matthews |
| D362,432 | S | | 9/1995 | Paull et al. |
| 5,458,425 | A | | 10/1995 | Torok |
| 5,469,160 | A | | 11/1995 | Yang et al. |
| 5,473,346 | A | | 12/1995 | Pollack |
| 5,479,536 | A | | 12/1995 | Comerford |
| 5,487,616 | A | | 1/1996 | Ichbiah |
| 5,497,151 | A | | 3/1996 | Dombroski |
| 5,507,021 | A | | 4/1996 | Siegle |
| 5,515,305 | A | | 5/1996 | Register et al. |
| 5,535,119 | A | | 7/1996 | Ito et al. |
| 5,535,421 | A | | 7/1996 | Weinreich |
| 5,543,818 | A | | 8/1996 | Scott |
| 5,548,634 | A | | 8/1996 | Gahang et al. |
| 5,559,512 | A | | 9/1996 | Jainski et al. |
| 5,574,482 | A | | 11/1996 | Niemeier |
| 5,575,576 | A | | 11/1996 | Roysden |
| 5,581,243 | A | | 12/1996 | Ouellette et al. |
| 5,625,354 | A | | 4/1997 | Lerman |
| 5,627,566 | A | | 5/1997 | Litschel |
| 5,642,522 | A | | 6/1997 | Zaenen et al. |
| 5,661,476 | A | | 8/1997 | Wang et al. |
| 5,661,505 | A | | 8/1997 | Livits |
| 5,661,605 | A | | 8/1997 | Conway |
| 5,664,896 | A | | 9/1997 | Blumberg |
| 5,675,329 | A | | 10/1997 | Barker et al. |
| 5,675,819 | A | | 10/1997 | Schuetze |
| 5,724,449 | A | | 3/1998 | Comerford |
| 5,724,457 | A | | 3/1998 | Fukushima |
| 5,734,749 | A | | 3/1998 | Yamada et al. |
| 5,736,976 | A | * | 4/1998 | Cheung ..... 345/168 |
| 5,745,056 | A | | 4/1998 | Takahashi et al. |
| 5,748,177 | A | | 5/1998 | Baker et al. |
| 5,748,512 | A | | 5/1998 | Vargas |
| 5,790,103 | A | | 8/1998 | Willner |
| 5,793,312 | A | | 8/1998 | Tsubai |
| 5,797,098 | A | | 8/1998 | Schroeder et al. |
| 5,809,415 | A | | 9/1998 | Rossmann |
| 5,818,437 | A | | 10/1998 | Grover et al. |
| 5,828,991 | A | | 10/1998 | Skiena |
| 5,847,697 | A | | 12/1998 | Sugimoto |
| 5,859,599 | A | | 1/1999 | Shiga |
| 5,861,821 | A | | 1/1999 | Kato et al. |
| 5,880,685 | A | | 3/1999 | Weeks |
| 5,896,321 | A | | 4/1999 | Miller et al. |
| 5,903,630 | A | | 5/1999 | Collins |
| 5,911,485 | A | | 6/1999 | Rossmann |
| 5,917,905 | A | | 6/1999 | Whipple et al. |
| 5,936,555 | A | | 8/1999 | Zagnoev |
| 5,936,557 | A | | 8/1999 | Liddle |
| 5,945,928 | A | | 8/1999 | Kushler et al. |
| 5,950,809 | A | | 9/1999 | Andre |
| 5,952,942 | A | | 9/1999 | Balakrishnan et al. |
| 5,953,541 | A | | 9/1999 | King et al. |
| 5,959,629 | A | | 9/1999 | Masui |
| 5,960,385 | A | * | 9/1999 | Skiena et al. ..... 704/9 |
| 5,963,671 | A | | 10/1999 | Comerford et al. |
| 5,982,303 | A | | 11/1999 | Smith |
| 5,982,351 | A | | 11/1999 | White et al. |
| 5,984,548 | A | | 11/1999 | Willner et al. |
| 5,990,890 | A | | 11/1999 | Etheredge |
| 5,993,089 | A | | 11/1999 | Burrell, IV |
| 6,004,049 | A | | 12/1999 | Knox |
| 6,005,495 | A | | 12/1999 | Connolly et al. |
| 6,005,498 | A | | 12/1999 | Yang et al. |
| 6,011,554 | A | | 1/2000 | King et al. |
| 6,037,942 | A | | 3/2000 | Millington |
| 6,043,761 | A | | 3/2000 | Burrell, IV |
| 6,047,196 | A | | 4/2000 | Makela |
| 6,047,300 | A | | 4/2000 | Walfish et al. |
| 6,054,941 | A | | 4/2000 | Chen |
| 6,088,220 | A | | 7/2000 | Katz |
| 6,121,960 | A | | 9/2000 | Carroll et al. |
| 6,130,628 | A | | 10/2000 | Schneider-Hufschmidt et al. |
| 6,150,962 | A | | 11/2000 | Rossmann |
| 6,160,536 | A | | 12/2000 | Forest |
| 6,172,625 | B1 | | 1/2001 | Jin et al. |
| 6,181,328 | B1 | | 1/2001 | Shieh et al. |
| 6,184,803 | B1 | | 2/2001 | Burrell, IV |
| 6,219,731 | B1 | | 4/2001 | Gutowitz |
| 6,232,892 | B1 | | 5/2001 | Burrell, IV |
| 6,232,956 | B1 | | 5/2001 | Mailman |
| D443,615 | S | | 6/2001 | Kirchner |
| 6,243,460 | B1 | | 6/2001 | Bhagavatula |
| 6,262,716 | B1 | | 7/2001 | Raasch |
| 6,271,835 | B1 | | 8/2001 | Hoeksma |
| 6,286,064 | B1 | | 9/2001 | King et al. |
| 6,295,052 | B1 | | 9/2001 | Kato et al. |
| 6,295,509 | B1 | | 9/2001 | Driskell |
| 6,307,548 | B1 | * | 10/2001 | Flinchem et al. ..... 715/811 |
| 6,307,549 | B1 | | 10/2001 | King et al. |
| 6,356,258 | B1 | | 3/2002 | Kato et al. |
| 6,359,572 | B1 | | 3/2002 | Vale |
| 6,405,060 | B1 | | 6/2002 | Schroeder et al. |
| 6,492,977 | B1 | | 12/2002 | Marshall |
| 6,554,191 | B2 | | 4/2003 | Yoneya |
| 6,587,675 | B1 | | 7/2003 | Riddiford |
| 6,636,162 | B1 | | 10/2003 | Kushler et al. |
| 6,646,573 | B1 | | 11/2003 | Kushler et al. |
| 6,661,404 | B1 | | 12/2003 | Sirola et al. |
| 6,703,963 | B2 | | 3/2004 | Higginson |
| 6,708,214 | B1 | | 3/2004 | La Fleur |
| 6,734,881 | B1 | | 5/2004 | Will |
| 6,771,191 | B2 | | 8/2004 | Motoe |
| 6,822,585 | B1 | | 11/2004 | Ni et al. |
| 6,900,794 | B1 | | 5/2005 | San |
| 6,903,723 | B1 | | 6/2005 | Forest |
| 6,190,256 | B1 | | 8/2006 | Stephanick et al. |
| 7,083,342 | B2 | | 8/2006 | Griffin |
| 7,129,932 | B1 | | 10/2006 | Klarlund et al. |
| 7,380,206 | B1 | | 5/2008 | Usuda |
| 7,395,512 | B2 | | 7/2008 | Makabe et al. |
| 7,506,256 | B2 | | 3/2009 | Baker et al. |
| 7,548,849 | B2 | | 6/2009 | Fux et al. |
| 7,561,685 | B2 | * | 7/2009 | Griffin ..... 379/433.07 |
| 7,646,317 | B2 | | 1/2010 | Chen |
| 7,681,145 | B1 | | 3/2010 | Pu |
| 7,684,821 | B2 | | 3/2010 | Mousseau et al. |
| 7,712,053 | B2 | | 5/2010 | Bradford et al. |
| 7,809,553 | B2 | | 10/2010 | Fux et al. |
| 2001/0011271 | A1 | | 8/2001 | Takahashi et al. |
| 2001/0040550 | A1 | | 11/2001 | Vance |
| 2002/0044814 | A1 | | 4/2002 | King et al. |

| | | | |
|---|---|---|---|
| 2002/0196163 | A1 | 12/2002 | Bradford et al. |
| 2003/0006956 | A1 | 1/2003 | Wu et al. |
| 2003/0154560 | A1 | 8/2003 | Behrens et al. |
| 2004/0056844 | A1 | 3/2004 | Gutowitz et al. |
| 2004/0165924 | A1 | 8/2004 | Griffin |
| 2004/0168131 | A1 | 8/2004 | Blumberg |
| 2004/0247362 | A1 | 12/2004 | King et al. |
| 2006/0007118 | A1 | 1/2006 | Fux et al. |
| 2006/0028358 | A1 | 2/2006 | Bollman |
| 2006/0047498 | A1 | 3/2006 | Fux et al. |
| 2006/0197685 | A1 | 9/2006 | Wormald |
| 2006/0217965 | A1 | 9/2006 | Babu |
| 2007/0072647 | A1 | 3/2007 | Mousseau et al. |
| 2007/0165003 | A1 | 7/2007 | Fux et al. |
| 2007/0240044 | A1 | 10/2007 | Fux et al. |
| 2008/0015844 | A1 | 1/2008 | Fux et al. |
| 2008/0266144 | A1* | 10/2008 | Chen ..... 341/23 |

FOREIGN PATENT DOCUMENTS

| | | | |
|---|---|---|---|
| CA | 2354155 | | 10/2010 |
| DE | 3235752 | A1 | 3/1984 |
| EP | 28533 | A2 | 5/1981 |
| EP | 66991 | A2 | 12/1982 |
| EP | 279555 | A2 | 8/1988 |
| EP | 319193 | A2 | 6/1989 |
| EP | 364112 | A2 | 4/1990 |
| EP | 201294 | B1 | 7/1991 |
| EP | 213022 | B1 | 9/1991 |
| EP | 457077 | A2 | 11/1991 |
| EP | 595114 | A1 | 5/1994 |
| EP | 651315 | A1 | 5/1995 |
| EP | 0732646 | A2 | 9/1996 |
| EP | 544123 | A3 | 4/1997 |
| EP | 779759 | A3 | 6/1997 |
| EP | 1085401 | A1 | 3/2001 |
| EP | 1093058 | A1 | 4/2001 |
| EP | 1332419 | B1 | 3/2010 |
| FR | 2840488 | A1 | 5/2002 |
| GB | 2299884 | A | 10/1996 |
| GB | 2343414 | A1 | 5/2000 |
| GB | 2394918 | A | 5/2004 |
| GB | 2432953 | A | 6/2007 |
| GB | 2434237 | A | 7/2007 |
| GB | 2432952 | A | 6/2010 |
| JP | 9128134 | A2 | 5/1997 |
| JP | 10177446 | A2 | 6/1998 |
| JP | 10207601 | A2 | 8/1998 |
| JP | 10207608 | A2 | 8/1998 |
| JP | 11272403 | A2 | 10/1999 |
| WO | WO 85/01596 | A1 | 4/1985 |
| WO | WO 89/02369 | A1 | 3/1989 |
| WO | WO 91/03782 | A1 | 3/1991 |
| WO | WO 91/03782 | A2 | 3/1991 |
| WO | WO 92/12491 | A1 | 7/1992 |
| WO | WO 94/06139 | A1 | 3/1994 |
| WO | WO 95/18405 | A1 | 7/1995 |
| WO | WO 96/02394 | A1 | 2/1996 |
| WO | WO 96/27947 | A1 | 9/1996 |
| WO | WO 96/30822 | A1 | 10/1996 |
| WO | WO 97/05541 | A1 | 2/1997 |
| WO | WO 97/30386 | A1 | 8/1997 |
| WO | WO 98/08688 | A1 | 3/1998 |
| WO | WO 98/09270 | A1 | 3/1998 |
| WO | WO 98/16055 | A1 | 4/1998 |
| WO | WO 98/33110 | A1 | 7/1998 |
| WO | WO 98/33111 | A1 | 7/1998 |
| WO | WO 99/15951 | A1 | 4/1999 |
| WO | WO 99/30222 | A1 | 6/1999 |
| WO | WO 00/08547 | A1 | 2/2000 |
| WO | WO 00/35091 | A | 6/2000 |
| WO | WO-0034880 | A1 | 6/2000 |
| WO | 0227432 | A2 | 4/2002 |
| WO | 03085505 | A1 | 10/2003 |
| WO | 2004001979 | A1 | 12/2003 |
| WO | 2004072839 | A1 | 8/2004 |
| WO | WO 2005/026897 | A2 | 3/2005 |
| WO | 2005121933 | A1 | 12/2005 |
| WO | 2006024159 | A1 | 3/2006 |
| WO | 2006080935 | A1 | 8/2006 |
| WO | WO-2006080927 | A1 | 8/2006 |
| WO | WO-2008034112 | A2 | 3/2008 |
| WO | 2008114086 | A2 | 9/2008 |
| WO | 2008131544 | A1 | 11/2008 |
| WO | 2009027817 | A1 | 3/2009 |
| WO | 2009066289 | A2 | 5/2009 |

OTHER PUBLICATIONS

ARB-2007EatoniReply—Eatoni's 2007 Response to RIM's Counterclaims, 14 Pages.

ARB-2007RIMAnswer—RIM's 2007 Response and Counterclaims to Eatoni's Amended Demand; 18 Pages.

ARB-2007RobtDavidsonAward—2007 Arbitration Award; 25 Pages.

ARB-2007Transcript—2007 Arbitration Transcript; 1041 Pages.

ARB-2009EatoniSC—Eatoni's 2009 Amended Statement of Claim; 45 Pages.

ARB-2009RIManswer—RIM's 2009 Response to Eatoni's Demand, including Defense and Counterclaims; 29 Pages.

ARB-2009Transcript—2009 Arbitration Transcript; 1607 Pages.

ARB-2010Award—2010 Arbitration Award; 37 Pages.

ARB-ChiaralloDeposition—2009 Chiarello Deposition Transcripts; 211 Pages.

ARB-GriffinDeposition—2009 Griffin Deposition Transcripts; 270 Pages.

NY-EatoniComplaint—Eatoni's Nov. 18, 2008 Complaint (filed in the US Dist. Ct. S.D.N.Y.); 100 Pages.

NY-EatonivRIMdecisionoarbitrability—Jun. 24, 2009 Memorandum and Order of Hon. William H. Pauley; 11 Pages.

Tx1-main-Complaint—RIM's Apr. 28, 2005 Complaint filed in the US District Court, S.D.N.Y.; 89 Pages.

Tx32Answer&Counterclaim—Eatoni's Aug. 18, 2005 Answer, Counterclaims and Jury Demand; 8 Pages.

Tx33-AnswertoCounterclaims—RIM's Sep. 7, 2005 Reply to Counterclaims; 8 Pages.

Tx69-Order—Sep. 12, 2006 order of Hon. Ed Kinkeade denying motion to dismiss and compelling arbitration; 14 Pages.

Tx70-Order Sep. 12, 2006 Order of Administrative Closure; 1 Page.

Tx-TranscriptofHearingonArbitrabilityMotions—Jul. 11, 2006 Transcript of Hearing of Arbitrability; 108 Pages.

Tx29-ProtectiveOrder—Aug. 5, 2005 Protective Order entered by the Hon. Ed Kinkeade (N. D., Texas); 10 Pages.

"Mexican Application Serial No. PA/a/20011005887, Response filed Sep. 28, 2004 to Notice of Allowance mailed Jul. 2, 2004", 2 pgs.

"Notice of Motion to Dismiss Eatoni's Amended Complaint", 1:08-CV-10079-WHP—*Eatoni Ergonomics, Inc.* v. *Research in Motion Corporation and Research in Motion Limited*, PACER document 73, Southern Distlict of New York, (Aug. 12, 2011), 2 pgs.

"Research in Motion's Memorandum in Opposition to Eatoni's Motion for Reconsideration", 1:08-OV-10079-WHP—*Eatoni Ergonomics, Inc.* v. *Research in Motion Corporation and Research in Motion Limited*, PACER document 66, Southern District of New York, (Jun. 27, 2011) 7 pgs.

"Research in Motion's Memorandum in Support of its Motion to Dismiss Eatoni's Amended Complaint", 1:08-CV-10079-WHP—*Eatoni Ergonomics, Inc.* v. *Research in Motion Corporation end Research in Motion Limited*, PACER Document 74, Southern District of New York, (Aug. 12, 2011), 25 pgs.

"Stipulation and Proposed Order", 1:08-CV-10079-WHP—*Eatoni Ergonomics, Inc.* v. *Research in Motion Corporation and Research in Motion Limited*, PACER document 62, Southern District of New York, (Jun. 17, 2011), 2 pgs.

Arnott, J. L., et al., "Probabilistic Character Disambiguation For Reduced Keyboards Using Small Text Samples", Augmentative and Alternative Communication, V. 8(3), (Sep. 1992), 215-223.

Bentley, J., "The Littlest Keyboard", UNIX Review. (Dec. 1994), 6 pgs.

Fukomoto, Masaaki, et al., "Body Coupled FingeRing: Wireless Wearable Keyboard", CHI 97 Electronic Publications: Papers, [Online], Retrieved from the Internet: <URL: www.sigchi.org/chi97/proceedings/paper/fkm.htm> Retrieved on Sep. 7, 2011, 17 pgs.

Knot, R. W., "Smart Virtual Keyboard Suitable for Mouse or Stylus Entry", Xerox Disclosure Journal, V. 18(3), (May 1992), 245-248.

Kreifeldt, J. G., et al., "Reduced Keyboard Designs Using Disambiguation", Proceedings of Human Factors and Ergonomics Soc., 33rd Annual Meeting, (1989), 441-444.
"U.S. Appl. No. 11/814,769, Final Office Action mailed Dec. 22, 2010", 10 pgs.
"U.S. Appl. No. 11/814,769, Non Final Office Action mailed Jul. 9, 2010", 9 pgs.
"U.S. Appl. No. 11/814,769, Response filed Apr. 13, 2011 to Final Office Action mailed Dec. 22, 2010", 17 pgs.
"U.S. Appl. No. 11/814,769, Response filed Oct. 6, 2010 to Non Final Office Action mailed Jul. 9, 2010", 16 pgs.
"U.S. Appl. No. 12/747,265, Petition Decision mailed Jan. 3, 2011", 3 pgs.
"U.S. Appl. No. 12/747,265, Petition Decision mailed Sep. 9, 2011", 3 pgs.
"U.S. Appl. No. 12/747,265, Petition Regarding Non-Signing Inventor filed Oct. 22, 2010", 5 pgs.
"U.S. Appl. No. 12/747,265, Re-Petition Regarding Non-Signing Inventor filed Jul. 5, 2011", 6 pgs.
"Australian Application Serial No. 20499/00, Office Action mailed Sep. 12, 2002", 2 pgs.
"Canadian Application Serial No. 2,354,155, Office Action mailed Jul. 6, 2009", 2 pgs.
"Canadian Application Serial No. 2,354,155, Response filed Jan. 6, 2010 to Office Action mailed Jul. 6, 2009", 3 pgs.
"International Application Serial No. PCT/US05/03093, Search Report mailed Oct. 27, 2005", 1 pg.
"International Application Serial No. PCT/US05/03093, Written Opinion mailed Oct. 27, 2005", 6 pgs.
"International Application Serial No. PCT/US05/14211, Search Report mailed Sep. 13, 2005", 1 pg.
"International Application Serial No. PCT/US05/14211, Written Opinion mailed Sep. 13, 2005", 3 pgs.
"Research in Motion's Reply in Support of Its Motion to Dismiss Eatoni's Amended Complaint", 1:08-CV-10079-WHP— *Eatoni Ergonomics, Inc.* v. *Research in Motion Corporation and Research in Motion Limited*, PACER Document 81, South District of New New York, (Filed Sep. 23, 2011), 16 pgs.
Gutowitz, Howard Andrew, "Efficient Merger of Telephone Keypad and Typewriter Keyboard Conventions", U.S. Appl. No. 60/844,592, (filed Sep. 14, 2006), 93 pgs.
Gutowitz, Howard Andrew, et al., "Keypads Row Similar to a Telephone Keypad", U.S. Appl. No. 60/905,054, (filed Mar. 5, 2007), 55 pgs.
Gutowitz, Howard Andrew, et al., "Row Similar Extensions of Telephone Keypads", U.S. Appl. No. 60/932,449, (filed May 31, 2007), 73 pgs.
Gutowitz, Howard Andrew, et al., "Row Similar Extensions of Telephone Keypads", U.S. Appl. No. 60/958,775, (filed Jul. 9, 2007), 105 pgs.
Gutowitz, Howard Andrew, et al., "Row Similar Extensions of Telephone Keypads", U.S. Appl. No. 60/962,267, (filed Jul. 27, 2007), 95 pgs.
Kushler, Cliff, "AAC Using a Reduced Keyboard", CSUN Conference Proceedings, [Online]. Retrieved from the Internet: <URL: http://www.dinf.org.csun98/csun98_140.htm>, (May 1998), 5 pgs.
Davis, J.P., "Let your fingers do the spelling", disambiguating words spelled with the telephone keypad, Avros Journal, 9:53-66, Mar. 1991.

* cited by examiner

Fig. 12

| | Level A | Level B | Level C |
|---|---|---|---|
| Single Random | 15 | 20 | > 22 |
| Best Random | 10 | 12 | 14 |
| Directed Walk | 9 | 11 | 13 |

Fig. 14

| Name | Main Features | Section Heading |
|---|---|---|
| **Smart Card** | display/keyboard arrangements; block-based disambiguation-no CPU;minimal memory requirements | Smart card on 9-16 keys |
| **Steering Wheel** | Query Error dominant; typable w/o removing hands from the steering wheel | A typable device for a vehicle |
| **Optimal Phone Keypad** | strongly touch typable; non-alphabetic order; uniform partition | Phone keypads compatible... |
| **Alphabetic Phone Keypad** | Preserve conventional criterion: alphabetic ordering; non-uniform partition | Telephone keypad in alphabetic order |
| **Qwerty-like Keyboards** | Preserve conventional criterion: Qwerty layout, partially or completely; Gestural conservation; Strongly touch typable | Qwerty-like Keyboards |
| **Numeric Keypad** | platform compatible, may use numeric keypad and arrow keys | Numeric Keypad-like Keyboards |
| **13-letter-key code** | across platforms; ambiguous and unambiguous operation; compatibility with standard keyboard; strongly touch typable | ...advantages of 13-letter-key codes |
| **Touch-type Querying** | General mechanism to permit queries arising from ambiguous codes to be "answered" in a stereotypical manner. | Touch-typing oriented querying |

Fig. 14 (Cont.)

| | | |
|---|---|---|
| **Mouse-Key-board** | cross-platform gestural conservation; device for mixed text/gesture input; one- or two-hand favored designs; target-dependent mode selection; reduction of typing injury | Conservation of design... |
| **Fold-able PDA** | Multi-use design made possible by optimal, strongly touch typable ambiguous codes | Foldable PDA |
| **Touch Screen PDA Soft-ware** | Shows that the teachings of the invention guide software as well as hardware design; Strong touch-typability permits "invisible" user interface | Software embodiment for a typable... |
| **Chord-ing-Ambig-uous code Key-board** | Synergistic combination of chording and ambiguous code methods, in particular using chords composed of a pair of inputs; may use a distinguished key or keys to form chords with ambiguous symbol keys | Hybrid Chording/ Ambiguous Keyboards |
| **One-Hand Key-board** | Operable with one hand holding the device; chords formed by pairs of ambiguous symbol keys; visual cache and other mechanisms to optimize scanning; strongly touch typable | |
| **Cross-Lan-guage Optimi-zation** | Methods applicable to any apparatus embodiment which might be used or built for a plurality of linguistic communities to conserve typing skills across languages | Cross-Lan-guage optimi-zation |

*Fig. 20*

| | | | | | | |
|---|---|---|---|---|---|---|
| qwe | r | t | yu | i | o | p |
| as | d | f | space | g | hjk | l |
| | zxc | vb | n | m | | |

*Fig. 21*

| | | | | | | |
|---|---|---|---|---|---|---|
| w | r | t | *b*u | *g*i | o*v* | p |
| a*f* | s | d | space | *e*j | k*y* | l |
| | *h*z | cx | | n | m*q* | |

Fig. 25

| | | | | |
|---|---|---|---|---|
| zr | bn | js | ud | vh |
| pi | fe | go | wa | qt |
| yl | kc | xm | | |

*Fig. 26*

| | | | | | | | | | |
|---|---|---|---|---|---|---|---|---|---|
| v | u | j | b | z | r | n | s | d | h |
| q | w | g | f | p | i | e | o | a | t |
| | | x | k | y | l | c | m | | |

Fig. 27

| | | | | | | | | | |
|---|---|---|---|---|---|---|---|---|---|
| v | d | j | n | z | r | b | s | u | h |
| q | a | o | e | p | i | f | g | w | t |
| | | x | k | l | y | c | m | | |

*Fig. 36*

A

| | | | |
|---|---|---|---|
| zr | bn | js | ud |
| pi | fe | go | wa |
| yl | kc | xm | space ← |
| vh | qt | . , | next prev |

B

| | | | |
|---|---|---|---|
| 1 | 2 | 3 | - + |
| 4 | 5 | 6 | \ / |
| 7 | 8 | 9 | enter |
| _ * | 0 | # @ | next prev |

C

| | | | |
|---|---|---|---|
| ( ) | [ ] | { } | < > |
| . , | ` ' | : ; | \| & |
| ! ? | = " | ^ ~ | - + |
| # * | % @ | \ / | next prev |

Fig. 44

| Second input means | First input means | | | |
|---|---|---|---|---|
| | 2100 | 2101 | 2102 | 2103 |
| 2100 | ac | gi | mo | sz |
| 2101 | be | h | n | tu |
| 2102 | d | jk | p | vy |
| 2103 | f | l | qr | wx |

Fig. 46

| letter to be entered | first display | second display |
|---|---|---|
| | abc def | sz |
| t | ghi jkl | tu |
| | mno pqr | yv |
| | stuv wxyz | wx |
| | abc def | gi |
| h | ghi jkl | h |
| | mno pqr | jk |
| | stuv wxyz | l |
| | abc def | gi |
| i | ghi jkl | h |
| | mno pqr | jk |
| | stuv wxyz | l |
| | abc def | mo |
| n | ghi jkl | n |
| | mno pqr | p |
| | stuv wxyz | qr |
| | abc def | gi |
| k | ghi jkl | h |
| | mno pqr | jk |
| | stuv wxyz | l |

Fig. 47

| letter to be entered | first display | second display |
|---|---|---|
| | Abc def | Sz |
| t | Igh jkl | Tu |
| | Omn qr | Yv |
| | Tsuv wxyz | Wx |
| | Ae | I |
| h | Hi | H |
| | Or | |
| | Wsuy | |
| | Ae | I |
| i | Hi | |
| | Ro | |
| | Uwy | |
| | Cae | Mo |
| n | G | N |
| | Nmor | |
| | St | R |
| | E | G |
| k | Kgl | |
| | N | K |
| | S | L |

Fig. 48

| letter to be entered | first display | second display | unambiguous selector selects |
|---|---|---|---|
| | abc def | sz | z |
| t | ghi jkl | tu | u |
| | mno pqr | yv | v |
| | stuv wxyz | wx | x |
| | abc def | gi | g |
| h | ghi jkl | h | not applicable |
| | mno pqr | jk | j |
| | stuv wxyz | l | not applicable |
| | abc def | gi | g |
| i | ghi jkl | h | not applicable |
| | mno pqr | jk | j |
| | stuv wxyz | l | not applicable |
| | abc def | mo | o |
| n | ghi jkl | n | not applicable |
| | mno pqr | p | not applicable |
| | stuv wxyz | qr | q |
| | abc def | gi | g |
| k | ghi jkl | h | not applicable |
| | mno pqr | jk | j |
| | stuv wxyz | l | not applicable |

General Ambiguous Code, mapping sequences of encoding symbols to sequences of decoding symbols Max-2 to Max-1 ambiguous code, in which a sequence at most of length 2 of encoding symbols maps to sequences of decoding symbols of length 1

Max-2 to Max-1 Ambiguous Code where the length-2 sequences consist of a combining encoding symbol ($C_i$) and a key-assigned encoding symbol ($K_i$); Decoding symbols ($D_{Ki}$) are assigned to the same key as the encoding symbol $K_i$ Max-2 to Max-1 ambiguous code, where the length-2 sequences consist of a combining encoding symbol and a key-assigned encoding symbol, the decoding symbols are the letters a-z, and the explicitly selected letters, selected from the set of letters on each of the keys in the standard telephone keypad, are the letters c,e,h,l,n,s,t, and y.

TOUCH-TYPABLE DEVICES BASED ON AMBIGUOUS CODES AND METHODS TO DESIGN SUCH DEVICES

Matter enclosed in heavy brackets [ ] appears in the original patent but forms no part of this reissue specification; matter printed in italics indicates the additions made by reissue.

This application claims the benefit of Provisional Application No. 60/111,665, filed Dec. 10, 1998.

FIELD OF INVENTION

This invention relates to the design of touch-typable devices, and the use of touch-typable devices in computing and telecommunications, and more particularly to touch-typable devices based on strongly touch-typable ambiguous codes and substantially optimal ambiguous codes.

BACKGROUND OF THE INVENTION

Since the invention of the typewriter more than 100 years ago, keyboard engineering has been an active field of research and development, resulting in many competing designs. With the growth of personal computing and telecommunications, the number of keyboard designs has multiplied as designers attempt to accommodate the wide variety of constraints and to exploit opportunities these new technologies present. Nonetheless, much of the variability of prior-art keyboard designs is not due to this variety of constraints and opportunities. Rather, it results from an incomplete appreciation on the part of keyboard designers of the constraints inherent in the problems they are trying to solve. It also reflects the lack of general, effective methods for optimizing with respect to these constraints. The present state of the art is thus represented by a plethora of partial solutions. These ills are cured by the keyboard design methods taught by the present invention. To illustrate the many facets of this invention, the optimizing methods are applied to the design of a variety of device embodiments, each preferred as the substantially optimal solution of a given set of design constraints.

The instant invention relates to touch-typable devices. Touch typing, like playing a musical instrument, is a manual skill which is difficult to learn. Once learned, it is difficult to modify the acquired motor patterns. This difficulty places strong constraints on keyboard design. The familiar Qwerty keyboard (and its close variants such as the Azerty keyboard used in France) owes its dominance to ingraining and overlearning of the motor patterns involved in touch typing. Thus, the wide established base of the Qwerty keyboard has created a barrier to entry to improved keyboards, such as the Dvorak keyboard. Indeed such keyboards have gathered but a limited user community. Due to its large number of keys, the Qwerty keyboard is unsuitable for handheld and smaller typable devices. The advent of such devices opens a niche for keyboard designers. A new design in this niche which becomes dominant will likely conserve its dominant position even if more optimal designs appear later, due to the intrinsic tendency of repetitive motor patterns to become fixed. This prospect imposes an enormous burden of responsibility on keyboard designers to avoid saddling future generations of keyboard users with suboptimal designs.

There are two main approaches in the prior art toward reducing the number of input means required to encode a given set of symbols 1) chording methods, in which a combination of input means are activated to encode each symbol, and 2) ambiguous codes, in which a combination of symbols are encoded by each input means. Chording methods have not met with practical success since they have been heretofore difficult to learn to operate, and few are willing to make the time investment required. Thus, only ambiguous codes, or ambiguous codes in combination with chording methods, hold any real promise as a solution to this problem.

OBJECTS OF THE INVENTION

It is thus an object of the present invention to provide methods for the design of substantially optimal ambiguous codes for typable devices.

It is a further object of this invention to provide methods for the design of strongly-touch-typable ambiguous codes for typable devices.

A further object of this invention is to provide keyboards suitable for touch typing on both full-sized and miniature keyboards.

A further object of this invention is to enable sending alphanumeric messages from ordinary phones or two-way pagers to other such devices, without human intervention, and thus inexpensively.

A further object of this invention is to provide touch-typable personal digital assistants.

A further object of this invention is to provide keyboards which are typable by the driver of a vehicle without unnecessarily distracting the driver.

A further object of this invention is to provide for typable communication devices which are inexpensive to manufacture and work with standard telephone communication systems.

A further object of some of the preferred embodiments of this invention is to facilitate the transfer of typing skills of touch typists trained on conventional keyboards to novel keyboards through partial conservation of the layout of the conventional keyboard in the layout of the novel keyboard.

A further object of this invention is to provide general methods to produce ambiguous codes which have a substantially minimal lookup error rate.

A further object of this invention is to provide general methods to produce ambiguous codes which have a substantially minimal query error rate.

A further object of this invention is to provide a device to reduce typing injuries.

A further object of this invention is to provide a handheld computing device which is twice foldable.

A further object of this invention is to provide a one-handed keypad suitable for implementation on a handheld computer.

A further object of this invention is to provide a one- and two-handed keypad suitable for implementation on a handheld computer or a desktop keypad.

A further object of this invention is to provide keyboards which are Qwerty-like.

A further object of this invention is to provide easily learnable chording keyboards.

A further object of this invention is to provide synergistic hybrids of chording and ambiguous keyboards.

A further object of this invention is to provide a touch-typing-oriented querying mechanism for typable devices embodying ambiguous codes.

A further object of this invention is to provide a touch-typing-oriented disambiguation mode for typable devices embodying ambiguous codes.

A further object of this invention is to provide a hybrid chording/ambiguous code keyboard fully compatible with the standard telephone keyboard.

A further object of this invention is to provide ergonomic assignments of symbols to modes.

A further object of this invention is to provide a substantially transparent touch-typable interface for typable devices comprising touch screens.

A further object of this invention is to provide optimization across a set of natural languages.

A further object of this invention is to provide a device typable using the one hand holding the device, with reduced scanning time.

Still further objects of this invention will be described in the detailed description below.

BRIEF DESCRIPTION OF THE DRAWINGS

The detailed description of the preferred embodiments of the present invention will be discussed with reference to the drawings, a brief description of which follows.

FIG. 12 shows a table relating levels of strong touch typability to the number of keys required to achieve that level, for several different optimization methods.

In order to help the reader appreciate the unity of the present invention in the face of the multitude of apparatus embodiments which are required to clearly and distinctly point out the broad scope and various aspects of the invention, a table summarizing these embodiments and their major features is shown in FIG. 14.

Figure 15:
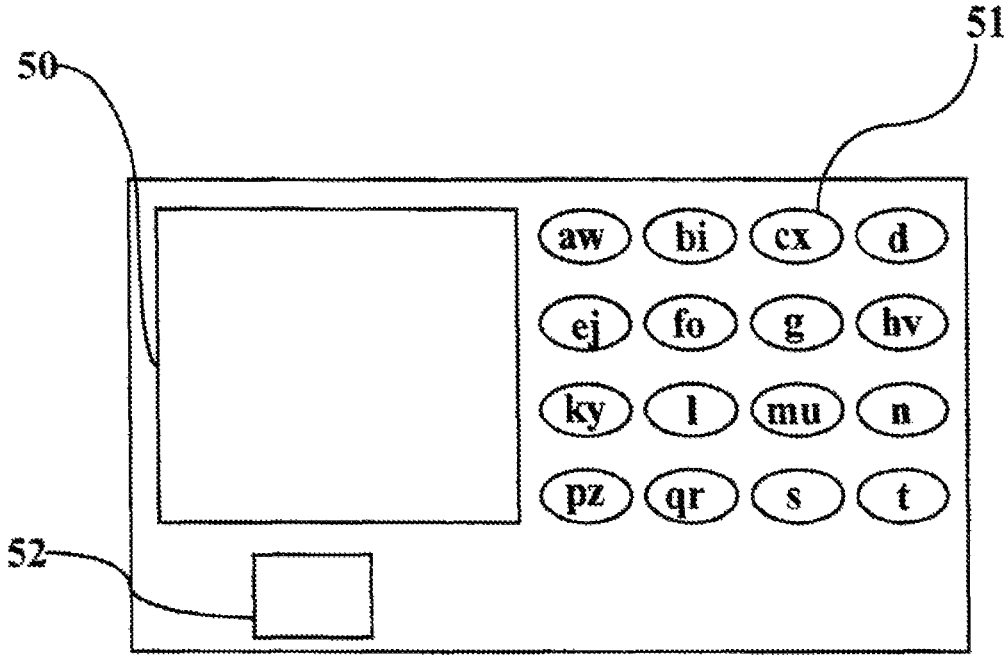

FIG. 15 shows a smart-card embodiment with 16 keys devoted to encoding of letter symbols.

Figure 16:
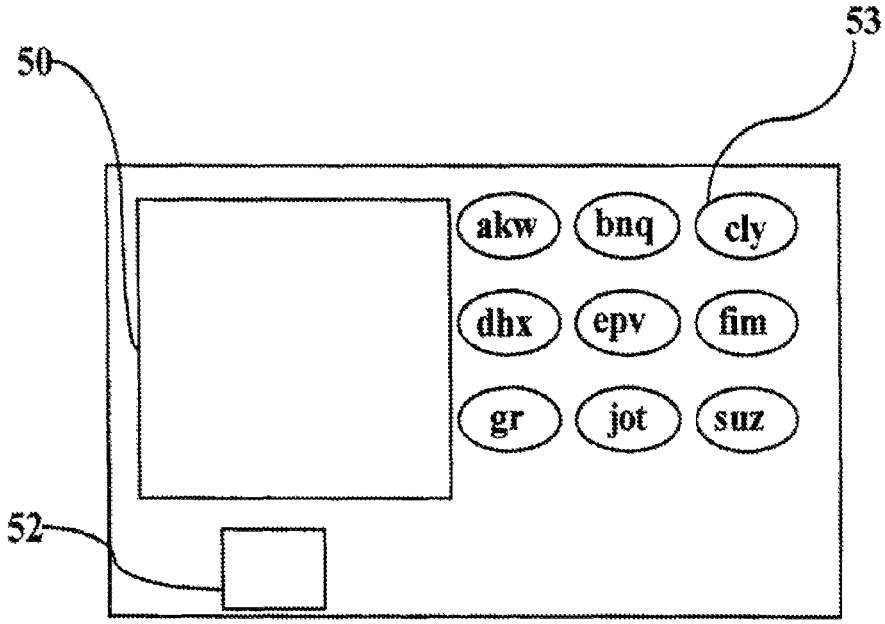

FIG. 16 shows a smart-card embodiment with 9 keys devoted to encoding of letter symbols.

Figure 17:
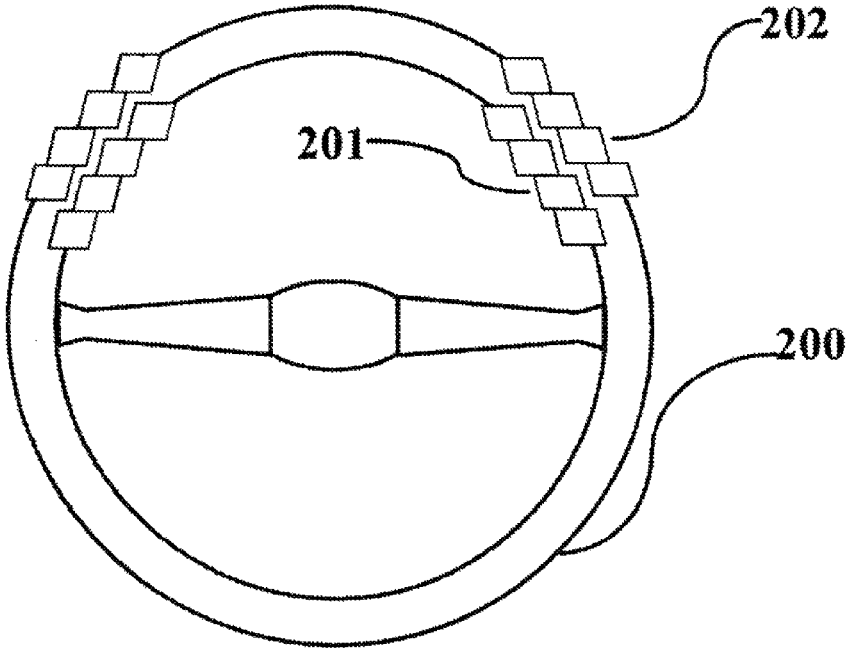

FIG. 17 shows a keyboard embedded in a steering wheel.

Figure 18:
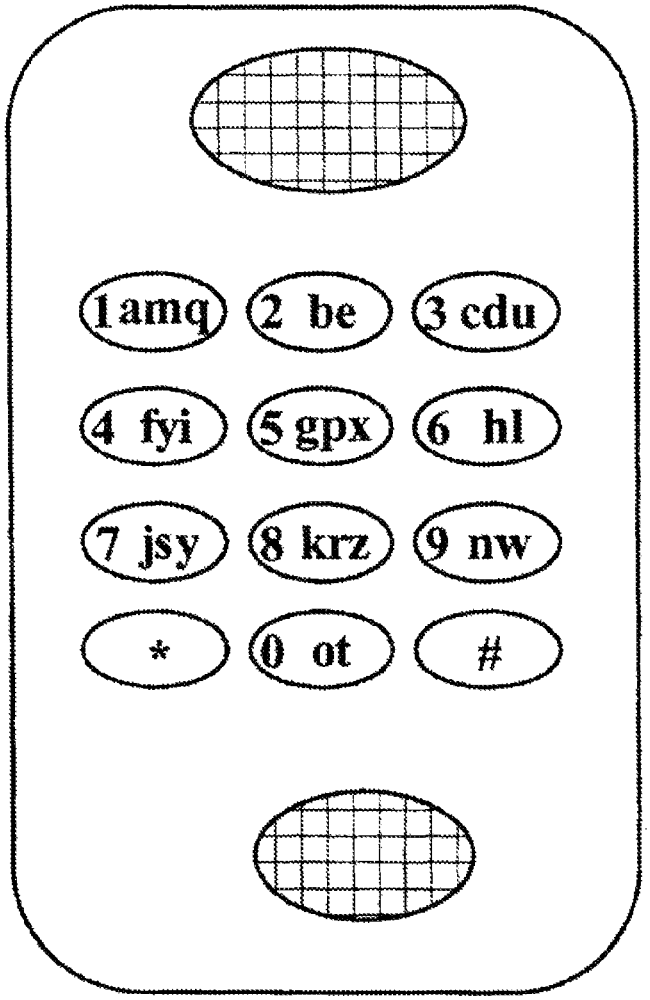

FIG. 18 shows a telephone with a substantially optimal code on 10 keys.

Figure 19:
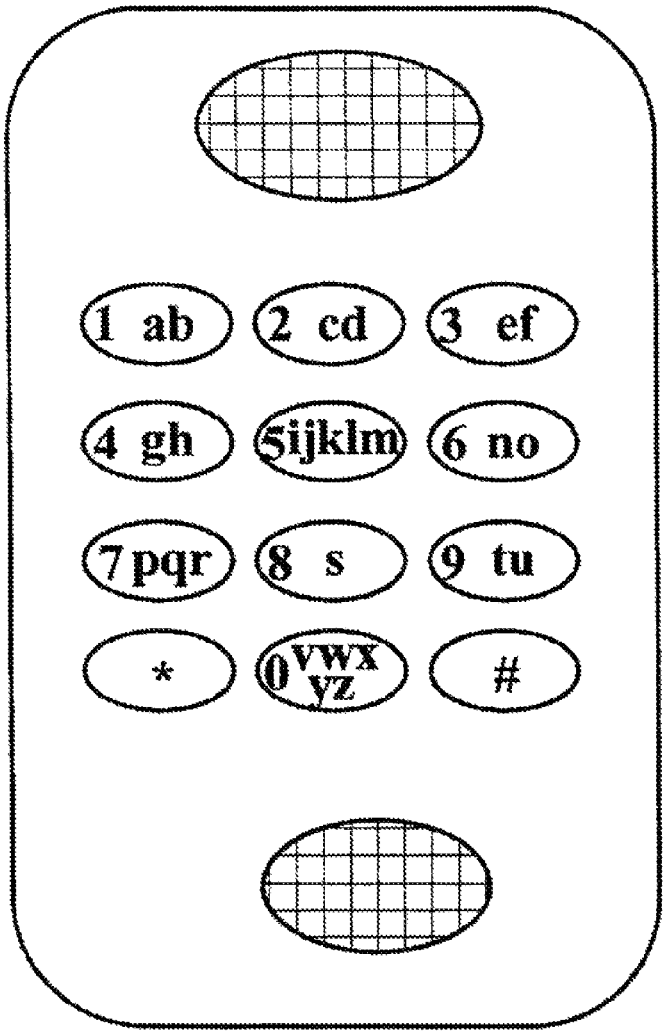

FIG. 19 shows an example reduced-ambiguity alphabetically ordered ambiguous code in application to a portable telephone.

FIG. 20 shows a Qwerty-like keyboard, optimized with respect to lookup error rate and query error rate, while respecting the ordering of letters on each row of the Qwerty keyboard.

FIG. 21 shows an alternate Qwerty-like keyboard.

Figure 22:
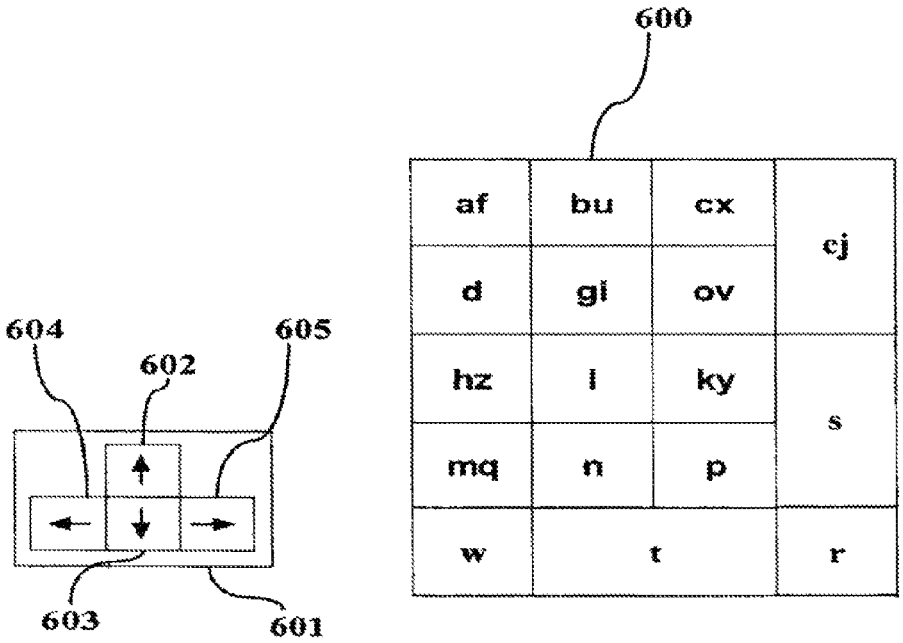

FIG. 22 shows an ambiguous keyboard embodied in a standard numeric keypad layout.

Figure 23:
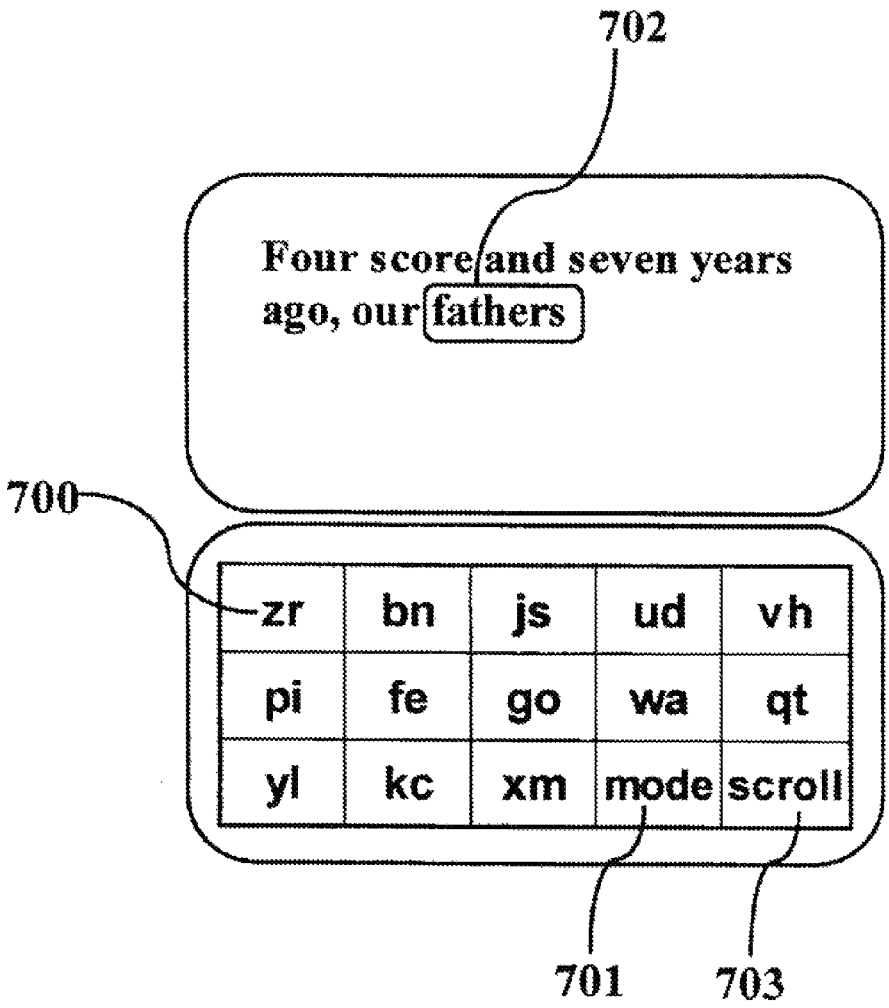

FIG. 23 shows a n ergonomic touch-typing-oriented disambiguation mechanism.

Figure 24:
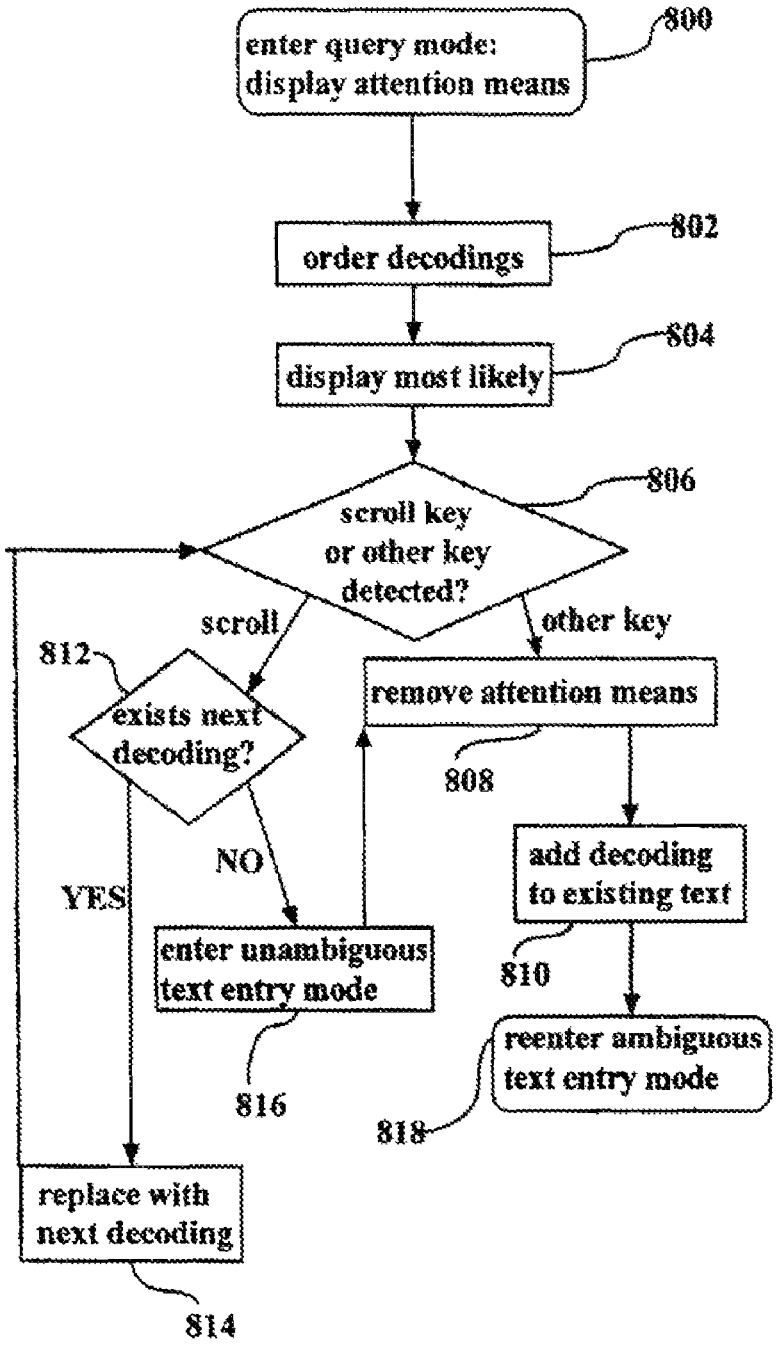

FIG. 24 shows a flow chart for a method to allow queries to be answered in a touch-typing oriented manner.

FIG. 25 shows a one-handed embodiment of a keyboard designed for conservation of typing skills between one-handed and two-handed keyboards.

FIG. 26 shows a two-handed embodiment of a keyboard designed for conservation of typing skills between one-hand ed and two-handed keyboards. In this case, the two-handed keyboard is weighted for maximum similarity in typing motions between the two keyboards.

FIG. 27 shows a two-handed embodiment of a keyboard designed for conservation of typing skills between one-handed and two-handed keyboards. In this case, the two-handed keyboard is evenly weighted between the two hands.

Figure 28:
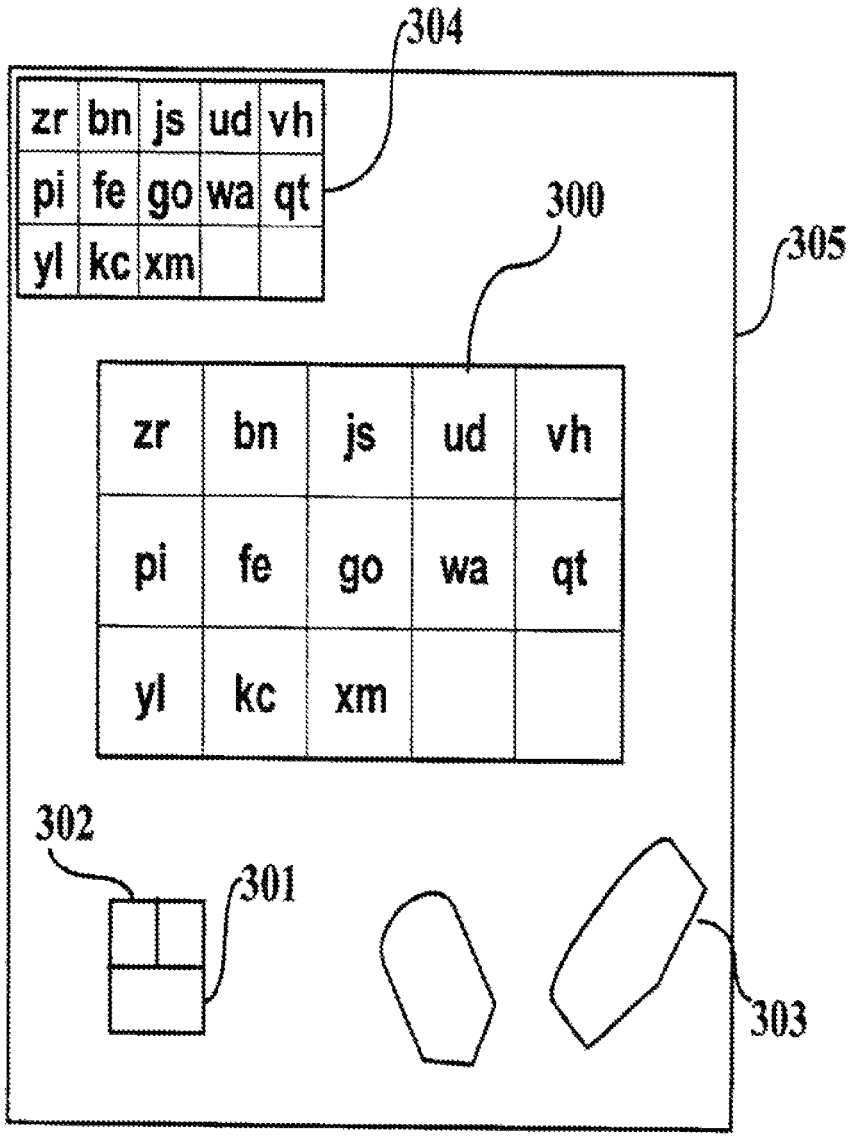

FIG. 28 shows an integrated mouse/keyboard.

Figure 29:
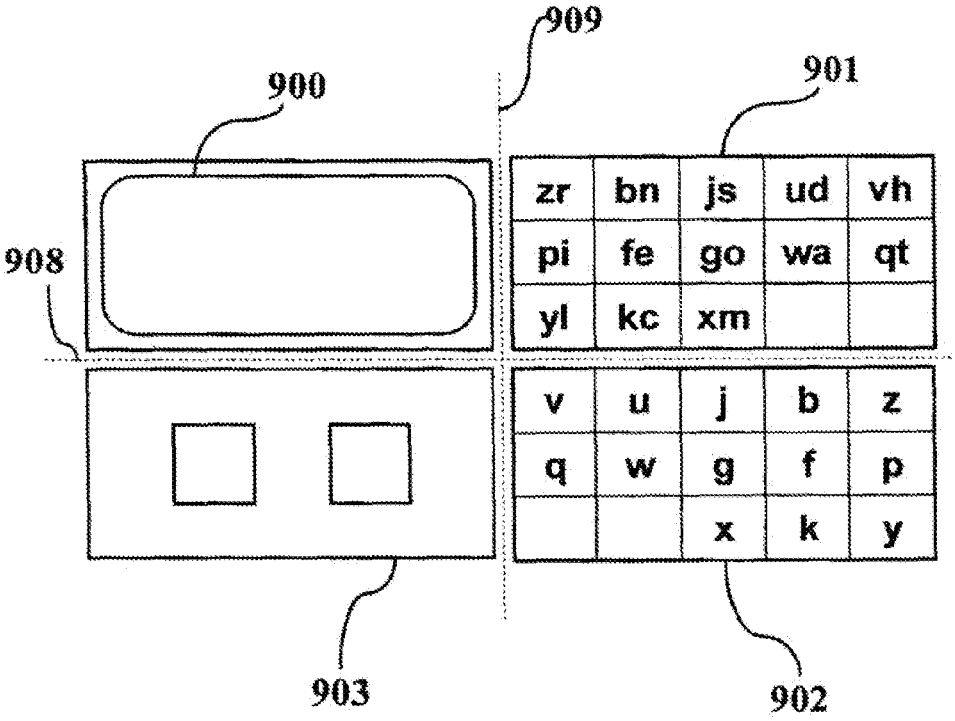

FIG. 29 shows a top view of a twice-foldable information appliance in the unfolded state.

Figure 30:
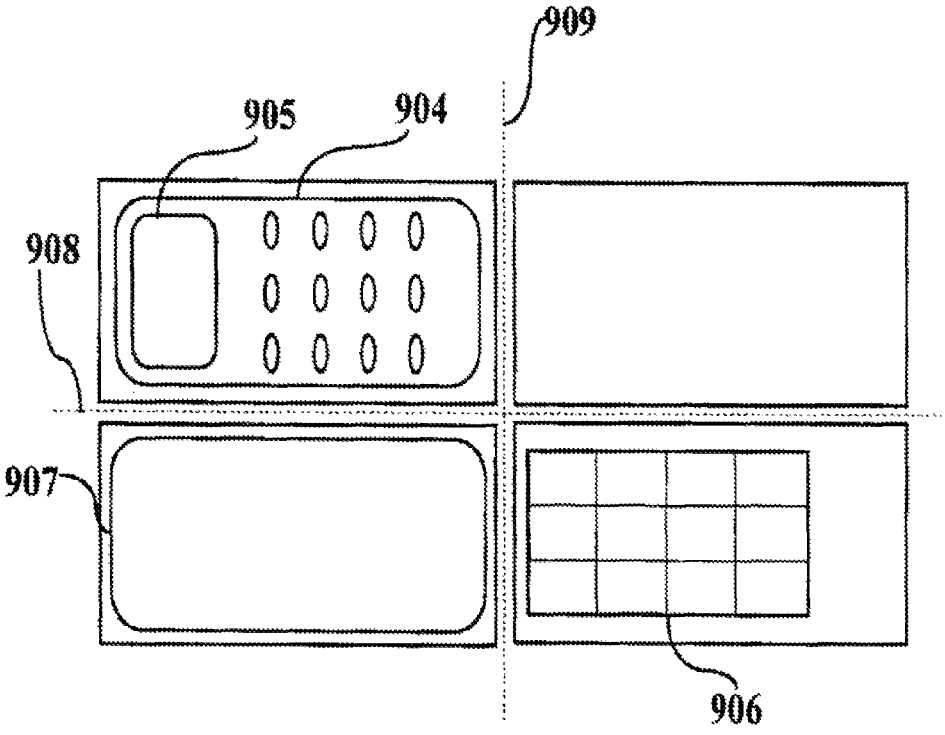

FIG. 30 shows a bottom view of a twice-foldable information appliance in the unfolded state.

Figure 31:
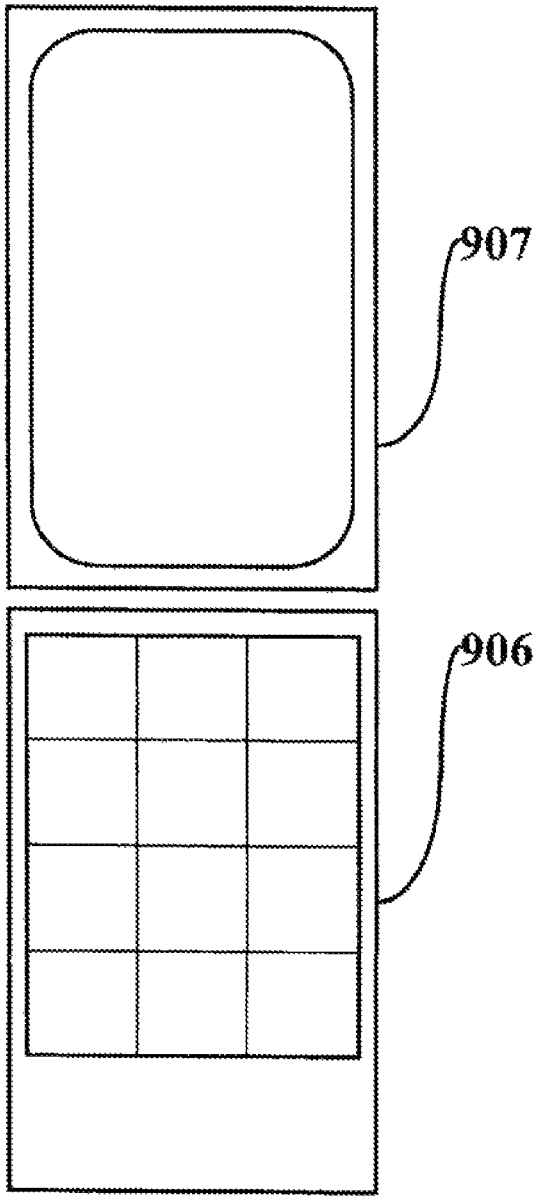

FIG. 31 shows a twice-foldable information appliance in the once-folded state, revealing an additional functionality.

Figure 32:
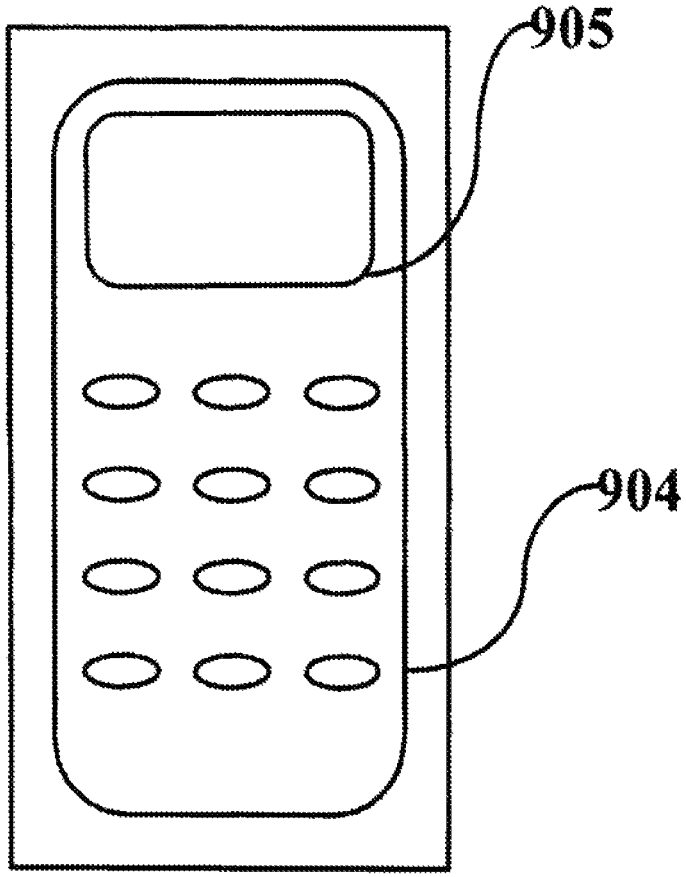

FIG. 32 shows a twice-foldable information appliance in the twice-folded state, revealing yet another functionality.

Figure 33:
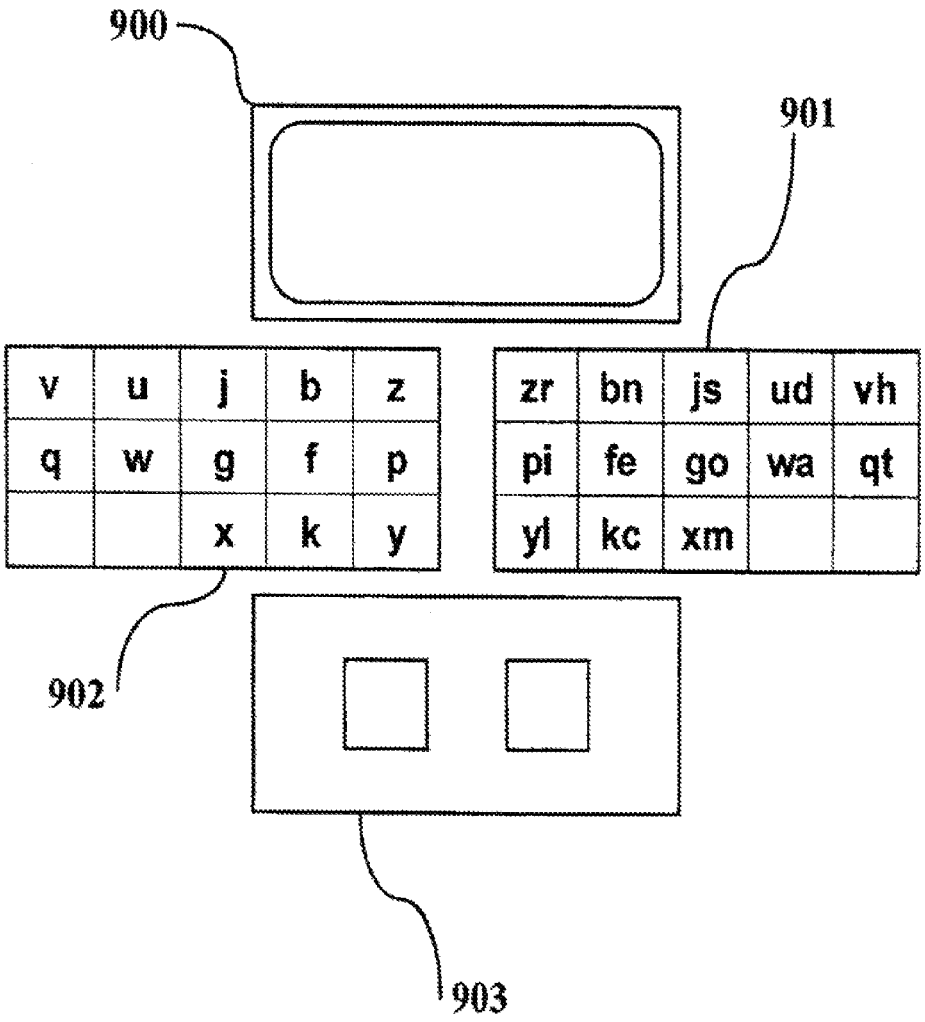

FIG. 33 shows a twice-foldable information appliance in a detached state, allowing two-handed typing.

Figure 34:
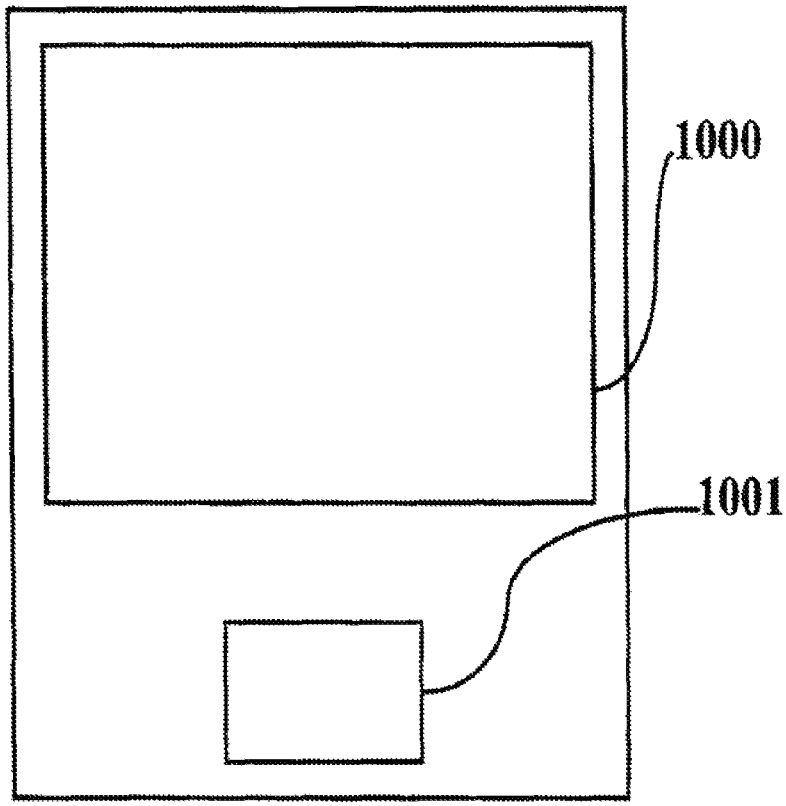

FIG. 34 shows a typical personal digital assistant with a touch screen.

Figure 35:
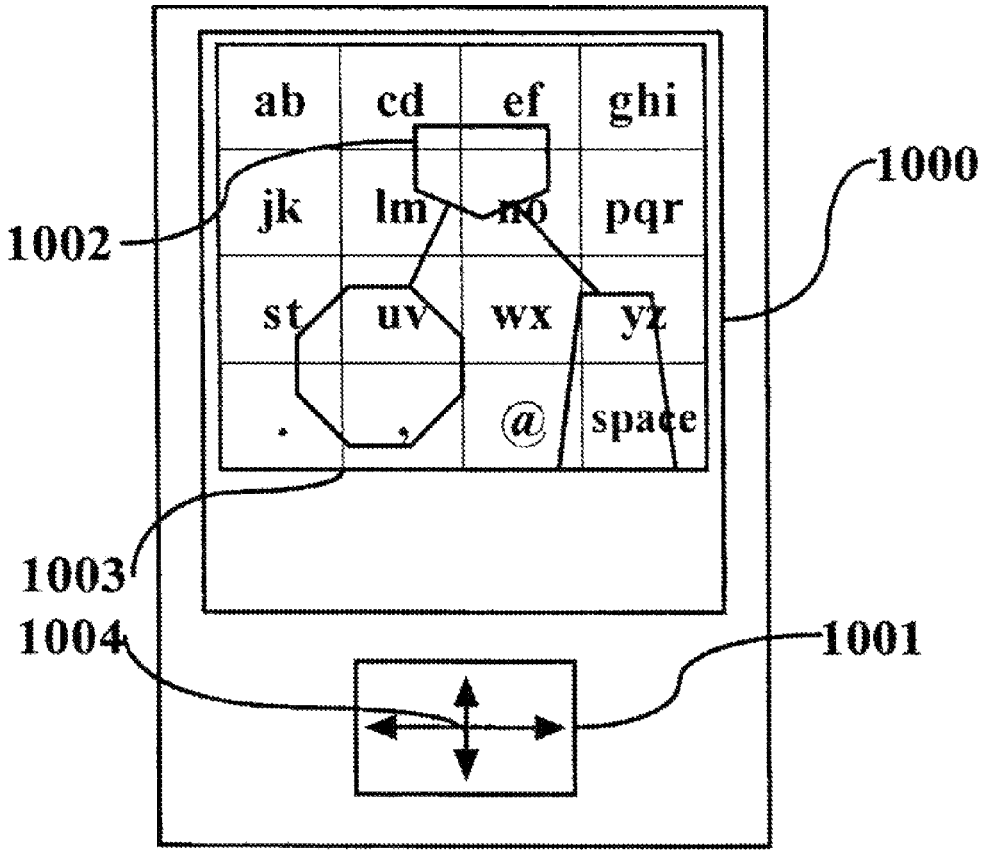

FIG. 35 shows a typical personal digital assistant with a potentially transparent keyboard.

FIGS. 36A, B and C show three modes for a 16-key keyboard.

Figure 37:
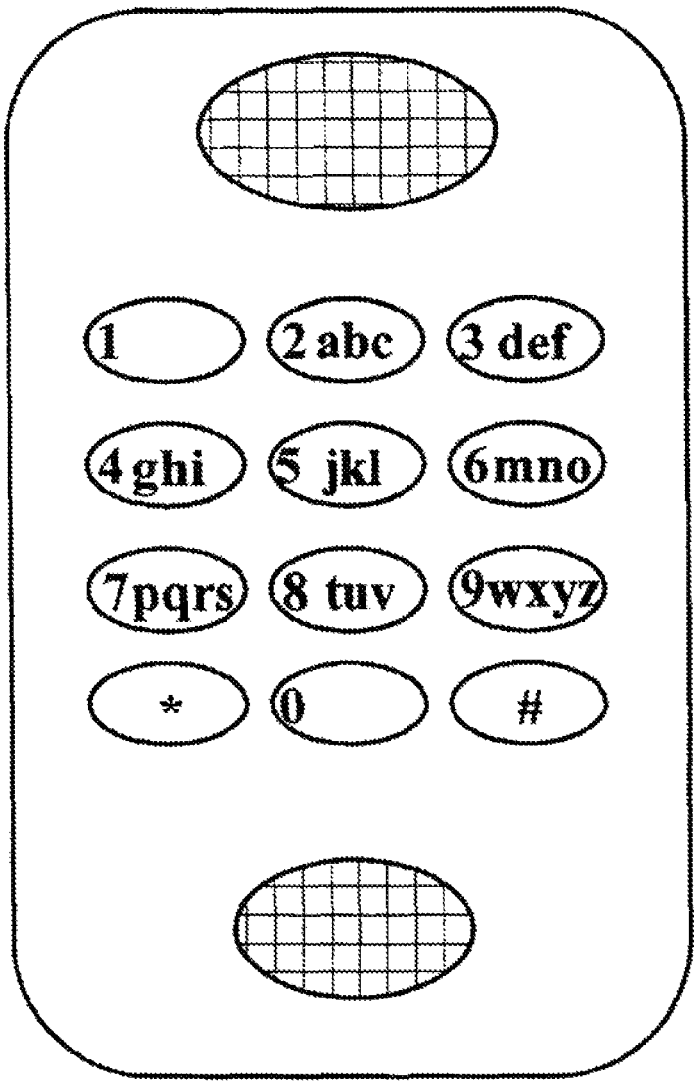

FIG. 37 shows a standard telephone layout.

Figure 38:
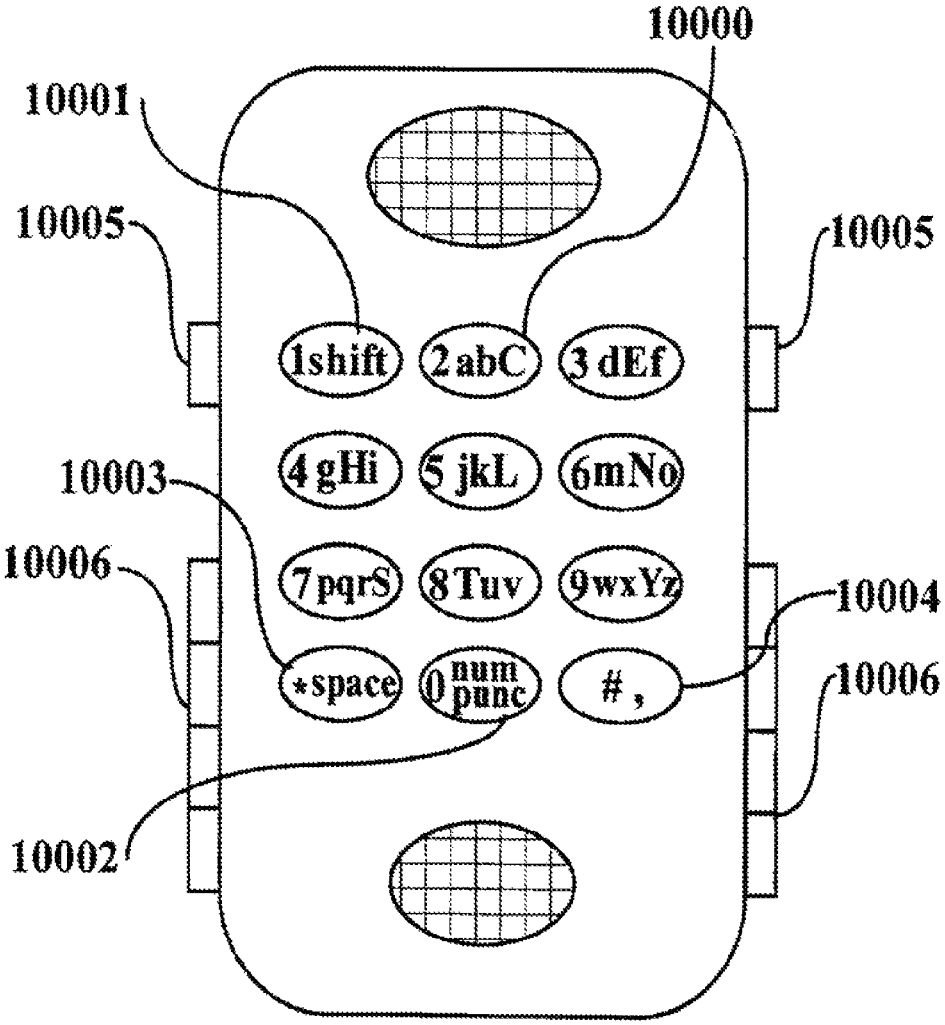

FIG. 38 shows a hybrid chording/ambiguous code keyboard embodied in a telephone.

Figure 39:
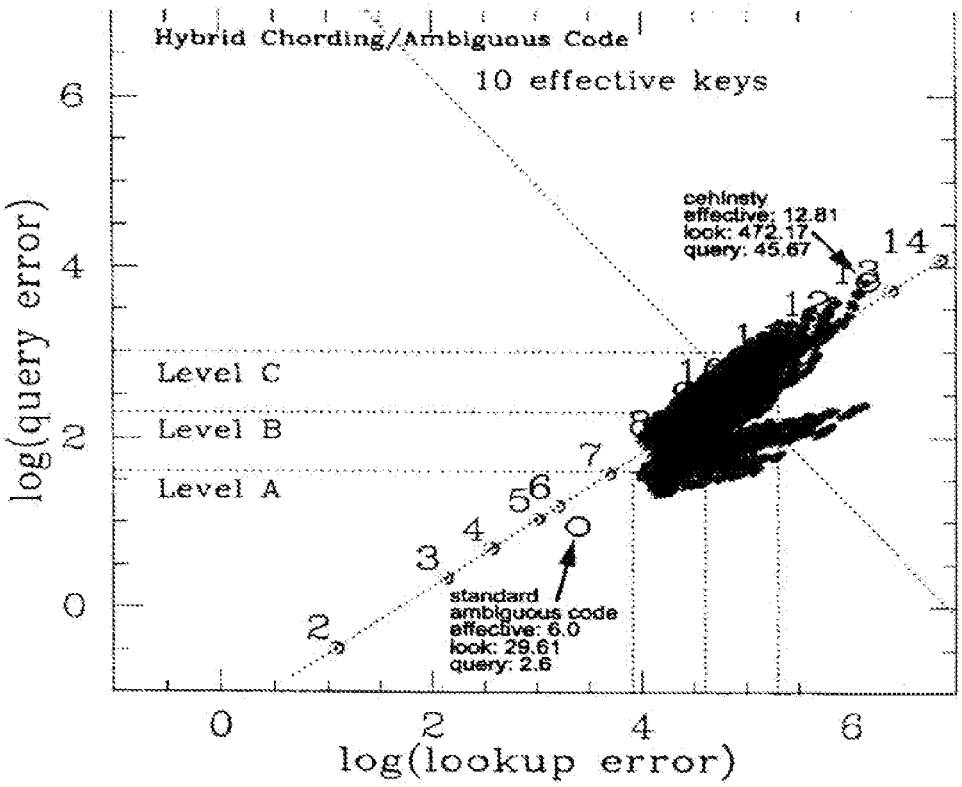

FIG. 39 shows the distribution of lookup error rates and query error rates for all hybrid chording/ambiguous codes of a specified structure, compared to the lookup and query error rate of the standard ambiguous code.

Figure 40:
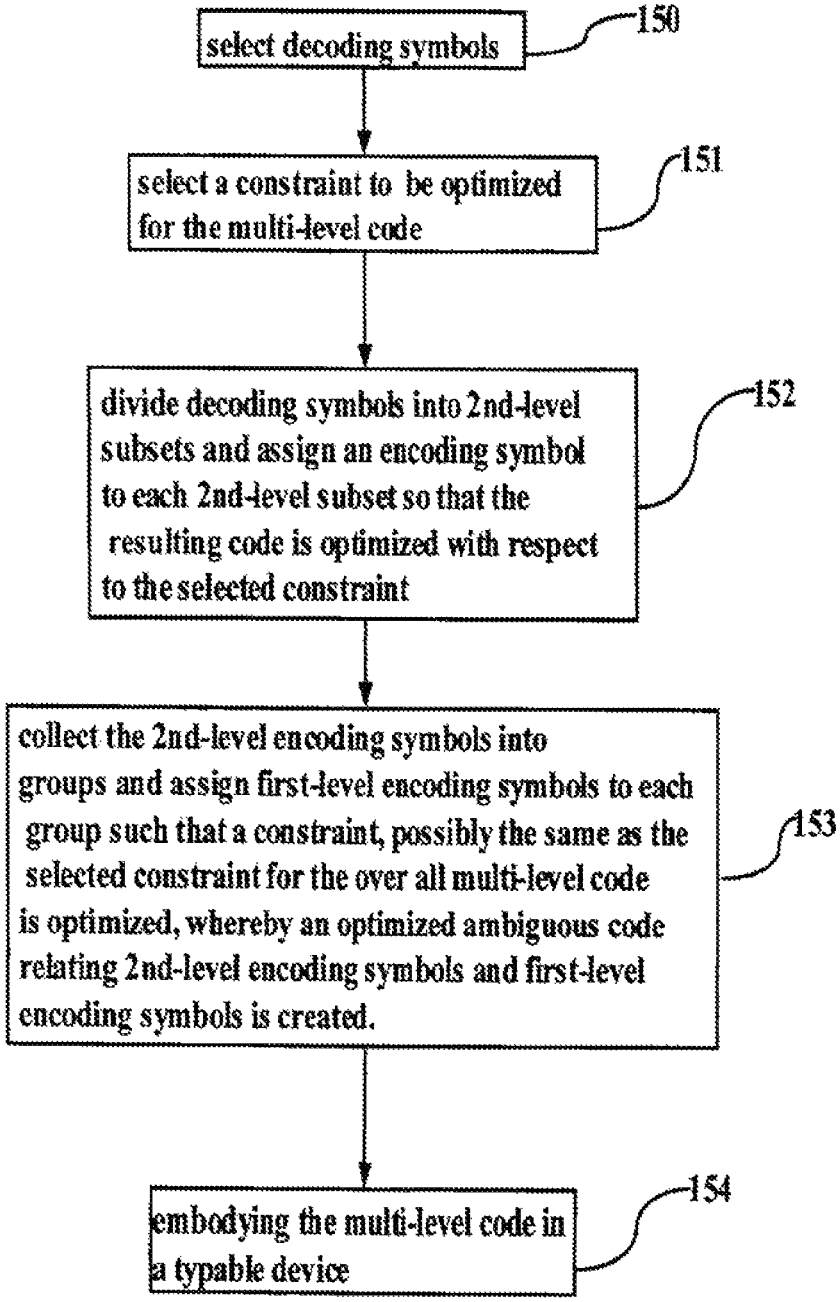

FIG. 40 shows a flow chart for the creation of multi-level strongly touch-typable ambiguous codes.

Figure 41:
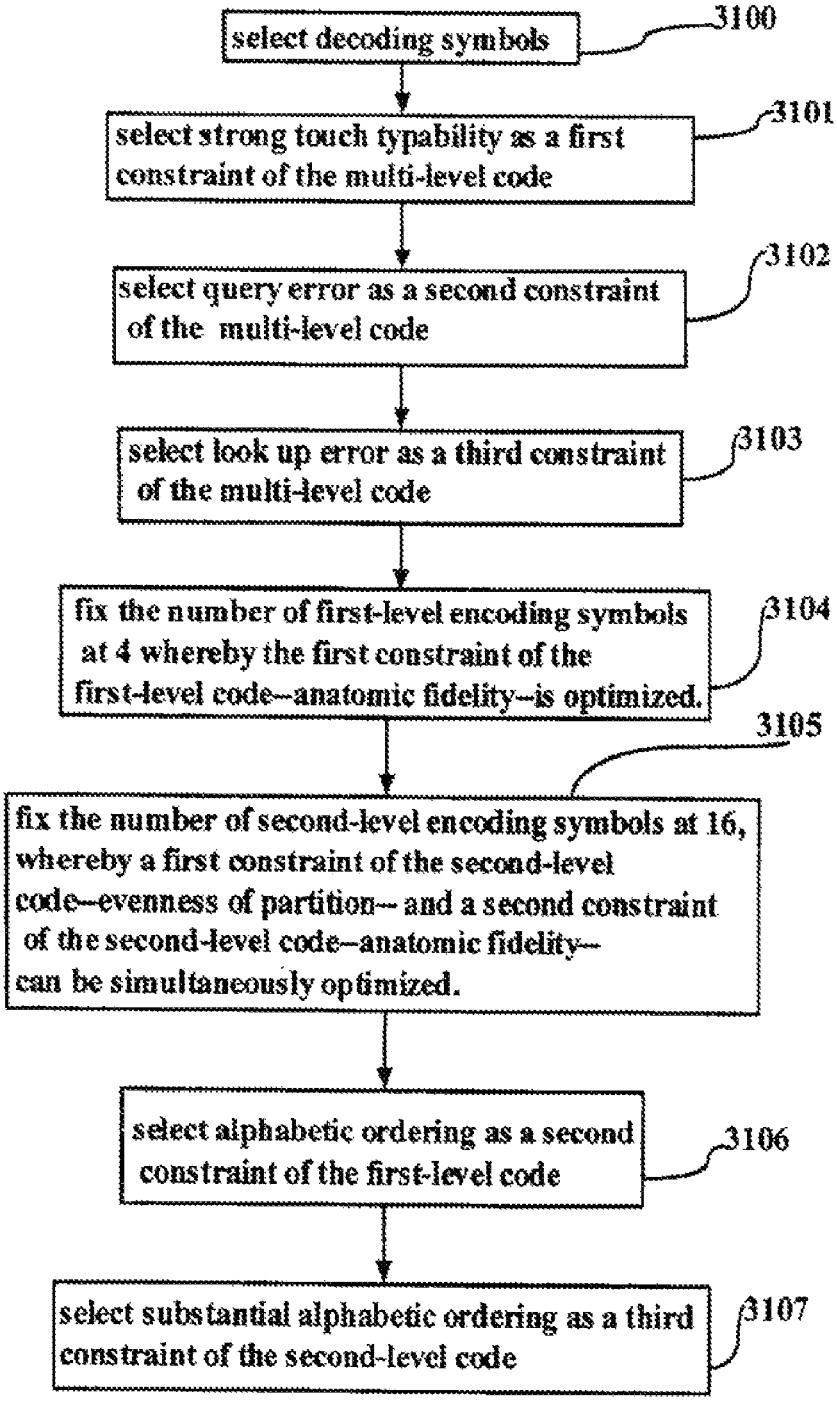

FIG. 41 shows a flowchart for the creation of a specific embodiment of a multi-level strongly touchable ambiguous code.

Figure 42:
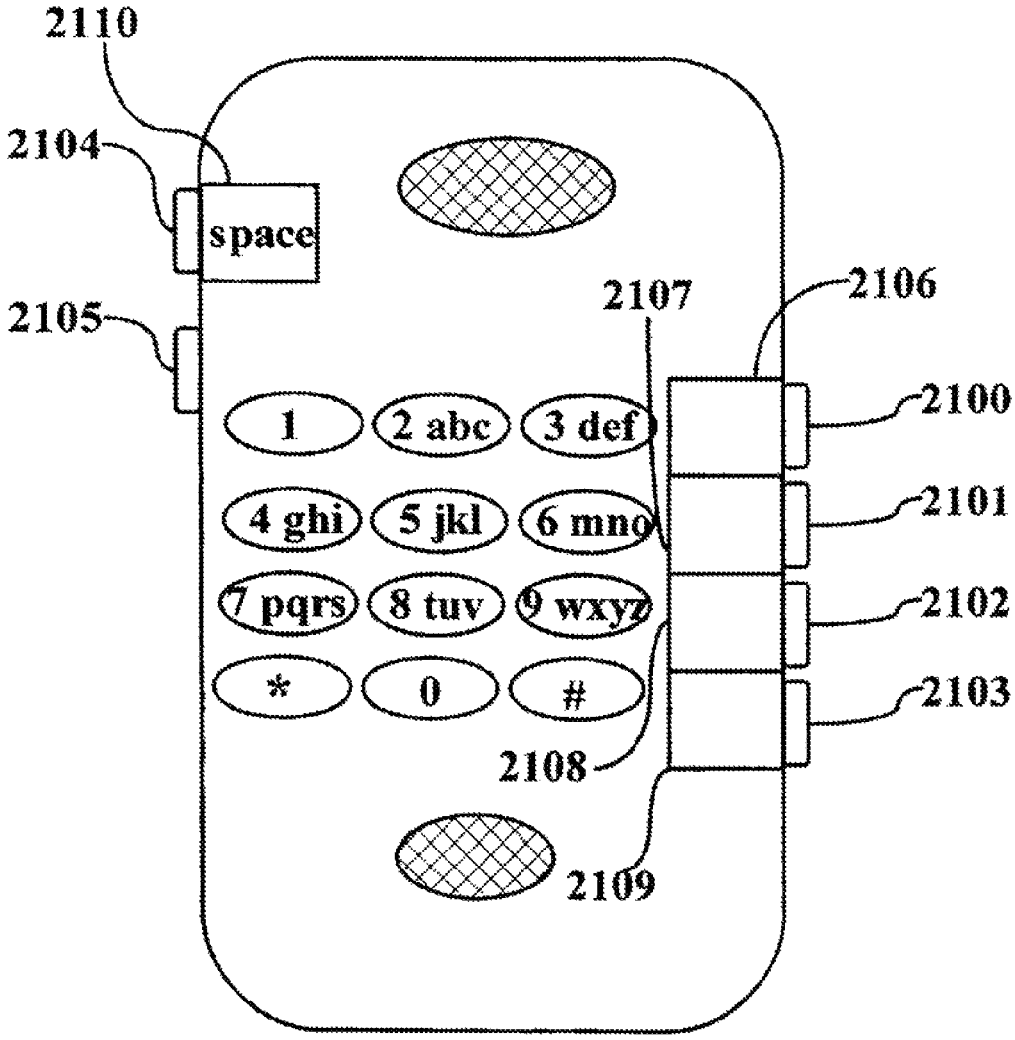

FIG. 42 shows a typable device suitable for implementation of the multi-level ambiguous code of FIG. 41.

Figure 43:
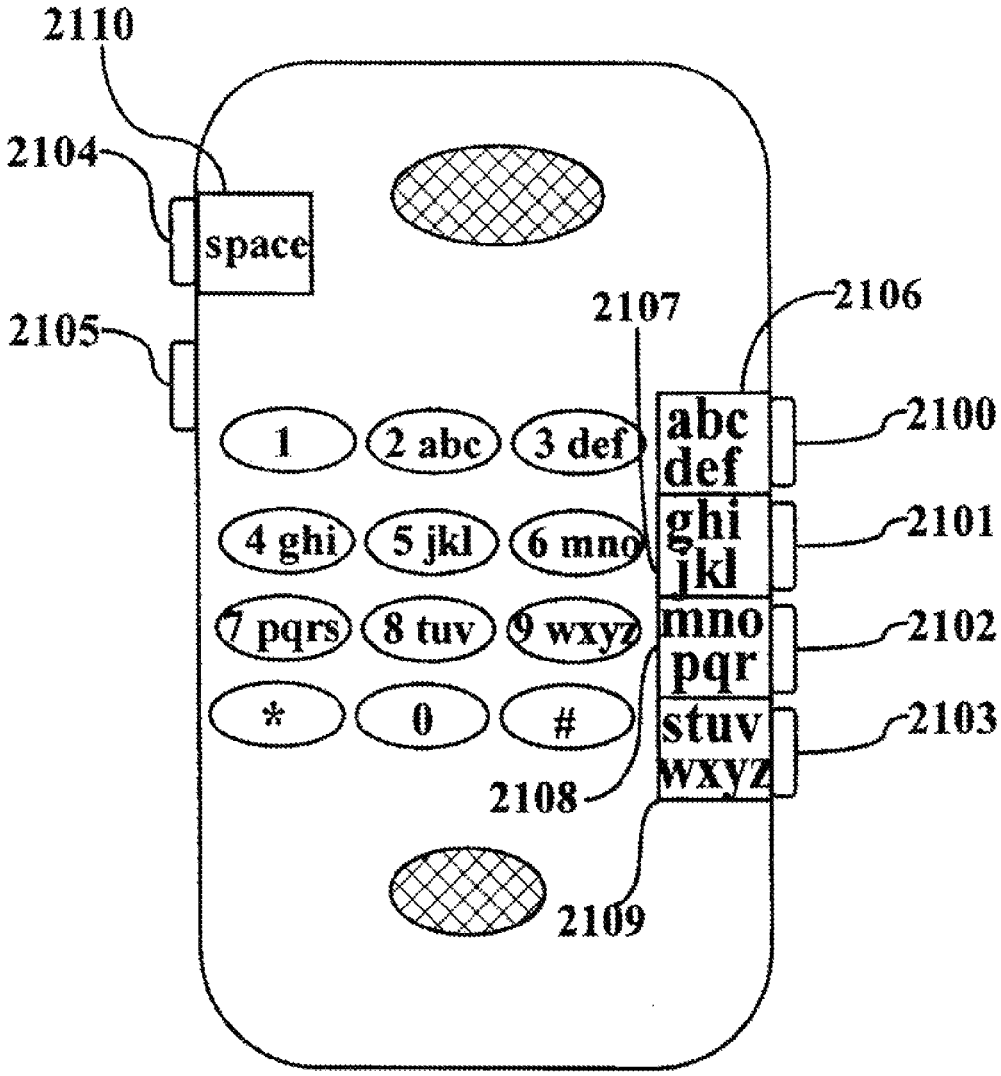

FIG. 43 shows the device of FIG. 42, operating to display the first level of a multi-level ambiguous code.

FIG. 44 shows the second-level code of a multi-level ambiguous code.

Figure 45:
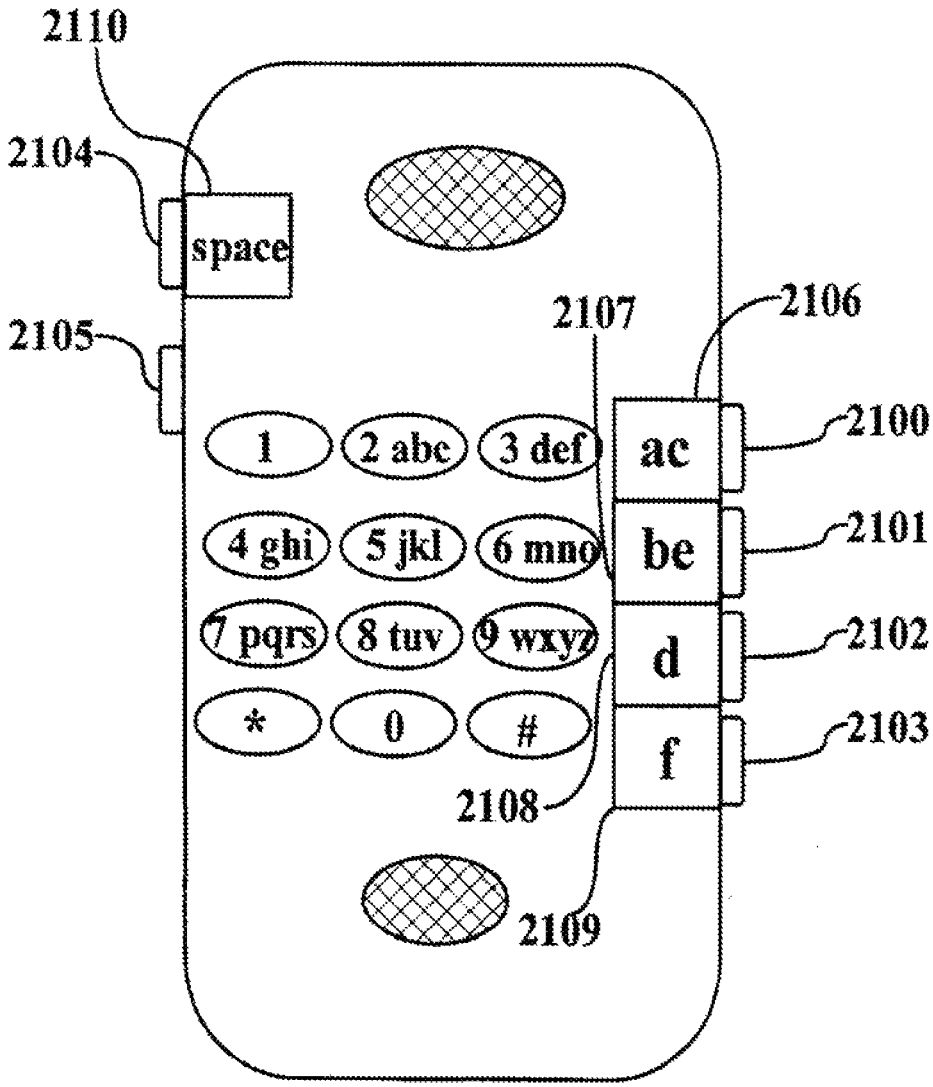

FIG. 45 shows the device of FIG. 42 operating to display part of the second level code of a multi-level ambiguous code.

FIG. 46 shows the sequence of operating states of the device of FIG. 42 while used in combination with a multi-level ambiguous code to type the word "think".

FIG. 47, like FIG. 46, shows the operating states of the device of FIG. 42 while used in combination with a multi-level ambiguous code to type the word "think". In this case, however, the operation of a visual cache to reduce scan time is show as well.

FIG. 48 shows the operation of a unambiguous selector to select the unique alternate of a predicted letter, when there are two letters per key.

Figure 49:
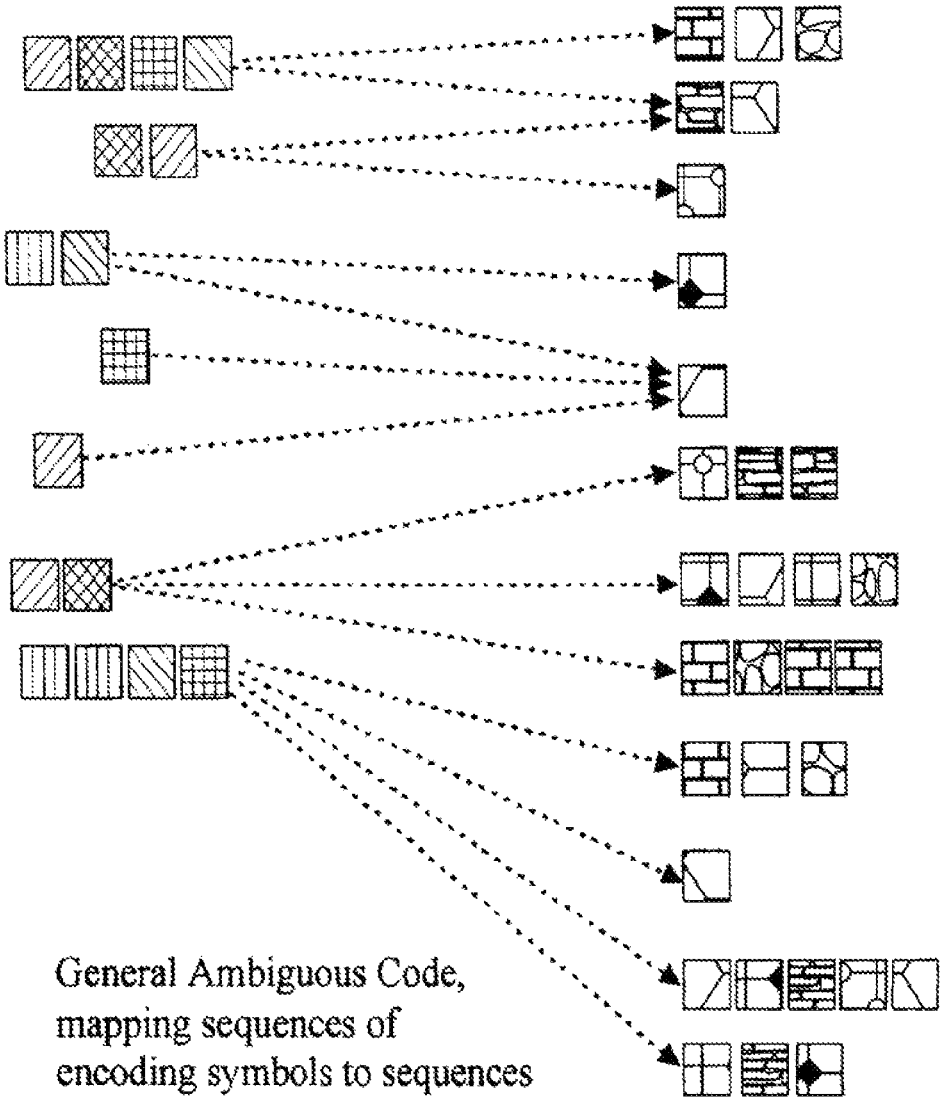

FIG. 49 shows the structure of a general ambiguous code, mapping sequences of encoding symbols to sequences of decoding symbols.

Figure 50:
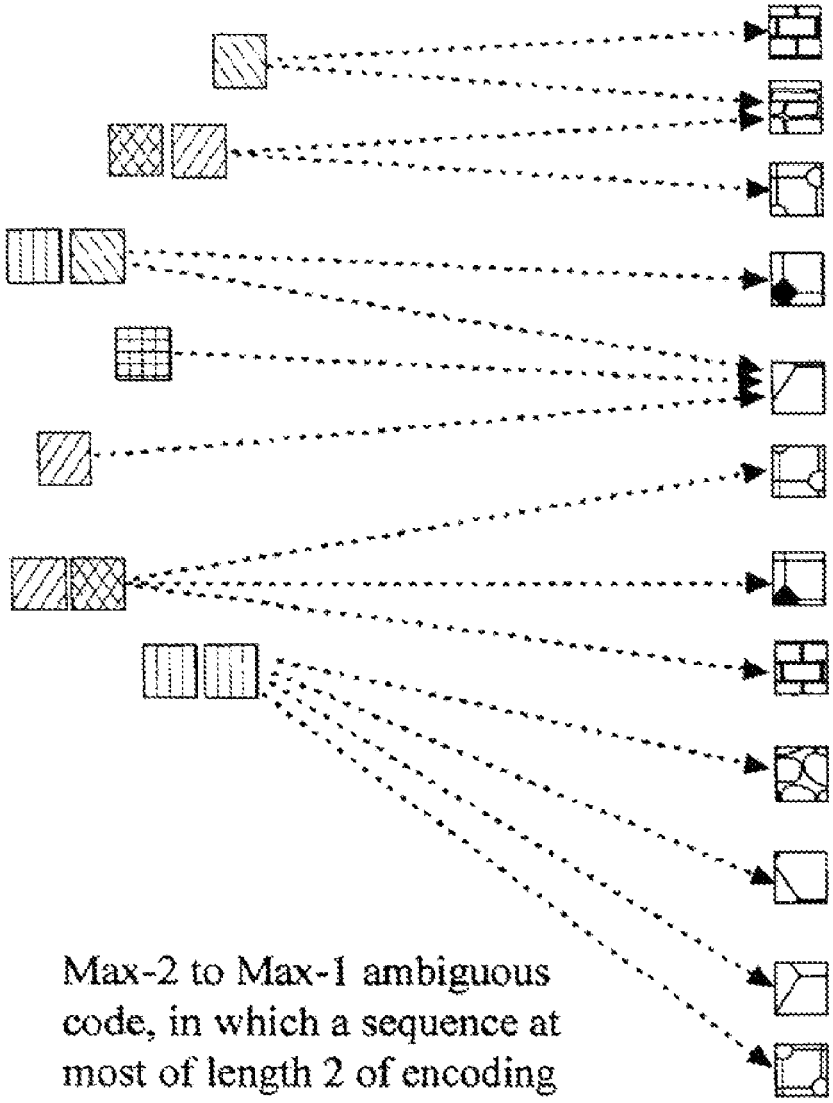

FIG. 50 shows a max-2 to max-1 ambiguous code in which a sequence at most of length 2 of encoding symbols maps to sequences of decoding symbols of length 1.

Figure 51:
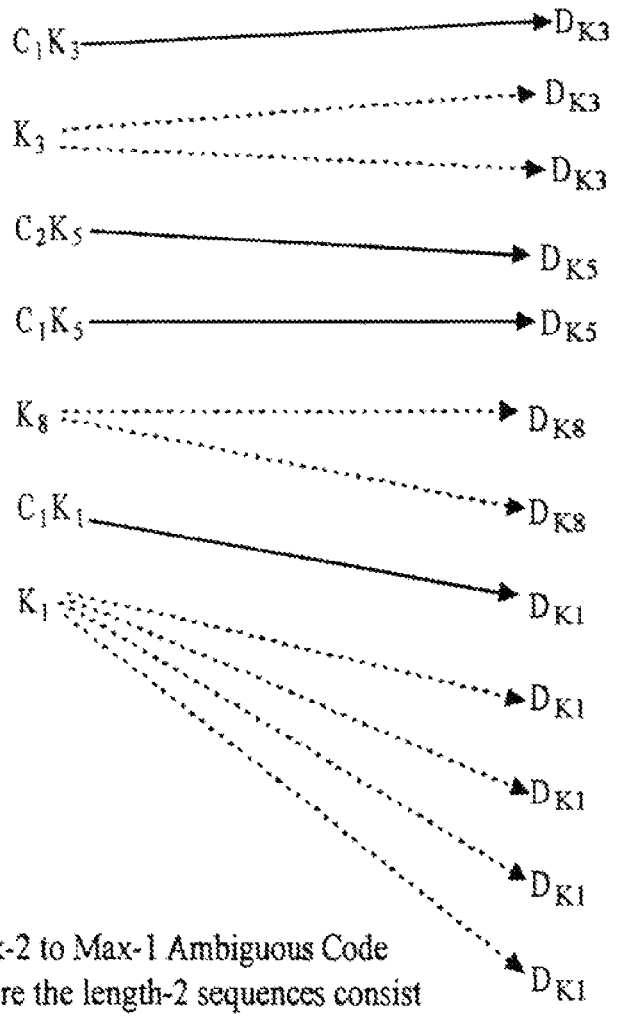

FIG. 51 shows a max-2 to max-1 ambiguous code where the length-2 sequences consist of a combining encoding symbol and a key-assigned encoding symbols; Decoding symbols are assigned to the same key as the encoding symbol with the corresponding index.

Figure 52:
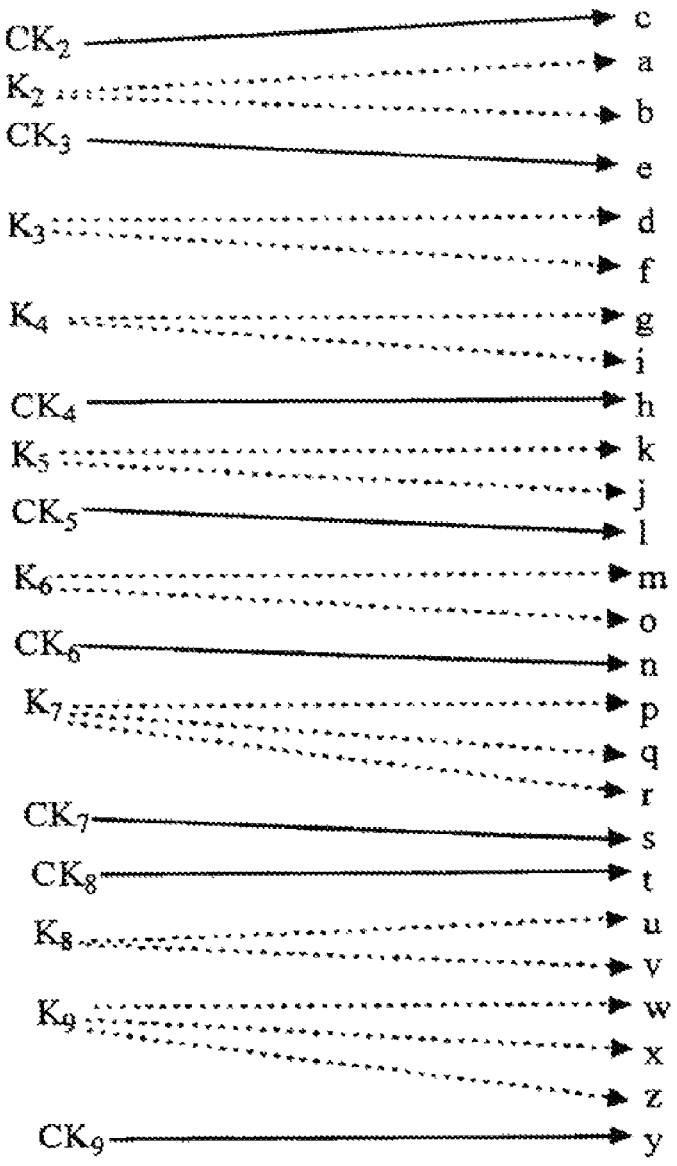

FIG. 52 shows a max-2 to max-1 ambiguous code, where the length-2 sequences consist of a combining symbol and a key-assigned encoding symbol, the decoding symbols are the letters a-z and the explicitly selected letters, selected from the set of letters on each of the keys in the standard telephone keypad, are the letters c, e, h, l, n, s, t, and y.

Figure 53:
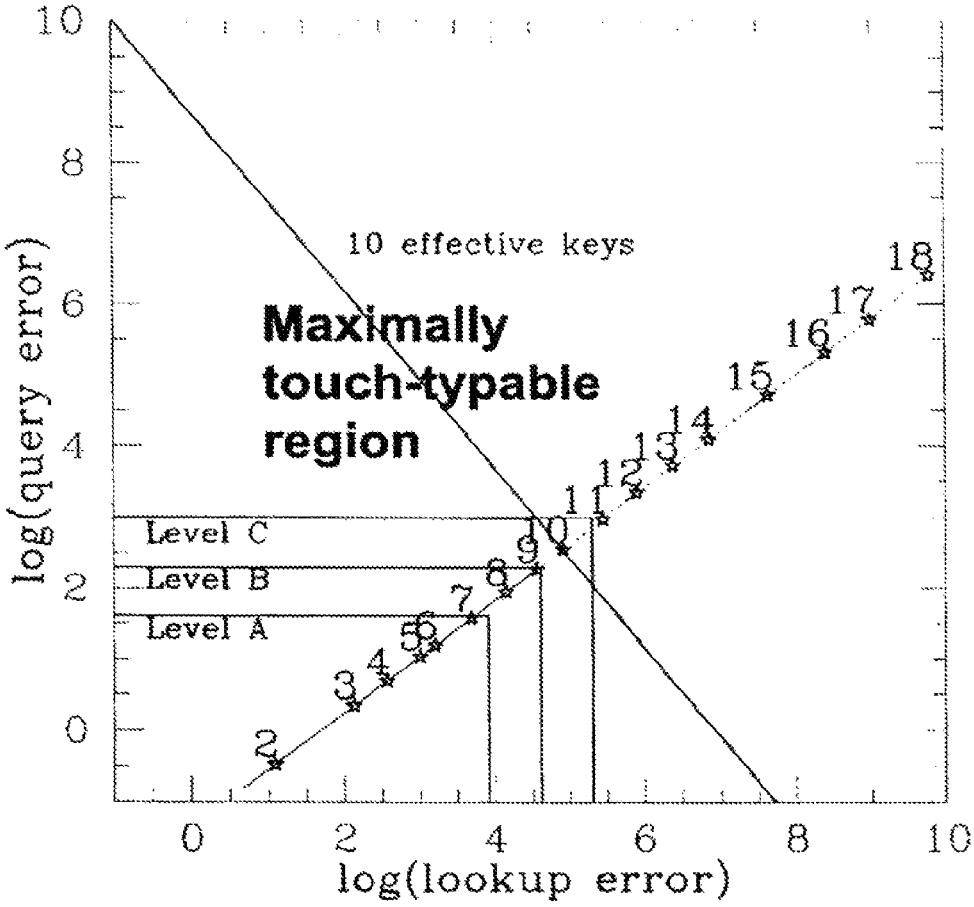

FIG. 53 shows the maximally touch-typable region (shaded) in the lookup error, query error plane.

DETAILED DESCRIPTION OF THE INVENTION

Definitions and Basic Notions

This section collects definitions of words and concepts which will be used in the following detailed specification.

Language Given a set of symbols, one can construct sequences of symbols, and assign probabilities to the sequences. The set of symbols, sequences of symbols, and the probabilities assigned to the sequences will be referred to here as a language. For clarity of discussion, and without limiting the scope of this invention, the languages we will refer to are written natural languages, such as English, and though for concreteness we may refer to symbols as "letters" or "punctuation", it will be understood by those of ordinary skill in the art that symbols in this discussion may be any discrete unit of writing, including standard symbols such as Chinese ideograms or invented symbols such as the name of the artist formerly known as Prince.

Keyboard/Input Means A keyboard is a component of a communications and/or computing device which transforms physical movement by an operator into symbol sequences. Keyboards comprise at least one input means which is responsible for the transformation of some subset of the physical motions operative to activate the keyboard into some subset of symbol sequences.

The physical movement used to operate a keyboard is typically in the form of motion of fingers and/or thumb or of a hand-held stylus. This definition extends to other bodily motions, such as head, tongue, or eye motions which might serve to signal a choice of symbol from the keyboard. A device comprising a keyboard according to this definition will be referred to as a typable device.

By "typable device" we understand not just the physical device containing the keyboard, but the entire communication system in which this typable device is embedded, the limits of that system defined by dependence on the underlying ambiguous coding scheme. In the case of a typable device in which input symbols appear directly on a display which is physically part of the typable device, the limits of the system are clear and defined by the physical perimeters of the device. In more general cases, in which for example the typable device includes a telephone handset sending information to a central computer, the central computer begin responsible for decoding or otherwise acting on the textual information communicated from the handset, then the "typable device" must be understood to include the central computer, as configured to operate in the required manner by software built in view of the teachings of this invention.

It will be appreciated that each of the at least one input means comprised in a keyboard can take a wide variety of physical manifestations. The essential feature of an input means is that it permits an operator to select a subset from the set of symbols to be encoded by the keyboard. With this appreciation, and in order to increase the readability of this present specification, the word "key" will often be used interchangeably with the words "input means".

Typing is the process of sequentially selecting at least one input means in order to select sequences of subsets of symbols from the set of symbols which can be encoded by the keyboard. It is to be appreciated that well-known handwriting recognition software permits a kind of typing in which the input means translates a collection of drawing motions into the selection of a subset of a set of symbols.

Touch typing is the process by which the symbol sequences are generated from the keyboard using only or predominately kinesthetic rather than visual or auditory feedback.

Strongly correlated symbols and symbol sequences It is well known that different letters appear in words with different frequencies. For instance, in the previous sentence, the letter "e" appeared 11 times, while the letter "z" did not appear at all. This is also true of pairs of letters, triples of letters, and so on. It is a related fact that words do not all occur with the same frequency. The 3-letter word "the" is very common in English, while the 3-letter word "zap" is rather uncommon. These statistical irregularities can be used in the design of ambiguous codes. Indeed, statistical irregularities have been exploited in keyboard design at least since the invention of Qwerty.

We are particularly concerned with symbols and symbol sequences whose distribution in typical samples of text is substantially strongly correlated with the distribution of other symbols or symbol sequences, such symbols will be called strongly correlated symbols. For example, the symbol "." often used in English and other languages to indicate the end of a sentence may be a strongly correlated symbol since the distribution of sentence length is not random in typical text. In Hebrew, the symbol "." is correlated as well with particular letter symbols since Hebrew uses a different symbol for some letters occurring at the end of a word, and ends of sentences are correlated with ends of words.

Reference Statistics The reference statistics on symbols sequences used to measure the correlation between symbols are typically estimated by analysis of a reference corpus. A reference corpus is a large collection of text chosen to represent some aspect of language. As is well known to linguists, there are significant, fundamental problems in constructing corpora to represent general features of a language, as opposed to features pertaining to particular classes of text or particular types of writers. These problems are beyond the scope of the present invention. Here we refer throughout to a set of reference statistics gleaned from analysis of the British National Corpus, one of the largest corpora existing at the present time for analysis of English. Choosing a corpus is a necessary step toward gathering results which permit various methods and embodiments to be compared. Nothing in this particular choice should be construed as limiting the scope of this invention. In particular, the choice of a corpus of English language texts is an arbitrary choice. The same analysis could be performed for any other written natural language.

Encodings and Decodings In the United States, the keys on a telephone keypad are often labeled with letters as well as numbers, typically with the key corresponding to the number 2 also corresponding to the letters a, b, and c, the key corresponding to the number 3 also corresponding to the letters d, e, and f, and so on in the standard ordering of letters in English.

Thus, the sequence of key presses associated to the digit sequence 233 also corresponds to the letter sequences add, bee, and bed, all of which are English words, as well as various meaningless letter sequences such as cff. Here, a sequence is considered to have meaning if it appears in a reference list of meaningful sequences. Thus all of these letter sequences, meaningful or not, are associated with the same digit sequence. We will say that the sequence of key presses 233 is an encoding and the sequences add, bee bed, eff and so on are decodings of the encoding 233. When no confusion will arise, "decodings" may be used to mean "meaningful decodings". The set of symbols used in decodings, in this example, letters in the alphabet, will be referred to as decoding symbols, or simply symbols if no confusion will arise, and the set of symbols used in encodings, in this example, digits, will be referred to as encoding symbols.

Ambiguous codes Ambiguous codes as such are well known in the art. On the standard telephone keypad used in the United States, there are 12 keys, 10 of which encode a digit, and several of these, typically 8, encode in addition 3 or 4 letters of the alphabet, arranged in alphabetic order. These assignments produce an ambiguous code which we will call the standard ambiguous code. This code is abc def ghi jkl mno pqrs tuv wxyz.

Since several letters are encoded on each key, some method of disambiguation must be used to decide which of the several letters is intended by the operator. In typical applications, such as a voice response system, the intended letter is found by comparing the input sequence with a list of stored responses. In the event that several of the stored responses correspond to the input sequence, the user is presented with a list of these responses, from which he or she must choose. The order in which these choices are presented may be arbitrary, or may depend on the frequency by which each response is the correct response, with the responses presented in decreasing order of frequency.

Standard keyboards. There are essentially three standard keyboards in wide use: the Qwerty keyboard and its close variants, the 12-key telephone keypad and the typically 17-key numeric keypad and its close variants. It is a unique advantage of this invention to provide keying methods useful both on the standard telephone and numeric keypads, as well as on a specially designed keypads disclosed here in.

Strong touch typability A device with fixed symbol assignments is a device in which the assignment of symbols to keys is essentially fixed; only relative to such a device can a typist develop physical reflexes for encoding particular symbols using particular motor patterns. We will say that a typable device is strongly touch typable if it 1) has fixed symbol assignments, 2) is based on an amoiguous code, and yet 3) such that in a normal mode of operation, a touch typist can use the typable device to produce text at an acceptable level of accuracy.

Strong touch typability is a matter of degree; it is a measure of touch typability which depends on a host of factors, some pertaining to the individual typists, some pertaining to the uses to which the typable device will be typically put, and some pertaining to the structure of the typable device it self. Even for a given typist, a given typable device may be sufficiently strongly touch typable for some typing tasks, but not for others.

It is to be appreciated that the accuracy of the text produced depend on a number of factors, including:

the disambiguation means, the context of the use of the machine, for instance while driving or while sitting at a desk, the kind of text to be typed, which determines in part the level of accuracy required, the reference statistics, the skill of the individual typist, individual preferences, and the means by which the attention of toe user is drawn to the disambiguation mechanism (for instance, a voice-synthesis mechanism which speaks the words or words in a query to the user may or may not be more distracting than a bell or a flashing light).

Though strong touch typability, like temperature, is a mailer of a degree, it is, like temperature, perfectly well-defined. The strong touch typability of a typable device can be quantitatively measured, with respect to any user or group of users, once these various factors are fixed, using standard experimental protocols, well-known to those skilled in the art. Furthermore, two aspects of strong touch typability can be measured directly from an ambiguous code: lookup error and query error. Thus, numerical values of strong touch typability can be assigned without any direct reference to a population of users, but only with reference to the ambiguous code in question.

Like temperature, there is a lower bound to strong touch-typability. It is clear that a device which requires user intervention after every word or even after every three words in order to disambiguate cannot be considered strongly touch-typable with respect to any typist engaged in any task. The lower bound of strong touch typability can be expressed in terms of continuity of attention. If a user's attention must be substantially continually focused on the operation of the disambiguation mechanism to produce acceptable text then the device is not strongly touch typable.

The practical lower bound of strong touch typability pertains to a user of average skill in the art of touch typing, and is higher than the theoretical lower bound just described. In order to bring numerical as well as conceptual precision and definiteness to the inventive notion of strong touch typability, numerical values are assigned to strong touch typability in terms of values of lookup error and query error. This numerical characterization serves to further distinctly point out the differences between the inventive methods and devices of the present disclosure and all prior art methods and devices.

A strongly touch typable ambiguous code is an ambiguous code on which strongly touch typable devices may be based.

Feedback Devices In devices which permit the user to intervene at various points in the decoding of symbol sequences generated using ambiguous codes, some manner of sensory feedback to the user is required. Typically, this feedback will be in the form of a graphical representation of symbols, however, feedback could take many forms, such as auditory, tactile, or even olfactory or gustatory.

Constraints Design of keyboards implementing ambiguous codes involves satisfying many constraints. These may include reduction of lookup error rate, reduction of query error rate, selection of a number of keys consistent with the size of the desired keyboard, compatibility with existing keyboards such as the Qwerty keyboard, phone keypad, or numeric keypad, regularity of partition structure, anatomic fidelity, conservation of conventional gestures, learnability, minimal mode-changing key use, partition structure, compatibility between one- and two-handed typing, and conservation of conventions such as alphabetic ordering. Other constraints include: the ergonomics of disambiguation mechanisms, the ergonomics of the encoding of weakly correlated symbols, look-and-feel, and availability of computing resources at the sending and receiving ends of a communication system utilizing ambiguous codes.

Lookup Error measures the error committed by a disambiguation mechanism which disambiguates by systematically selecting the most-probable (meaningful) decoding from the set of possible decodings of an ambiguous sequence. Thus, the lookup error rate of a code is the sum, over all possible decodings which are not the most probable decoding of an ambiguous sequence, of the reference probability of the possible decodings. In the case of word-based disambiguation, these sequences begin and end with a "space" symbol, that is, are words. Lookup error is the probability that the most-likely decoding is not the correct one. The lookup error is conveniently expressed as a rate, the lookup error rate, in units of words per lookup error. The lookup error rate is the reciprocal of the lookup error probability.

Query error is the sum, over all (meaningful) decodings which are not unique (meaningful) decodings, of the reference probability of said decodings. This gives the probability that a given word will have more than one meaningful decoding, and therefore a query must be made of the user as to decide which of these decodings to use. The reciprocal of the query error is the query error rate, expressed in units of words per query. The query error rate gives the average number of words entered between queries.

Substantial Optimality A code will be said to be substantially optimal with respect to a property if it is among the best codes with respect to that property given other constraints imposed on the code. For example, a code on 20 keys may have a lower value of the lookup error rate than a code on 2 keys, and yet the code on 2 keys may be substantially optimal with respect to the lookup error rate given the constraint that the code be on 2 keys. Substantially optimal constrained codes will be defined as codes which are simultaneously substantially optimal with respect to each of a collection of constraints. Such constraints include but are not limited to key number, lookup error rate and query error rate. For these three constraints, pairs of constraints are correlated. Lookup error rates tends to increase with query error rate, and both lookup error and query error rates tend to increase as key number decreases. The best value possible for a given constraint when this given constraint is the sole optimization constraint may be better than the best possible value obtainable when some other constraint must be optimized as well. Thus, the constraints relevant to a given design must be decided upon and their importance weighted as an initial step of the optimization methods taught by this invention.

It is to be emphasized that the optimality of an ambiguous code cannot be discussed in the absolute, but must be evaluated relative to a set of reference statistics for the language to be encoded. Indeed, given any ambiguous code, it is possible to construct a set of statistics such that code is optimal with respect to the constructed statistics.

Given a set of reference statistics, an estimate of the optimality of a given code can be obtained from experiments comprising the generation of random codes, as well be discussed in more detail below.

Disambiguation Methods Substantial optimality for ambiguous codes is well defined only in reference to a chosen disambiguation method. A code which is substantially optimal with respect to one disambiguation method may not be substantially optimal with respect to another method of disambiguation.

At least two disambiguation methods are well known in the art. These are word-based and context-based disambiguation. In word-based disambiguation, a list of words along with their probabilities is used to choose among alternate decodings of a given encoding in the ambiguous code. For instance, all words in the list which are meaningful decodings of a given encoding may be compared, and the word with the largest probability selected. Block-based disambiguation is similar, except that the list contains fragments of text up to some size, along with the probability of the fragments.

Both word-based and context-based disambiguation methods are special cases of a more general framework, which we will call sequence-based disambiguation, in which a database of sequences of encoding symbols and of decoding symbols is associated with a probability, and disambiguation is effected by reference to this database. It is to be noted that the "space" symbol which defines word boundaries in languages such as English is for the purposes of this discussion no different from any other unambiguous symbol. One can define a list of sequences and sequence probabilities in which said sequences include the "space" symbol, and thus extend beyond word boundaries. One can go further and define sequences which include a wildcard symbol and thus define lists of sequences which contain arbitrary subsequences, which subsequences may or may not correspond to words in the language. In this way, arbitrarily complex representations of a language can be built up, and can be used in a disambiguation method. For instance, syntactic and semantic relationships between subsequences can be brought in to resolve conflicts between possible interpretations in terms of decoding symbols of an ambiguously coded sequence of encoding symbols. For clarity, we focus this specification on well-known word-based disambiguation, unless otherwise specified. It will be appreciated by those skilled in the art that the methods taught by this invention do not depend on word-based disambiguation; any other disambiguation method can be used.

Partitions A partition of an integer n is a set of integers such that the sum of the elements of the set is equal to n. Typically, a given integer admits many partitions, e.g. the integer 5 has the partition 3:2, but also the partition 2:2:1. Algorithms for generating all the partitions of an integer are well known to those skilled in the art. Most prior art codes use an even-as-possible partition. That is, a partition in which, to the extent possible given the number of keys in relation to the number of letters to be encoded, the number of letters per key is the same. As will be further expanded below, this choice is a sensible choice with respect to some constraints, it may be sub-optimal with respect to others.

There are two genera of ambiguous codes for which exclusive rights are herein claimed. These are 1) strongly touch-typable ambiguous codes, and 2) substantially optimal ambiguous codes. Ambiguous codes may be substantially optimal but not strongly touch typable, strongly touch typable but not substantially optimal, neither substantially optimal nor strongly touch typable, or both substantially optimal and strongly touch typable.

The disclosure begins by pointing out how to make ambiguous codes in both of these genera, and identifying whether a code is contained in either of the genera. It then explains how to use codes in both of these genera to make typable devices, and how these codes may be used to solve various design problems confronting the designer of typable devices.

The best mode for practicing this invention depends on the constellation of design constraints which are to be optimized according to the teachings of the invention. Thus, several particular, practically relevant and useful, situations are chosen to illustrate the range of the methods and devices taught by the present invention.

The range of machines which can be built by persons skilled in the art according to the teachings of this invention extends considerably beyond the specifics of the preferred embodiments presented herein. Various extreme or particular cases of design constraints are solved in these embodiments. Given the teachings embodied in these cases, it will be clear to one skilled in the art how to combine features appropriately in order to solve intermediate or hybrid design problems.

One embodiment is optimized with respect to lookup error rate exclusively. This embodiment is designed for a machine with limited memory and computing power, such as a smart card. With such a machine, computing resources may not be available to support a complex querying mechanism for user activation of disambiguation.

Thus this machine uses one of the simplest possible disambiguation mechanisms, which comprises systematic selection of the most-probable decoding symbol sequence corresponding to any given encoding symbol sequence.

Another embodiment is optimized with respect to query error rate exclusively. This embodiment is designed for use by the driver of a vehicle, such as an automobile. Though computing power may be available to support a complex querying mechanism, use of such mechanism should be kept to a minimum, so as to distract the driver as little as possible from driving.

A next embodiment provides a phone keypad optimized with respect to both lookup error rate and query error rate, and which is compatible with the layout of standard telephone keypads.

Another embodiment is optimized with respect to the constraint of conservation of a convention-:

preservation of alphabetic order.

Letters are arranged on the standard touch-tone keypad in alphabetic order. It is possible to preserve the alphabetic ordering of the conventional telephone keypad and yet reduce lookup and query error rates by optimizing over partitions.

Optimization over partitions leads to an additional embodiment in which keyboards with substantially optimal query and lookup error are exhibited which preserve as well as possible the conventional Qwerty keyboard arrangement.

A further embodiment illustrating the design of keyboards which correspond as well as possible to conventional designs is a keyboard based on an ambiguous code which conserves the key layout and numeric labels of a numeric keypad.

For many applications, a keyboard which can be ergonomically operated in both an ambiguous and a non-ambiguous fashion is desired. To this end, it is preferable to chose ambiguous codes on a number of keys which nearly divides the number of symbols to be encoded, permitting a nearly even-as-possible partition of symbols with respect to keys A number of keys equal to ½ the number of symbols is particularly preferred. The desirable consequences of this preferred choice are exhibited by this next embodiment.

Another embodiment shows how keyboards can be optimized for cross-platform compatibility. In this embodiment two keyboards, a one-handed keyboard and a two-handed keyboard, are designed to be operated in potentially rapid alteration, in such a way that touch-typing motions used to operate one of the keyboards transfer seamlessly to touch-typing motions used to operate the other keyboard. This keyboard has the additional advantage of having the potential to reduce typing injuries, as well as other objects and advantages, as will be described in the detailed specification.

The above-mentioned embodiments taken together show that different keyboard uses imply different kinds of optimality, which, since a given user may need keyboards for several different uses, in turn implies that mechanisms must be provided for several different solutions to co-exist in a single device. A surprising solution to this problem, made possible by the small typable device sizes achievable with ambiguous codes, is the twice-foldable personal digital assistant described in this embodiment.

The embodiments discussed up to this point involve both hardware and software specification. However, it is possible to achieve many of the objects of this invention using a purely, or predominantly, software solution. An example software solution is worked out in detail to show how specifics of existing hardware can be incorporated using appropriate software to achieve some of the objects of this invention.

A final set of embodiments synergistically unites, for the first time, two alternative approaches to producing keyboards with a small number of keys: chording methods and ambiguous-code methods.

First it is shown that by ergonomic construction of chording patterns, coupled with optimization of lookup error rate and query error rate, an ambiguous code on n keys can be made to behave like an ambiguous code on m substantially larger than n keys. When, in particular, this method is applied to the standard ambiguous code, the 8 letter keys of the standard ambiguous code gain the properties of substantially optimal codes without chording on 13 keys. Comments on how to extend ambiguous code creation discussed throughout with reference to English can be extended to other languages. For concreteness, this discussion is carried out with respect to this embodiment, but the comments apply generally to all embodiments.

Second, it is shown that combining a divide and conquer method with the methods exemplified by the previous embodiment, the number of input means can be further reduced, in this example, 4 input means are used to operate an ambiguous encoding with 16 elements. The number 4 is chosen so that a handheld device embodying this code can be operated using the fingers and thumb of the hand holding the device.

Figure 1:
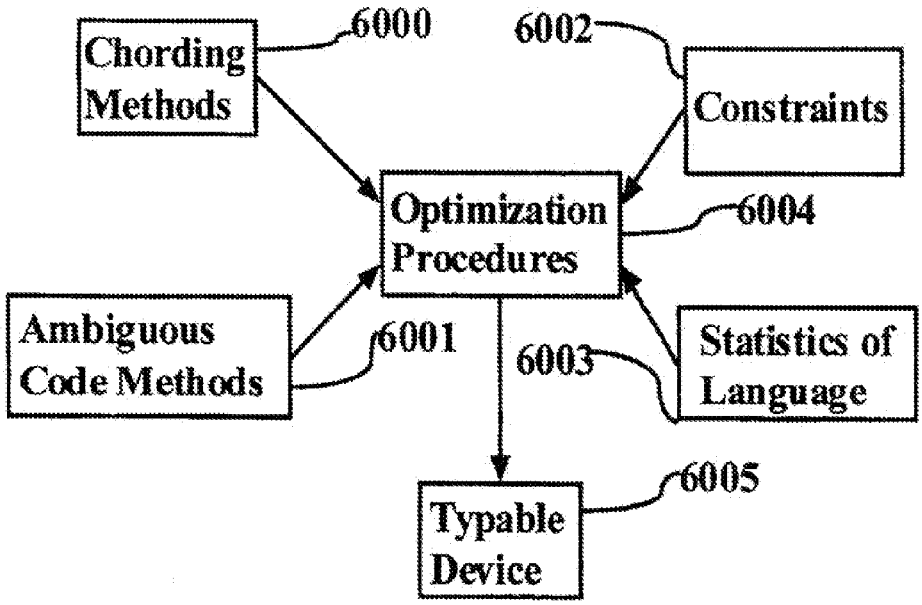
FIG. 1 shows an overview of the optimization considerations for producing a typable device according to the present invention.
Figure 2:
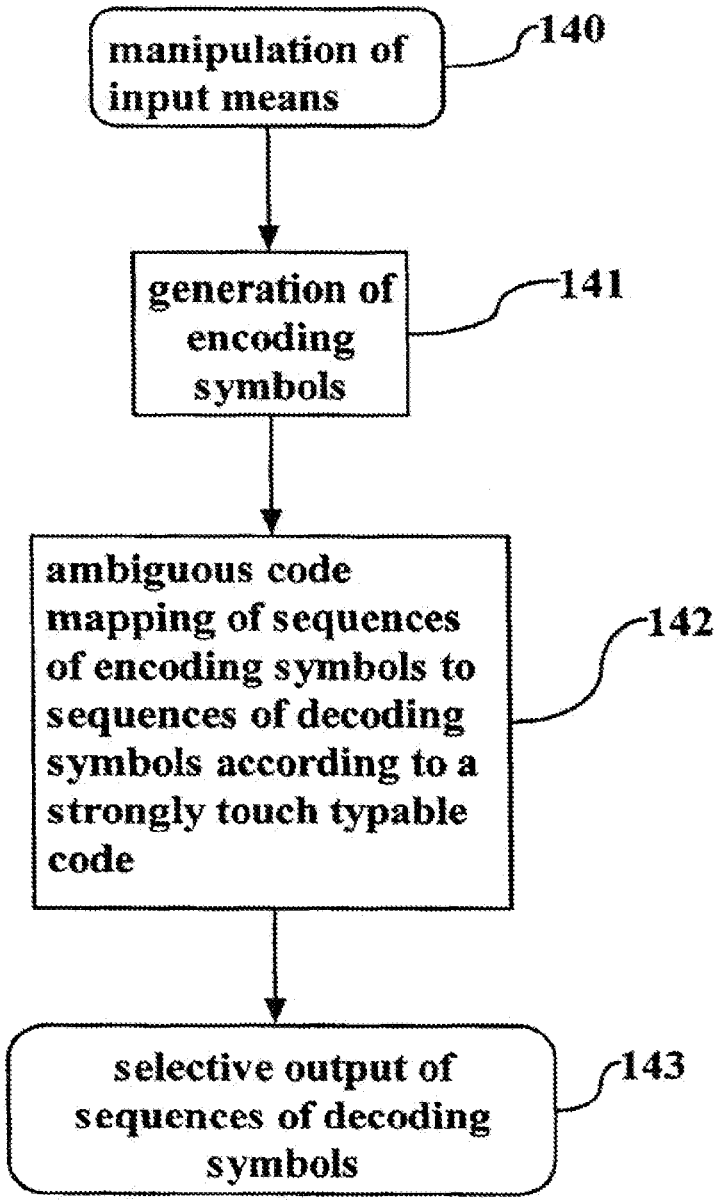
FIG. 2 shows a flowchart for the construction of devices based on strongly touch typable ambiguous codes.

Operational overview of a strongly touch typable device. FIG. 2 shows an operational overview of a strongly touch typable device based on an ambiguous code. Such a device possesses input means, the activation of which by a user 140 causes sequences of encoding symbols to be generated 141. A strongly touch typable ambiguous code, by referencing a database of sequences of encoding symbols paired to sequences of decoding symbols, is used to map these sequences of encoding symbols to sequences of decoding symbols in step 142. These sequences of encoding symbols may then be selectively output, either on a display for direct observation by the user of the device, or in some electronic form for further processing, transmission, or storage 142.

It should be pointed out that the ambiguous code of the device of FIG. 2 might also satisfy other constraints in addition to strong touch typability.

Figure 3:
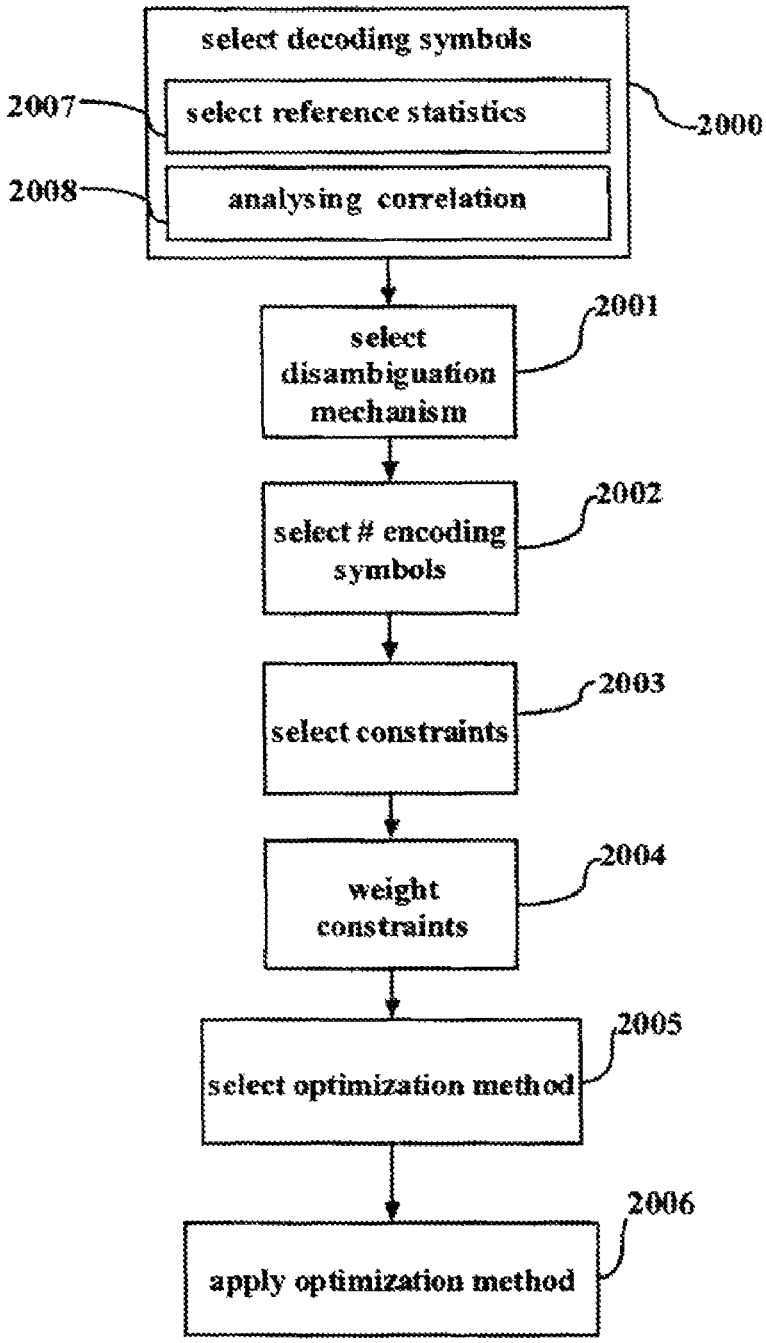
FIG. 3 shows a flowchart for the construction of ambiguous codes satisfying at least one constraint, and optimized with respect to these constraints.

Construction of substantially optimal codes The methodological steps to optimize an ambiguous code with respect to a set of constraints are explained in reference to FIG. 3. In summary, the steps are as follows:

2000 selecting a set of statistically correlated decoding symbols to be represented in an ambiguous code, comprising the sub steps of

2007 selecting a set of reference statistics,

2008 analyzing the statistical correlation of symbols relative to the statistics selected in step 2007

2001 selecting a disambiguation method.

2002 selecting the number of encoding symbols.

2003 selecting the constraints with respect to which the code should be substantially optimal.

2004 weighting the importance of the constraints selected in step 2003.

2005 selecting an optimization method.

2006 applying the optimization method selected in step 2005, whereby substantially optimal ambiguous codes are produced.

It will be appreciated that the steps 2000 through 2003 might be applied in any order, and that the application of one of these steps could influence the choices at other of these steps. Details regarding the application of these steps will now be explained.

Step 2000 selecting a set of statistically correlated symbols to be represented in an ambiguous code. This step is comprised of the substeps of 2007 selecting a set of reference statistics, and 2008 analyzing the statistical correlation of symbols relative to the statistics selected in step 2007. The goal of these steps is to identify those symbols which are capable of being represented ambiguously. All disambiguation methods work by exploiting correlations between symbols to make predictions about which sequence of decoding symbols should be associated with a given sequence of encoding symbols. If a decoding symbol is distributed randomly throughout all texts to be encoded, then it cannot be represented in an ambiguous code, since no predictions can be made about a randomly distributed symbol. Typically, for any natural language, the symbols used to encode that language (for instance, letters in the case of English, ideograms in the case of Chinese) are sufficiently statistically correlated that an effective ambiguous code for these symbols can be designed. There may be other symbols, such as punctuation symbols, which are significantly statistically correlated with each other, and with the letters or ideograms used to write the language. The fine details of steps 2007 and 2008 depend on the natural language to be represented. Analysis of statistical correlation of symbols used in written natural language is a well-known art to linguists.

Step 2001, selecting a disambiguation method. As has already been mentioned, there are currently at least two well-know methods of disambiguation, context-based and word-based disambiguation. Both of these methods use statistical context of symbols to make predictions about which sequence of decoding symbols to set in correspondence with a given sequence of encoding symbols. Both context-based and word-based methods can be augmented though use of higher-level information about a language, such as its syntax and semantics. The goal of this present method is to construct an ambiguous code such that, relative to the selected disambiguation method, optimal selection of a decoding sequence to correspond to each encoding sequence. Therefore, the details of the selected disambiguation method can influence the detailed nature of the ambiguous code to be thus designed. This method will be illustrated with respect to the selection of word-based disambiguation as the disambiguation method, though other disambiguation methods will also be discussed.

Step 2002, selecting the number of encoding symbols. The selection of the number of encoding symbols is crucial to the design of a typable device based on ambiguous codes. This selection is made in view of many factors, including the size of the typable device and the acceptable level of ambiguity. These factors and their interplay are best explained in reference to concrete examples; such examples are taken up later in this disclosure.

Step 2003, selecting the constraints with respect to which the code should be substantially optimal. An essential aspect of this invention is the discovery and definition of several constraints which determine the quality of a typable device based on ambiguous codes. These constraints include strong touch typability, lookup rate, query error rate, anatomic fidelity, conservation of conventional gestures, conservation of conventional layouts, partition structure, cross-platform compatibility, regularity of layout, and scan rate. Depending on the application, one or more of these constraints may be relevant to the design of a typable device.

Step 2004, weighting the importance of the constraints selected in step 2003. When more than one constraint is relevant to the design of a typable device, some weighting of the importance of these constraints must be decided upon. It is rarely the case that the same optimum with respect to a given constraint can be optimized as well in isolation as when it is optimized also with respect to other constraints.

Step 2005, selecting an optimization method. Two optimization methods will be discussed in more detail below, random selection, and directed random walk. of the two, random selection is typically easier to implement, yet directed random walk produces better codes. These two methods are representative of a large class of methods which might be appropriate for the design of a given typable device. In some cases, for instance the first chording/ambiguous code device considered below, the number of codes to be examined is small enough that all of them can be checked exhaustively.

Step 2006, applying the optimization method selected in step 2005, whereby substantially optimal ambiguous codes are produced. Regardless of the optimization method selected in step 2005, some skill must be used when applying the method to produce substantially optimal ambiguous codes. In particular, when an optimum is required with respect to several constraints at once, it is preferable to consider each constraint first in isolation, whereby an estimate can be made of the code quality ultimately achievable. This estimate can be invaluable for fine-tuning the optimization process, as will be discussed in more detail below.

Random Search The basic method for finding a code with good properties is to choose codes at random, test their properties, and select those which have the best properties. Exhaustive enumeration, in which all codes in the candidate set are tested, is typically not a viable option since the number of codes is too large to be tested in any reasonable amount of computer time.

Random search provides a benchmark by which the utility of other methods of code selection can be measured. Suppose that a set of constraints, and a weighting on those constraints is given. One can estimate the substantial optimality of a first ambiguous code with respect to those constraints and those weightings by generating additional ambiguous codes at random. If in a small number of random trials it is possible to find a code with equal or better values with respect to the given constraint than the first code, then that first code is not substantially optimal.

If, on the other hand, it can be shown that a substantially large number of random trials is required to produce a code with values better than or equal to the first code, or that on better code exists, then the first code is substantially optimal.

Figure 4:
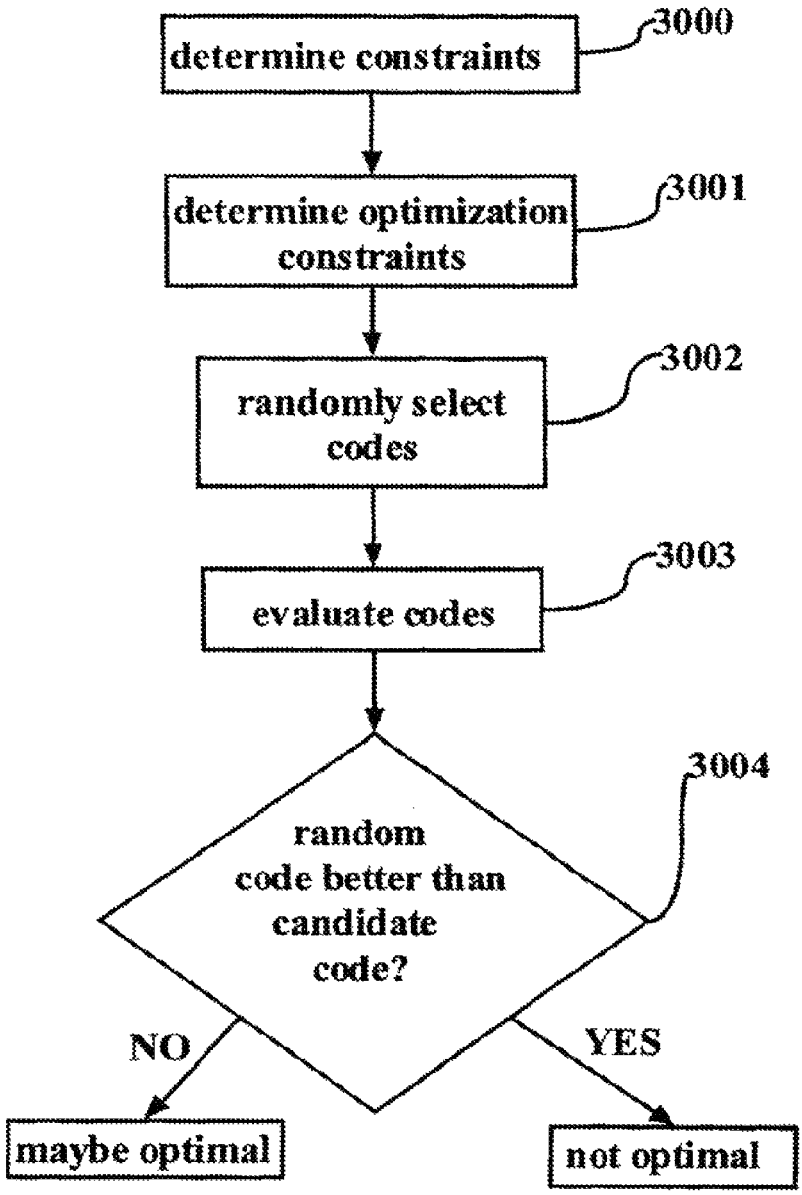
FIG. 4 shows a flow chart of particular embodiment of the method of FIG. 3 using a random search optimization method.

With reference to FIG. 4 we state in detail a method for rejecting the hypothesis that a candidate ambiguous code is substantially optimal. In summary, the steps are:

3000 determining a set of relevant constraints which define an appropriate set of codes which contains the candidate code.

3001 determining the set of constraints with respect to which the candidate code may be substantially optimal.

3002 randomly selecting a subset of codes from the set determined in step 3001.

3003 evaluating each of the codes selected in step 3002 with respect to each of the constraints determined in step 3001.

3004 comparing the values of the candidate code with respect to the constraints selected in step 3001 with the values found in step 3003. If any of the values found in step 3003 are more optimal than the values of the candidate code, then the hypothesis that the candidate code is substantially optimal can be rejected.

Details concerning these steps:

Step 3000, determining a set of relevant constraints which define an appropriate set of codes which contains the candidate code. The set with respect to which the substantial optimality of a candidate code is to be evaluated must be appropriately defined. Some of the potentially relevant constraints are: number of encoding symbols, partition structure, and admission of a specified ordering, such as alphabetic ordering. Each of these constraints limits the set of codes to which the candidate code is appropriately compared to.

Step 3001, determining the set of constraints with respect to which the candidate code may be substantially optimal. Some of the constraints which might be relevant for the analysis of the candidate code are: lookup error rate, query error rate, admission of a specified ordering, such as alphabetic ordering, admission of a regular layout, and anatomic fidelity.

Figure 5:
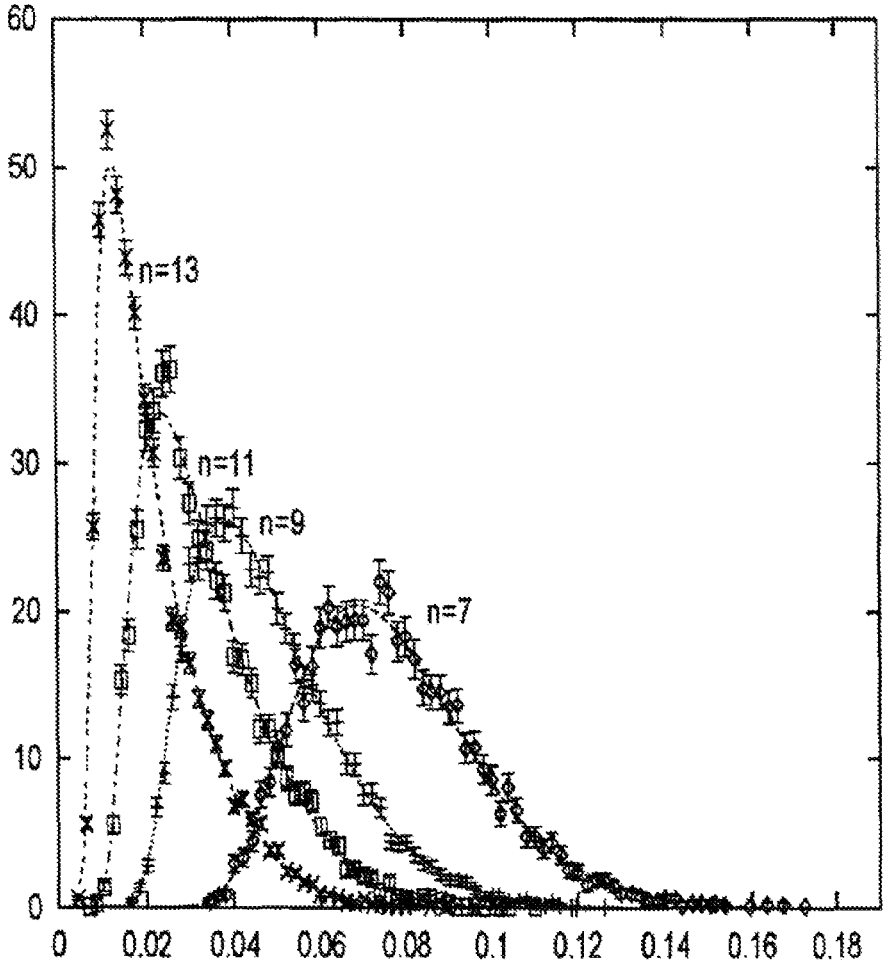
FIG. 5 shows the distribution of lookup error probability for randomly chosen ambiguous codes on several selected keys.
Figure 6:
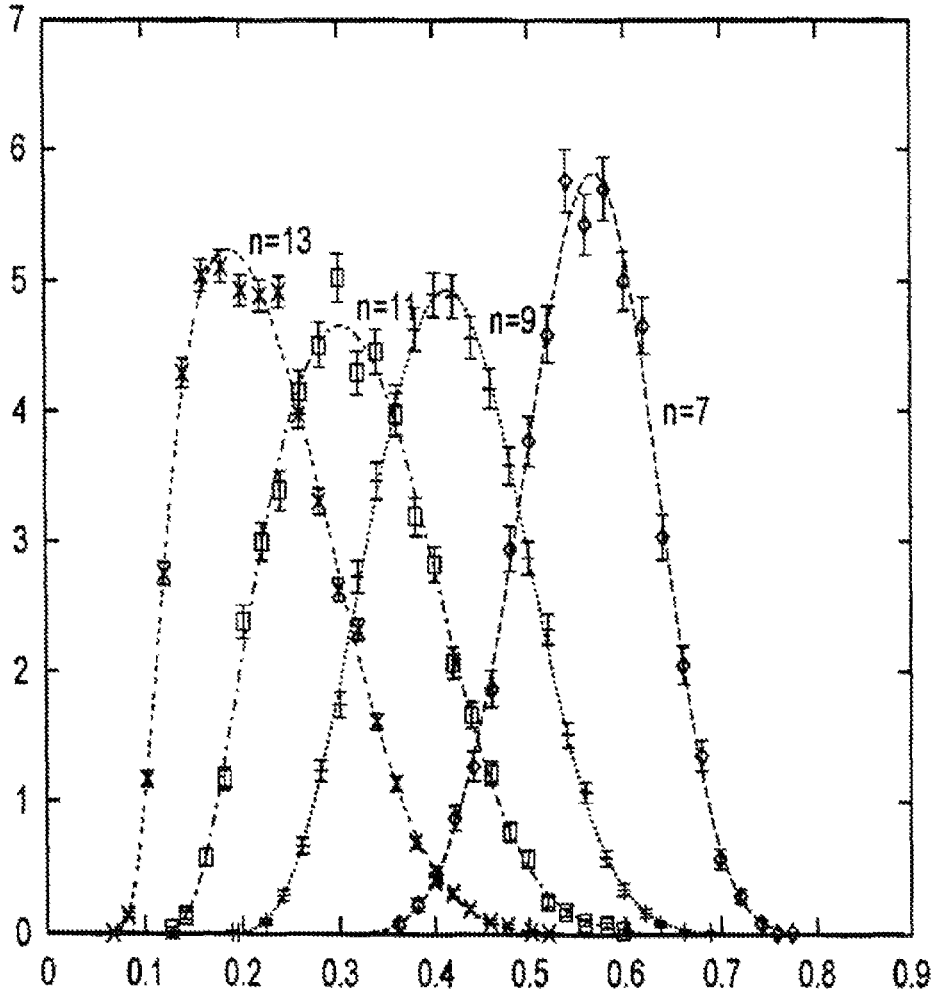
FIG. 6 shows the distribution of query probability for randomly chosen ambiguous codes on several selected number of keys.

Once steps 3000 and 3001 are performed, a distribution of code properties over a set is defined, and this distribution can be sampled randomly. FIG. 5 presents an example in which sets of codes are defined as having 1) an even-as-possible partition, and 2) a specified number of encoding symbols, where the specified number is 7, 9, 11, and 13. This definition completes step 3000. Then it is determined that lookup error is the sole relevant constraint. This determination completes step 3001. Together, these steps determine a distribution, the shape of which can be determined by random sampling, steps 3002 and 3003. In the FIG. 5, 5000 codes from each distribution are selected, completing step 3002, and the lookup error of each is measured, completing step 3003. The data are presented as percent lookup error (the reciprocal of lookup error rate) vs. the number of codes with the given percent lookup error. It is seen that the distributions become increasing strongly peaked as the number of keys increases. If the process is repeated but with query error replacing lookup error, we obtain the data shown in FIG. 6.

To illustrate step 3004, a candidate code whose substantial optimality to be tested is selected. This code is the 14-key code pn gt cr zk wj a e hi so ud xf ym vl qb proposed by [1]. The lookup error of this code relative to our reference statistics is 105 words/lookup error. Proceeding as above, we determine that 14-key code with an even-as-possible partition with lookup error equal to or better than that of the candidate code can be found in 7 random trials on average. If we repeat the process, except for using query error rate instead of lookup error rate as the relevant measure, we find that a code with better query error rate than the candidate code (4 words/query) will be found in 3 out of 4 random trials on average. Thus the ambiguous code of [1] is not substantially optimal either with respect to lookup error rate, or with respect to query error rate. Indeed, with respect to query error rate, most codes are better than the given code.

As a rule of thumb, if a code has not been explicitly optimized with respect to a constraint, then it is likely that it is not substantially optimal with respect to that constraint, as measured with respect to any reasonable set of language statistics.

Directed Random Walk

Directed random walk is an iterative optimization method wherein, at each step, a previously best code is used as a seed for generating new codes, one or more of which may be better than the best previously found. As the process is iterated, better and better codes are thus found. The procedure will first be explained intuitively, and then more formally.

In the present context, optimization of ambiguous codes with respect to one or more constraints, we assume no detailed knowledge of the structure of the space to be searched. In the absence of such knowledge, one is blind of foresight as to which direction to move to best continue the search. Thus, the safest procedure to take small as possible steps in as many as possible directions, and refrain from moving until steps in each of these as many as possible directions have been evaluated and compared. As an accumulation of small steps may lead a searcher into a cul-de-sac, any such search should be augmented with a "restart" procedure which allows the search step back out of unpromising or blocked avenues.

More formally, the problem is to take minimal steps though the space of ambiguous codes and direct these steps though that space toward the desired codes. According to the teachings of this invention, substantially minimal steps in space of ambiguous codes correspond to single pairwise permutations of assignments of decoding symbols to encoding symbols. At each step of the optimization method, it is desirable to test as many pairwise permutations as possible, preferably all possible pairwise permutations. The step is completed by choosing the pairwise permutation which gives the largest improvement in the property to be thereby optimized. If there is no largest improvement, then one of the pairwise permutations is chosen at random.

Figure 7:
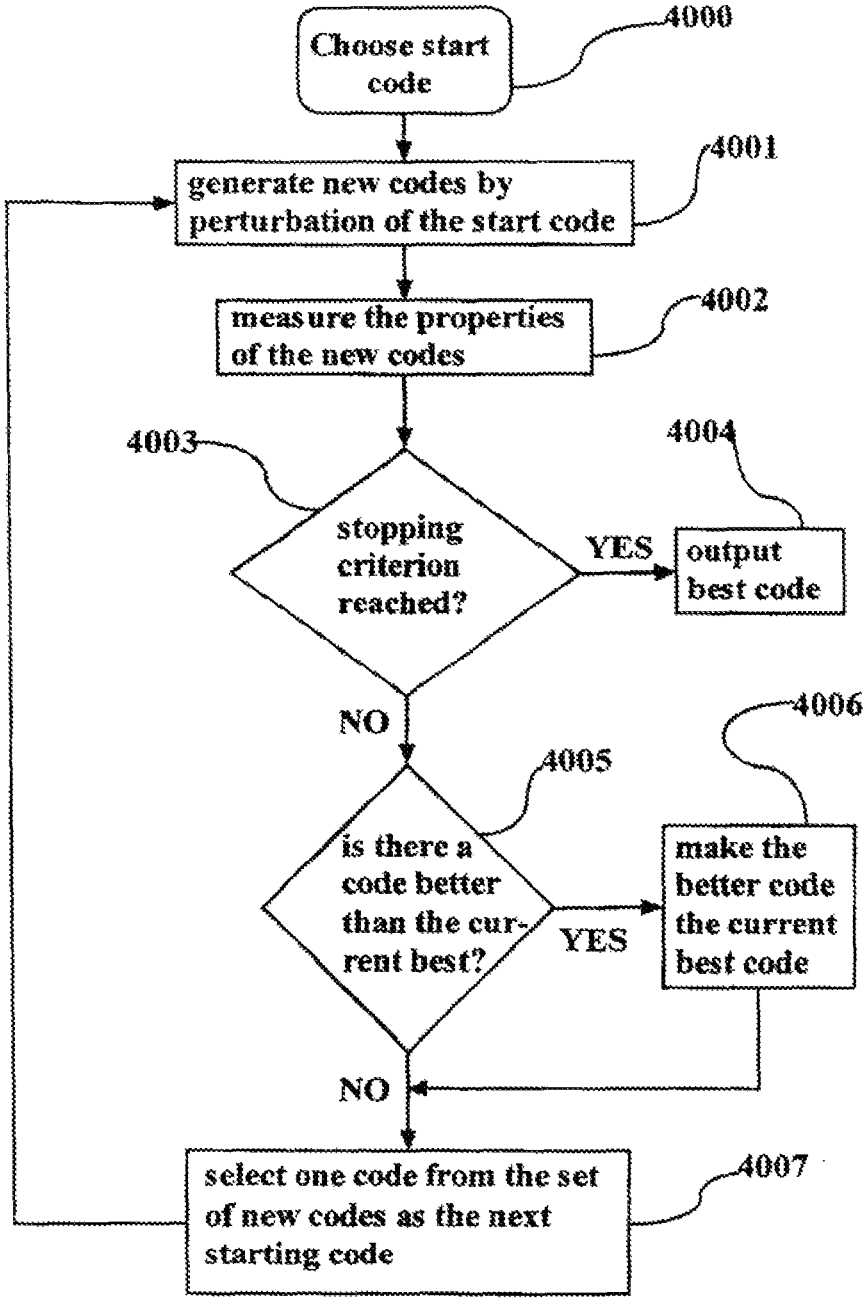
FIG. 7 shows a flow chart for directed random walk optimization.

In reference to FIG. 7, the steps of the method are as follows:

4000 choosing a starting code from the set of candidate codes.

4001 generating new codes from the starting code by perturbation of the starting code, preferably, by pairwise permutations of the assignment of symbols to keys, preferably all possible pairwise permutations.

4002 measuring the properties of the codes thus generated.

4003 checking if a stopping criterion has been reached, such as a criterion of limited further improvement.

4004 outputting the best code, if the stopping criterion has been reached.

4005 if the stopping criterion has not been reached, checking to see if the set of codes generated by perturbation of the current starting code contain a code better than the current best code.

4006 if there is a code in the current set of codes better than the current best, selecting the best of these as the new current best.

4007 selecting a new starting code. If step 4005 yields YES, selecting as new starting code the best code from the current set, else, select a new starting code from the current set at random. Upon completion, return to step 4001.

When there is but one constraint to be optimized, selection of the best code from the set of candidate codes is a simple matter of choosing the code in the set which has the most optimal value of the constraint. However, when there are several constraints to be simultaneously optimized there is but a partial ordering on the values of the constraints, and it is not obvious how to select among these values in order to best advance the optimization procedure.

One way to perform simultaneous optimization is to optimize with respect to each variable independently. Then, in cases of conflict, where the simultaneous. optimum can not be achieved, this being the generic case, some weighting of the importance of each constraint must be established. And that relative weighting is part of the design constraints.

Construction of Strongly Touch-typable Codes In order to facilitate the explanation of how to make and use strongly touch-typable ambiguous codes, we will fix three increasingly strict levels of strong touch typability.

Level A This level of touch typability is exemplified by a casual, tolerant typist characterized in that he or she 1) types 20 words per minute and accepts distractions every 15 seconds, that is, a query error rate of one query every 5 words on average, and 2) accepts a 2 percent lookup error, that is, a lookup error rate of one error every 50 words, or two and ½ minutes of typing.

Level B This level of touch typability is exemplified by a less casual, less tolerant typist characterized in that he or she 1) types 20 words per minute and accepts distractions every 30 seconds, that is, a query error rate of one query every 10 words on average, and 2) accepts a 1 percent lookup error, that is, a lookup error rate of one error every 100 words, or 5 minutes of typing.

Level C This level of touch typability is exemplified by a skilled typist characterized in that he or she 1) types 40 words per minute and accepts distractions every 30 seconds, that is, a query every 20 words on average, and 2) accepts a 0.5 percent lookup error, that is, a lookup error every 200 words, or 5 minutes of typing.

Figure 8:
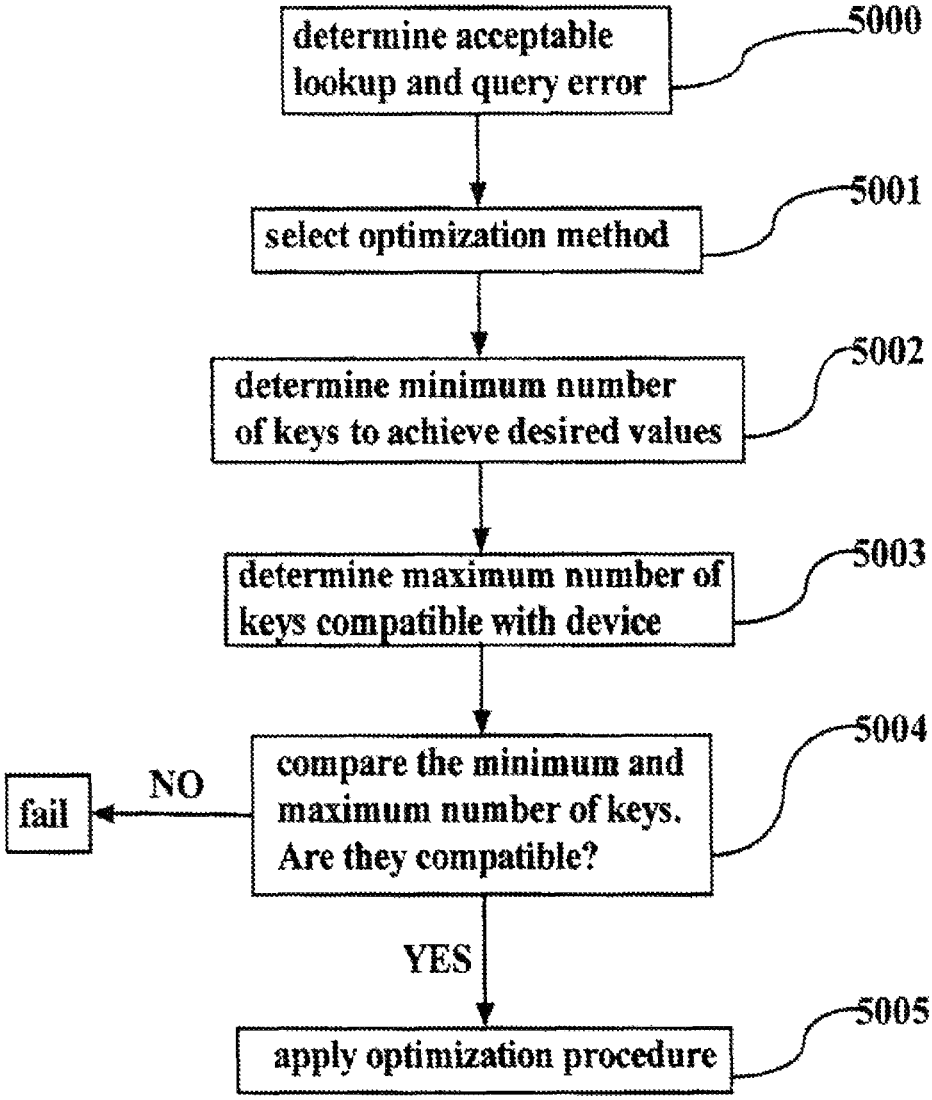
FIG. 8 shows a flow chart of the construction of strongly touch-typable ambiguous codes.

With reference to FIG. 8, we point out that the method to construct stouchable codes comprises the following steps:

5000 Determining quantitative values of acceptable lookup error rate and query error rate.

5001 Selecting an ambiguous code optimization method.

5002 Determining the minimal number of keys required such that using said number of keys and the optimization method selected in step 5001 it is possible to achieve the values of lookup error rate and query error rate determined in step 5000.

5003 Determining the maximal number of keys allowable given the design of the target typable device.

5004 Deciding if the design constraints are compatible. If the number determined in step 5003 is greater than or equal to the number determined in step 5002, then the design constraints are compatible, otherwise they are not.

5005 If the design constraints are compatible, as determined in step 5004, apply the optimization procedure selected in step 5001 to construct an appropriate strongly touch-typable ambiguous code. If they are not compatible then the procedure fails.

Details of this method are as follows:

Step 5000, Determining quantitative values of acceptable lookup error rate and query error rate. This could be done by testing of an individual or group of individuals, or by simply preselecting desired values for lookup error rate and query error rate, for instance, by selecting a level of strong touch-typability as described above.

Figure 9:
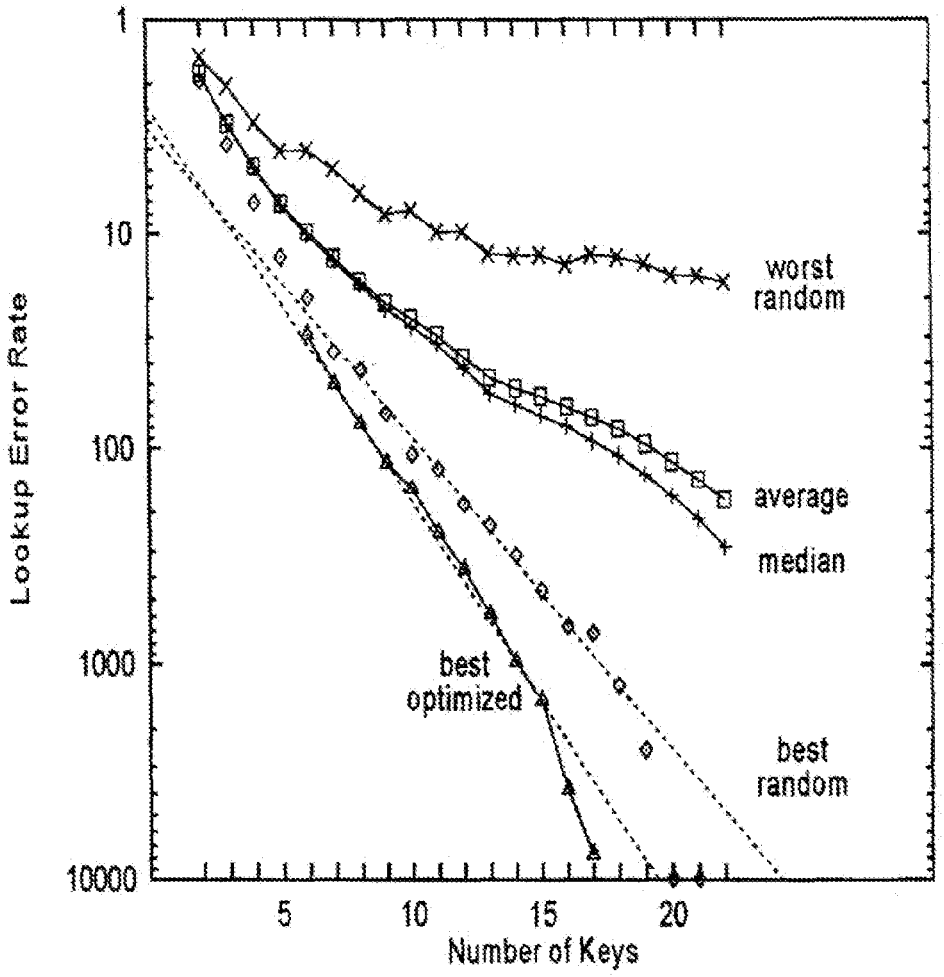
FIG. 9 plots lookup error rate vs. number of keys for randomly chosen, and substantially optimized ambiguous codes.
Figure 10:
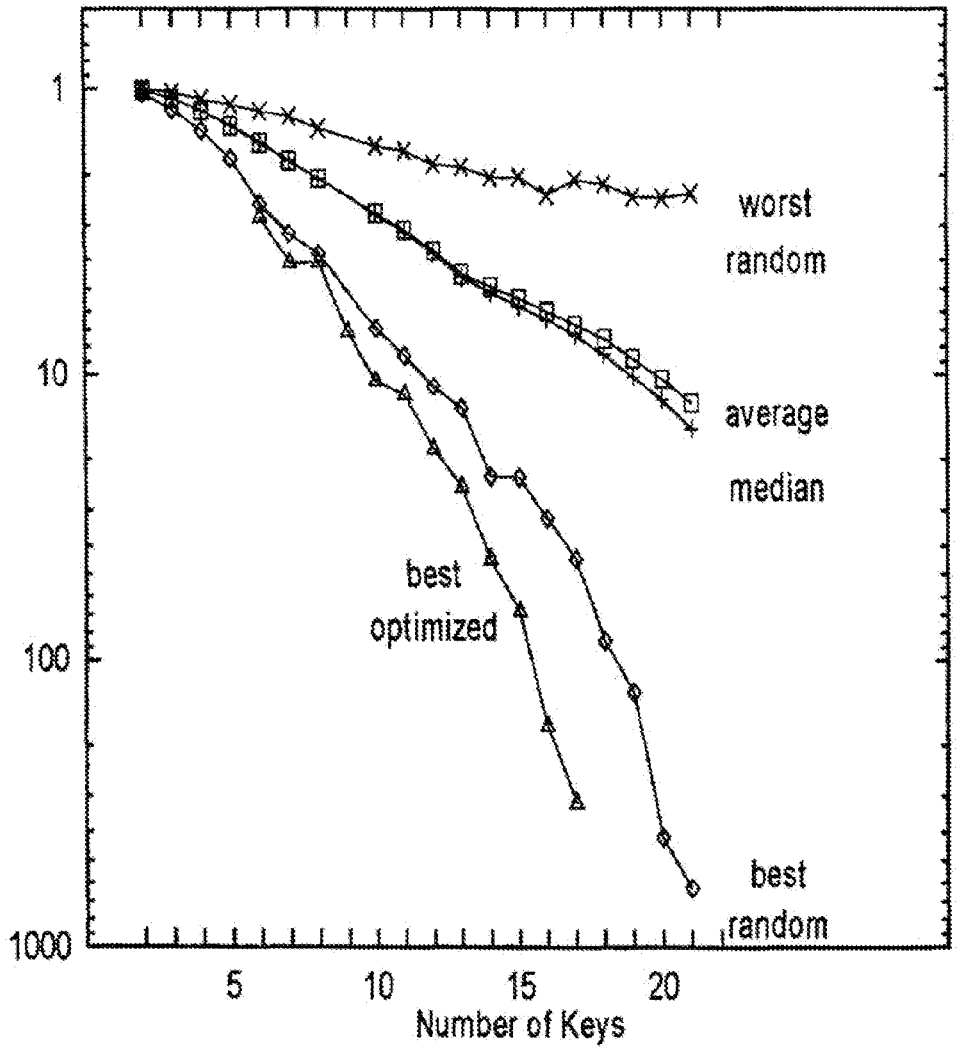
FIG. 10 plots query error rate vs. number of keys for randomly chosen substantially optimized ambiguous codes.

Step 5001, Selecting an ambiguous code optimization method. In reference to the construction of substantially optimal ambiguous codes above, two optimization methods were discussed: random search and directed random walk. Random search is less powerful than directed random walk, but may suffice if the number of allowed keys is high enough, and the level of desired strong touch-typability is low enough. An ever weaker method, selection of a code in a single random trial, could be sufficient in some circumstances. To see this in more quantitative detail, some experimental results are discussed in reference to FIGS. 9, 10 and 11.

Figure 11:
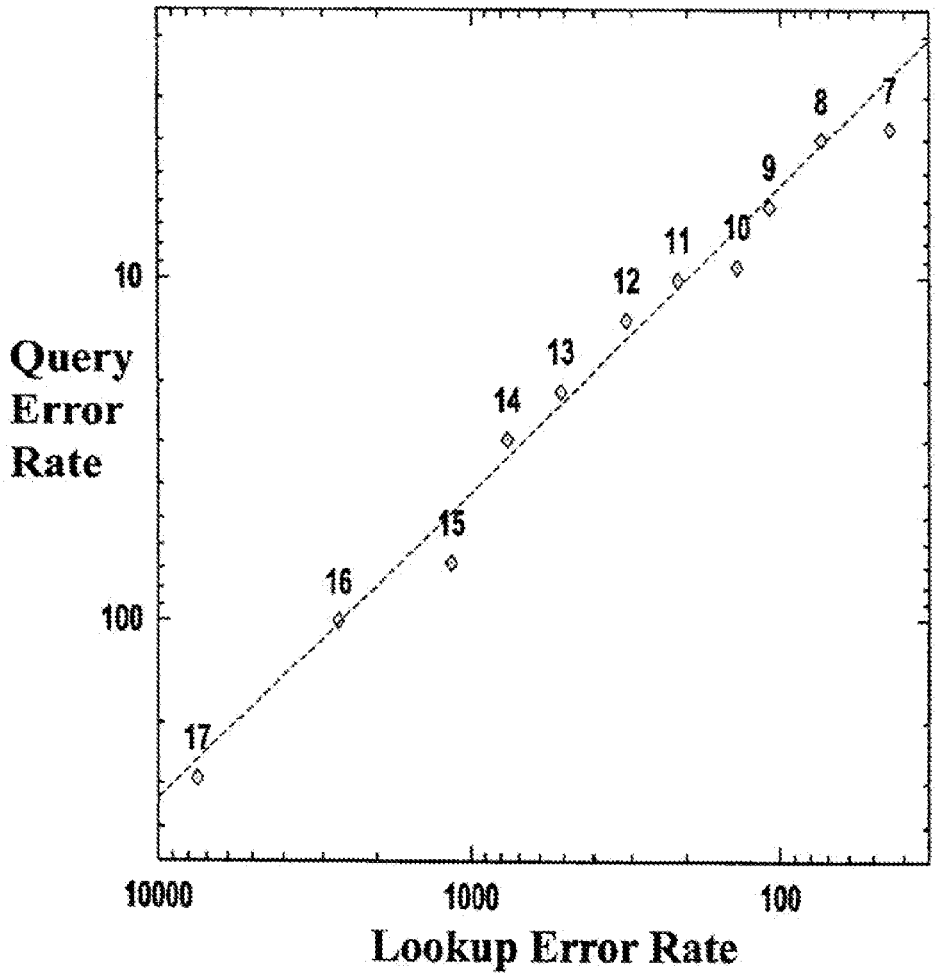
FIG. 11 shows lookup error rate vs. query error rate for some substantially optimized ambiguous codes on a range of number of keys.

In this experiment, 5000 ambiguous codes with an even-as-possible partition were selected at random from each of the sets of ambiguous codes for 2-20 keys. In addition, for each number of keys 2-20, an optimization run was performed using directed random walk, in each of three conditions, 1) optimization for lookup error rate only, 2) optimization for query error rate only, and 3) optimization for both lookup error and query error rate, using a target value method. From the values of lookup error rate and query error rate calculated for the randomly selected codes, the following statistics were computed: best value, worst value, average value, and median value. All these statistics are plotted in FIG. 9 for the lookup error rate, and in FIG. 10 for the query error rate, together with the results of an optimization run in which lookup error rate and query error rate, respectively, was the sole constraint optimized for. The results from optimization runs in which lookup error rate and query error rate were simultaneously optimized are shown in FIG. 11. From all these data, a decision can be reached as to which optimization method to use. While it is always preferable to use the most powerful method at one's disposal, it may be that a less powerful method may be sufficient, for instance, any single, randomly selected code could meet specified constraints, if these constraints are sufficiently lax. This will be discussed further below.

Step 5002, Determining the minimal number of keys required such that using said number of keys and the optimization method selected in step 5001 it is possible to achieve the values of lookup error rate and query error rate determined in step 5000.

With reference to the experimental results described above, and the selected levels of strong touch typability described above, one can construct a table giving the minimum number of keys required for each of the three levels of strong touch typability, and reference to the three types of optimization mentioned. This table is presented in FIG. 12.

Step 5003, Determining the maximal number of keys allowable given the design of the target typable device. Ambiguous codes will be typically used in small devices, and the number of keys will generally be a compromise between key size and total typable device size. In some cases, convention may enforce a key number, such as the convention of using 12 keys for a telephone keypad.

Step 5004, Deciding if the design constraints are compatible. If the number determined in step 5003 is greater than or equal to the number determined in step 5002, then the design constraints are compatible, otherwise they are not.

As will be seen more clearly in the detailed specification of the device embodiments presented below, the number of keys permissible in a typable device can depend on many factors, and can be more or less rigidly determined by these factors.

Step 5005, If the design constraints are compatible, as determined in step 5004, apply the optimization procedure selected in step 5001 to construct an appropriate strongly touch-typable ambiguous code. If they are not compatible then the procedure fails.

If the procedure fails then at least one of the following things must happen:

A stronger optimization method is chosen.

The device design is modified to allow for more keys.

A lower value of strong touch typability is accepted.

The device is abandoned.

Smart Card on 9 to 16 letter keys Smart cards are substantially credit-card sized devices containing computer components such as a processor,memory and appropriate interfacing circuitry. Prior-art smart cards may also contain a keyboard and a display. They are currently used in applications such as security and banking, but have many other possible uses. This embodiment shows how it is possible to equip a smart-card-sized device with a touc-typable keyboard, and thus vastly expand the range of applications which these devices can serve. As a simple example, in banking and security applications, smart card users must currently remember a string of digits which is the password for the device. However, with a typable smart card, easy-to-remember, though relatively long, pass phrase in natural language could be used in the place of a difficult-to-remember, albeit short, numeric password. Examples of smart-card sized devices to which the teachings of this embodiment could be applied include the personal digital assistants manufactured by the Franklin Corporation and sold under the trademark REX.

Given present technology, the small size of smart cards substantially forbids complex and power-consuming communication components for transmission of data entered on the keyboard on the card. Thus, this smart-card embodiment teaches a low-cost machine for ergonomically and efficiently sending messages using standard touch tones, and standard touch-tone generators.

Most telephones have but 12 keys, each associated with a touch tone, in the sense that activating each key causes a distinguished touch tone to be emitted by the phone. However, the universal DTMF standard provides for 16 touch tones, and the DTMF tone generator installed in most telephones is capable of generating all 16 of these tones. By exploiting the additional tones, each of up to 16 keys can be assigned to a touch tone, and used to encode alphanumeric symbol sequences. Other things being equal, the larger the number of keys, the lower the ambiguity of codes associated to these keys. The teaching of this embodiment is thus to use substantially all of the 16 touch tones to encode alphanumeric sequences. In this way, machinery for the communication of information with low-ambiguity codes can be produced using readily available, low-cost components.

This embodiment has the further objects of providing a touch-typable keyboard for a smart-card-sized device.

providing a method for simulating a set of encoding symbols which is larger than the set of encoding symbols which can be physically generated by a device providing an example of a device in which lookup error is the dominant constraint.

providing a keyboard/visual display device geometry which is adapted for smart-card-sized devices.

providing a disambiguation mechanism which is operable using very limited computer memory.

providing an example of a system wherein more than one disambiguation mechanism may be operable, each adapted to local computational capabilities. In this case, a first disambiguation mechanism is used to provide feedback to the user, at the sending end of a communication, while a second disambiguation mechanism is used at the receiving end of the communication.

We will now discuss in detail the manner in which these objects are achieved by the present embodiment.

Strongly touch-typable keyboard Smart card devices are small, so only a small number of substantially full-sized keys can be located on them. If some of the area of the card is to be reserved for a visual display device, then the area available for keys is further reduced. The preferable compromise in number of keys between the requirement of substantially full-sized keys for touch-typability, and the requirement of a large number of keys to allow for low-ambiguity codes, is in the range of 9-16 keys. Two possible layouts for devices with a number of keys in this range are shown in FIGS. 15 and 16. The arrangement and functionality of the keys and their relationship to other components of the smart card will be discussed in detail below.

Figure 13:
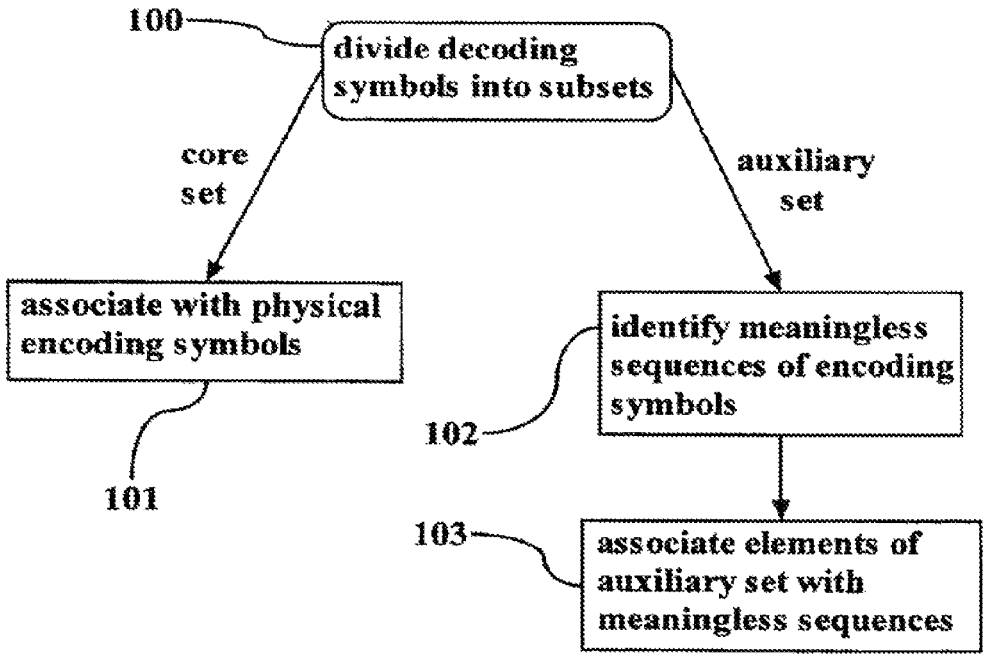
FIG. 13 shows a flow chart of the method for synthesizing encoding symbols.

Synthesizing encoding symbols using encoding sequences with meaningless decodings With reference to FIG. 13, let us divide the set of decoding symbols into two subsets: 1) a core set, consisting of symbols to be associated encoding symbols bearing a one-to-one relationship with physical input means, and 2) an auxiliary set consisting of symbols to be associated with encoding symbols bearing a many-to-one relationship with physical input means (step 100). Then, the method of synthesizing encoding symbols further comprises the steps of

101 establishing a first, potentially ambiguous, code which associates subsets of the core set with encoding symbols, said encoding symbols bearing a one-to-one relationship with physical signals which can be generated by the typable device for physically representing encoding symbols,

102 identifying short sequences of encoding symbols which are such that no possible decoding of the sequence of encoding symbols forms part of a meaningful decoding.

103 establishing a second, potentially ambiguous, code as a relationship between subsets of the auxiliary set of decoding symbols with the short sequences of encoding symbols identified in step 102.

For example, let us associate 16 encoding symbols with the 16 DTMF tones, so that said tones physically represent the encoding symbols. The tones will be labeled (0,1,2,3,4,5,6, 7,8,9, *,#,A,B,C,D). We will take as the core set of symbols the letters [a-z], and associate them with the physically representable encoding symbols via a first ambiguous code as follow (0,aw), (1,bi), (2,cx), (3,d), (4,ej), (5,fo), (6,g), (7,hv), (8,ky), (9,1), (*,mu), (#,n), (A,pz), (B,qr), (C,s), (D,t), where the first element of each pair gives the encoding symbol, and the second element of each pair gives the decoding symbols associated to the encoding symbol. The auxiliary set of decoding symbols will be a singleton set consisting of the symbol "space". Thus we synthesize one encoding symbol to represent the one decoding symbol "space". A candidate sequence is A8A, which corresponds to the following decoding sequences (pkp pkz zkp zkz pyp pyz zyp zyz). None of these decoding sequences form part of any word in our reference list of meaningful sequences, thus the encoding sequence A8A is a suitable sequence for representing an element of the auxiliary set, and we form the pair (A8A, "space") to represent the "space" symbol. The "space" symbol can then be associated with an input means, which input means will cause the sequence of tones associated to A8A to be emitted each time said input means is activated. On the receiving end, a decoding means will transform the sequence A8A to the "space" symbol. Whether a given input means is associated to a single physically representable encoding symbol, or a synthesized encoding symbol, is entirely transparent to the user. An arbitrarily large auxiliary set of decoding symbols can be represented in this way. It will be appreciated that given the above specification, a programmer of ordinary skill would be easily capable of creating software to automatically generate any desired number of synthesized encoding symbols, given a set of reference statistics, and a first (ambiguous) code for the core set of encoding symbols.

Providing a disambiguation mechanism which is operable using very limited computer memory. The limited processing power and memory capacity of present-generation smart cards puts a substantial premium on low ambiguity in ambiguous code designs; little computing power is available in the card to be devoted to disambiguation machinery.

For any ambiguous code, most of the disambiguation effort, on the part of the computing hardware and software as well as on the part of the user, is incurred in selecting which of the alternative decodings to an ambiguous encoding should be selected. In view of the limited computing capability of the smart card, querying for alternative decodings can be eliminated entirely. In the absence of querying, only the most probable decoding for each encoding need be stored, for only the most-probable decoding sequence will be output by the disambiguation mechanism when each encoding sequence is received. With this simplification, a particularly compact form of the database can be obtained, e.g. in the form of a simple suffix tree. Since querying is eliminated sufficient visual feedback can be provided using only a simple, low-power requirement display, for example, a single-line traveling banner display related to the type of display used in pocket calculators or digital watches.

This method of disambiguation, in which only the most-probable decoding sequence is stored and output, we will refer to as simple lookup disambiguation. Simple lookup disambiguation is only effectively operable with ambiguous codes which are sufficiently strongly touch typable. Thus a surprising consequence of strongly touch typable codes is that they permit effective operation of very simplified disambiguation mechanisms.

An example 16-key substantially optimal ambiguous code suitable for application in the present embodiment is the code aw bi cx d ej fo g hv ky l mu n pz qr s t with lookup error rate 4043 words/lookup error, and a query error rate of 68 words/query, this code is shown is an example layout 51 on a 16-letter-key smart card in FIG. 15. This figure also reveals a display means 50 for displaying decodings of encoding symbol entered via the keyboard, and an auxiliary input means 51, which is thumb-activatable, and could be used to encode a variety of additional symbols and mode changes, as will be discussed more fully in reference to other embodiments. Here it is to be especially noted that the display means 50 is preferably placed in such a way that 1) both the letter input means 51 and the thumb-actuated auxiliary input means 52 are in a comfortable position to be actuated by one hand (in this figure, the right hand), while, at the same time, allowing the keys to be as large as possible, given the small size of the smart card, and also allowing the screen to be comfortably and fully viewed in the frame formed by the thumb and the index finger of the hand actuating the input means 51 and 52. This unique and preferred arrangement solves the problem of allowing a touch-typable keyboard and a large-as-possible display means to functionally co-exist on a smart card.

Since queries are not permitted at the sending end in this embodiment, this code was chosen by directed-random-walk optimization using lookup error as the only constraint of optimality. It is to be noted that lookup errors using this code will occur on average only once every roughly 16 pages of typed text. Thus this code is suitable for accurate communication of substantially long messages, even in the absence of a querying mechanism. If it were desirable to sacrifice some lookup optimality at the sending end in order to reduce processing of queries at the receiving end, an example alternate code optimized for both query and lookup error is aw bu cx d ev fz go hj im ky l nq p r s t with a lookup error rate of 2670 words/lookup and a query error rate of 101 words/query. Choice of a code optimized both with respect to lookup error rate and query error rate would be appropriate in at least two circumstances, 1) if the smart card were in fact sufficiently powerful to support a query mechanism, and/or 2) a query-based disambiguation mechanism would be used at the receiving end of communications initialed at the smart card. This latter might be the case, for instance, if the user composed messages using a smart card, sent them to another computer over a phone line, and at some later moment performed a second disambiguation pass using a more powerful disambiguation mechanism. Indeed, the second disambiguation pass need not be performed by the person who composed the message, but could be performed by a second person, for instance the first person's secretary.

In any case, the lookup error rate of this second code is still extremely low, as compared, for instance, to the rate at which even very skilled typists make typing errors, approximately 1 error every 100 words. By any reasonable measure, both of these 16-letter-key codes must be considered strongly touch typable, as a typist typing 20 words per minute will only need to answer a query once every three minutes for the first 16-letter-key-code, and once every five minutes for the second 16-letter-key-code. Performing the same optimizations for ambiguous codes for 9 letter keys, we find, for example, the code akw bnq cly dhx epv fim gr jot suz optimized only for lookup error rate, and with lookup error and query error rates of 116 words/lookup error and 4.4 words/query respectively. This code is shown in an example layout on a 9-letter-key smart card in FIG. 16. Optimizing for both lookup error rate and query error rate sing the directed random walk method, one can also construct codes such as am bnz cfi dhx evw gjr kos luy pqt with lookup error and query error rates of 109 words/lookup error and 6.2 words/query respectively. It is to be noted that since no querying can be performed using simple lookup disambiguation, strong touch typability can only be discussed in terms of the lookup error rate. An evaluation must be made as to whether lookup errors occur at a sufficiently low rate as to produce acceptable text. Even for these 9-key codes, the lookup error rate is comparable to the rate at which skilled typists produce typing errors, hence these codes can be considered strongly touch typable in this context. Further, since the smart card would typically be used for short messaging, composition of electronic mail, communications to pagers, and the like, standards for text accuracy may be lower than standards for transcription of final-copy text, for instance. It is from these considerations that we arrive at the definition of 9 to 16 keys as the preferred range for this embodiment. More than 16 keys are difficult to fit into a smart card format while retaining the advantages of substantially full-sized keys. On the other hand, ambiguous codes on fewer than 9 keys may not be strongly touch typable with respect to the simple disambiguation mechanisms compatible with the smart card's limited computing power.

Feedback to the typist A smart card equipped with simple lookup disambiguation could be operated by a person who is a competent touch typist, needing no feedback from the card as to the progress of the communication, and/or getting feedback from the machinery at the receiving end of the communication, potentially over a phone line and potentially in the form of speech synthesized on the basis of the symbols input by the typist on the smart card. It is desirable, however, to provide feedback directly from the card whenever there are sufficient computing resources built into the card to supply that feedback.

Here it is pointed out that the computing resources needed to provide useful feedback are even less than the computing resources needed for simple lookup disambiguation. Even if no disambiguation database and software is present on the card, and using only rudimentary electronic circuitry, well known to those skilled in the art, a unique character can be sent directly to the display in response to each key press, where said character is the most probable (according to the reference statistics) letter associated with the key. Using for example the code aw bi cx d ej fo g hv ky l mu n pz qr s t described above, the resulting text would typically be quite readable by a human. For example, the first line of the Gettysburg address, rendered using 1-block (single-letter) statistics reads as follows:

oour score and sehen kears ago our oathers irought oorth on this continent, a nea nation, conceihed in liiertk, and dedicated to the proposition that all uen are created erual.

This level of accuracy is already enough provide a rough guide to the typist as to the text he or she is in the process of entering on the smart card. This example shows that disambiguation can be accomplished with extremely small amounts of memory; here the only memory required is that needed to store the 16 characters which will be displayed in response to activation of the 16 keys. This approach is scalable in terms of the computing resources required. With successively more memory, 2-, 3-, and higher-block probabilities could be stored and used as the basis of well-known context-based disambiguation, and thus render the text with increasing accuracy for display to the user.

While context-based disambiguation is well known in the art, it has heretofore proved to be not practical. This example shows the reason for this: context-based disambiguation is not powerful enough to effectively disambiguate codes which are too ambiguous. In this example context-based disambiguation is coupled with a code which is sufficiently strongly touch-typable, sufficiently disambiguous, that it permits effective disambiguation with a context-based method. The prior art has taught away from context-based disambiguation in favor or word-based disambiguation. However, in application of the teachings of this invention, context-based disambiguation is made operable and viable for practical use.

The example further shows that 1) word-based disambiguation is not required to practice the teachings of this invention, 2) a micro-processor is not required to practice the teachings of this invention, and 3) more than one, potentially different, disambiguation mechanisms can be used in the same communication system based on ambiguous codes. Word-based disambiguation, or another disambiguation method, could be used at the receiving end of a communication sent from the smart card, while locally the smart card is using simple context-based disambiguation to provide feedback to the user of the smart card.

As the size of the blocks used in context-based disambiguation increases, the accuracy of text rendering increases as well. However, at some block size the amount of storage required approaches that of the storage requirements of word-based disambiguation, and since word-based disambiguation generally gives better results than context-based disambiguation, word-based disambiguation will generally be preferred, if there is enough memory available to support it.

Further applications If there is memory available on the smart card beyond that required for storage of the disambiguation database and software, then the potential applications of this device are greatly increased. For instance, with only a few bytes of additional memory, a user could call an appropriate voice response system for telephone directory information, request a phone number by typing in a name and other identifying information on the smart-card keyboard, and could then store the retrieved phone number in the user memory for later downloading to another, more powerful, machine.

Query Error Minimization—a typable device for a vehicle The present embodiment concerns an instance in which query error is the dominant constraint on typable device design. It is generally of value to reduce the query error rate since the effort to answer queries distracts from the typing task. In some applications, however, reduction of query rate is of paramount importance.

Queries will be displayed on a visual display in most practical implementations of typable devices implementing ambiguous codes. When the vision of the user is otherwise urgently occupied, for example when the user is driving a car, then, for safety reasons, distracting that vision to the evaluation of queries must be kept to a minimum. Even when queries are made by auditory means, it is crucial to minimize driver distraction. Further, while driving a car, both hands of the user are generally occupied in holding the steering wheel of the car, and should preferably not be removed from the steering wheel to operate a typable device. This object can be achieved by embedding the input means of the typable device directly in the steering wheel.

Referring now to FIG. 17, we note that any number of input means could be embedded in a steering wheel 200. Many steering wheels comprise crenulations on the inner or rear surface of the wheel to provide better grip for the fingers. For these steering wheels, it is natural to associate a first plurality of input means 201 with each of a plurality of these crenulations. When the driver grasps the steering wheel, four of the first input means 201 are contacted by the fingers of each hand. The region of the steering wheel contacted by the drivers hands may change from moment to moment, for instance when the driver turns the steering wheel through a large angle. Which set of 8 keys are contacted by the driver's hands at any one time can be recognized by a position-sensing means, such as a combination of pressure sensitive keys with simple electronic circuitry, which combination will be evident to those skilled in the art. A second plurality of input means 202 can be placed along the outer or upper surface of the steering wheel, whereby one of said second input means is contacted by the thumb of each hand while the steering wheel is grasped by the driver. Again, which of the second input means are contacted by the thumbs of the driver at any one time can be detected by an appropriate position-detecting means.

With respect to the steering-wheel embedded keyboard just sketched, it is natural to select a code on 8 keys, said keys to be associated with the first input means contacted by the fingers of both hands, along with two mode-switching keys to be associated with the second input means contacted by the thumbs of the driver.

Ambiguous code selection Applying the directed-random-walk method taught by this invention for selecting substantially optimal codes, and optimizing only with respect to the query error rate, we construct, for instance, the following code on 8 letter keys: aksz bcev dfi gmo hqt jnw luy prx with a lookup error rate of 70.2 words/lookup error, and a query error rate of 4.1 words/query. As throughout this specification, these rates are calculated with respect to our reference statistics, and using simple word-based disambiguation as the disambiguation method. The query error rate for this code might well be too high to consider this code to be strongly touch-typable. A typist/driver typing 20 words/minute would be distracted from driving by a query approximately every 12 second, likely too often to be compatible with safe driving. On the other hand, even a skilled typist may not be able to type 20 words per minute while driving, potentially bringing the relationship between query and typing rates into an acceptable range for strong touch typability.

There are several additional strategies for reducing query error rate, beyond choosing a substantially optimal code, and these strategies can be used in combination. They include Increasing the total number of keys by increasing the number of keys activatable by each finger. It will be appreciated that this could be done, for instance, by adding another row of keys on the steering wheel, or, equivalently, making each key multipositionable, or using a chording method by which two or more keys are pressed simultaneously to encode a different subset of encoding symbols.

Eliminating queries when the less-probable decodings are much less probable than the most-probable decodings. The parameter controlling how close the probability must be between most-probable and less-probable decodings must be to invoke a query is a parameter whose value could be selected by the user. Such a mechanism could be of value in any embodiment in which query error rate is a relevant constraint.

Using a hybrid chording/ambiguous code method, as described in detail below.

Using a disambiguation method which is more powerful than simple word-based disambiguation.

Phone keypads compatible with existing phone keypads In this embodiment, the limitation on the number of keys is paramount since the keypad must be compatible with existing telephone equipment which generally have 12 keys. For the purposes of this embodiment, we require that two of these keys must be reserved for non-letter symbols such as space, backspace, period, and an end-of-transmission symbol. Thus, the 26 letters must be distributed over at most 10 keys. In this embodiment both minimal lookup error rate and minimal query error rate are desired. We find that using the optimization methods taught by this invention and using the even-as-possible partition on 10 keys, codes such as amq be cdu fiy gpx hl jsv krz nw ot with lookup error rate of 138 words/lookup error, and query error rate of 9.3 words/query can be found, while simultaneously optimizing for lookup error rate and query error rate. This should be compared to the lookup error rate of 29 words/lookup error and the query error rate 2.2 words/query of the standard ambiguous code, thus, there is an overall improvement of by more than a factor of 4 over the standard ambiguous code. Said 10-key code optimized for lookup error rate and query error rate is shown in an example layout on a telephone keypad in FIG. 18.

We may also compare this 10-key code with two 9-key codes proposed in U.S. Pat. No. 5,818,437 to Grover, and U.S. Pat. No. 5,953,541 to King, respectively. The first of these codes, afg bkn jlo mqr ew dhi sux ptv cyz has a lookup error rate 86.5 words/lookup error, and a queryrate of 3.9 words/query, while the second, rpq adf nbz olx ewv img cyk thj su has a lookup error rate of 115 words/lookup error, and a query error rate of 5.2 words/query. These codes are both significantly inferior to the example 10-key code which is herein designed for this task. As neither the U.S. Pat. No. 5,818,437, nor U.S. Pat. No. 5,953,541 are enabling with respect to the construction of the cited ambiguous codes, nor are the statistics available with respect to which these codes are optimized (if they are indeed optimized), we can draw no further conclusions as to the substantial optimality of these codes.

Another useful comparison is to 9-key codes which are optimized according to the teachings of this invention with respect to both lookup error rate and query error rate. We construct, for example, the code am bnz cfi dhx evw gjr kos luy pqt with lookup error rate 109 words/lookup error and query error rate of 6.2 words/query. Comparing these results, we find that the improvements which result from the teachings of this embodiment are from two sources 1) using more than 9 keys to permit the improvement of lookup error rate and query error rate, and 2) optimizing both with respect to lookup error rate and with respect to query error rate. If the approach taught by this embodiment is extended to 11- and 12-key codes, one finds for example the 11-key code, avy bn cl dhx ew fip gjo kr mu qt sz with lookup error and query error rates of 215 words/lookup error and 10.1 words/query respectively, and the 12-key code aw bn cky dhq of go ip jr lz mx sv tu with lookup error and query error rates of 313 words/lookup error and 13.2 words/query respectively. Thus, by sacrificing the use of the * and # keys for the encoding of non-letter symbols, we can dramatically improve lookup error rates, and substantially improve query error rates, bringing the standard-telephone-compatible keyboards comfortably into the (level B) strongly touch-typable range. Whether or not these improvements outweigh the reduction of the ability to encode non-letter symbols by using * and # keys can only be decided in reference to the intended uses of the devices so constructed. It is to be noted that non-letter symbols could be encoded using sequences of encoding symbols as described in reference to the smart-card embodiment specified above. If the * key and # key are available to encode non-letter symbols, then a particularly ergonomic scheme, which respects in part the convention of using the # symbol as an end-of-transmission symbol is as follows. Let # encode the space symbol=end-of-word symbol, ## encode. =end-of-sentence symbol, and ###=end-of-transmission symbol. In this way the complexity of encoding a symbols varies inversely with the probability of the symbol. Depending on the application, sequences of the * symbol could then be used to encode other non-letter symbols such as backspace, @ (for electronic mail applications), and/or be used as a mode changing symbol.

Telephone keypad in alphabetic order This embodiment presents a solution for a severely constrained keyboard-design problem in which the number of keys is fixed, the placement of the keys is fixed, and the ordering of symbols on these keys is fixed. This problem arises in the design of a keyboard which 1) preserves as well as possible the familiar alphabetic ordering of the standard ambiguous code, 2) is compatible with existing, standard telephone keypads, and yet 3) has improved lookup error rate and query error rate as compared to the standard ambiguous code. These constraints allow a limited freedom to choose the number of keys on which to base the ambiguous code. One can choose, for example, to allow the ambiguous code for the letters to occupy 10 keys of the telephone keypad, leaving the * and # keys available for encoding non-alphabetic symbols. Also, while the standard ambiguous code uses an even-as-possible partition, one may choose an alternate, not even-as-possible, partition and still respect the given constraints.

Given the constraint of alphabetic ordering, each ordered partition of 26 elements into 10 groups corresponds to a unique ambiguous code. Given sufficient computing time, it would be possible to evaluate the lookup and query errors of each of these codes, and choose the best. An alternate and more efficient procedure is to apply the optimization methods taught by this invention to this constrained optimization problem. This invention teaches that a minimal elementary step in the set of possible codes should be defined, in the absence of information suggesting the use of some more complex elementary step. In the current context, an ambiguous code is a ordered list of 10 groups of letters, such that all letters occur in exactly one group, and within and across groups, the letters appear in alphabetic order. An example is ab cd ef gh ij kl mn opqr stuv wxyz. There are thus 9 gaps separating the groups. An elementary step consists of moving one letter across one gap. For instance, if we choose the second gap, we can produce in one elementary move either the code abc d ef gh ij kl mn opqr stuv wxyz, by moving the letter c to the left, or the code a bcd ef gh ij kl mn opqr stuv wxyz, by moving the letter b to the right. Given a specified code, all possible codes which can be obtained by one elementary move from the specified code can be simply generated. Given this observation, and the specification of the directed random walk method given above, it will be evident to one skilled in the art how to apply the optimization methods taught by this invention in the present context. Applying this method we find, for example, the not even-as-possible code ab cd ef gh ijklm no pqr s tu vwxyz, with a lookup error rate of 65 words/lookup error and a query error rate of 5.8 words/query. This code is shown in a preferred arrangement on the keypad of a telephone in FIG. 19. The error rates of this code should be compared to those of standard ambiguous code, with a lookup error rate of 29 words/lookup error, and a query error rate of 2.2 words/query. Thus the improvement in lookup error rate is more than a factor of 2, and the improvement in query error rate is nearly a factor of 3, with no sacrifice of easy-to-scan alphabetic ordering, nor compatibility with existing telephone equipment. It is to be appreciated that the discussion above in reference to the choice of 11- or 12-key encoding of letter symbols for a telephone embodiment apply to this embodiment as well; using optimization over partitions, substantially optimal codes for 11 and 12 keys can be produced which obey the constraint of substantial alphabetic ordering.

The method of optimization over partitions is evidently not limited to this embodiment; it could be applied, for instance, to the smart card embodiment previously discussed, to produce optimal codes with alphabetic ordering on an array of 9-16 letter-symbol bearing keys, or to Qwerty-like keyboards as discussed below. Qwerty-like Keyboards The approach used in the previous embodiment to generate a keyboard which at once 1) is compatible with a standard keyboard, and 2) is optimized with respect to various constraints, can be used to produce keyboards which are 1) similar to the standard Qwerty keyboard, and 2) are optimized with respect to various constraints. As in the previous embodiment we will maintain as well as possible the layout of the standard keyboard by maintaining the ordering of the assignment of symbols to keys, and yet optimize over partitions of those ordered symbols so as to minimize lookup and query error rates as well as possible, maintaining an even-as-possible or not even-as-possible partition. This embodiment is Qwerty-like in that that letters remain in the same row of keys as given by the Qwerty arrangement, generally implying that the number of letter-assigned keys monotonically decreases from top to bottom row, as is the case for the conventional Qwerty keyboard There exists a sequence of keyboard layouts which are Qwerty-like in that they have three rows devoted to letter keys, and variable numbers of columns, from one up to 10 columns. It is clear that with but one column, that is, but three keys, lookup and query error rates must be very high. There is but one possible ambiguous code which corresponds to the ordering of symbols of the Qwerty keyboard. This code, qwertyuiop asdfghjkl zxcvbnm, is an even-as-possible Qwerty-like code with a lookup error rate of 2.8 words/lookup error, and a query error rate of 1.1 words/query. This code of such poor quality that it is unlikely to be acceptable for any serious use. As the number of columns increases, we are able to find better and better ambiguous codes which are strongly touch typable beyond some threshold number of columns At the same time, as the number of columns increases, the device size required to contain the keyboard, maintaining substantially full-sized keys, increases as well. Thus design of Qwerty-like keyboards must be a compromise between code ambiguity and keyboard size If, for example, we wish to build a keyboard which is Qwerty-like and substantially the same size as a pocket calculator yet using full-sized keys, 7 columns can be used, as shown in FIG. 20. A not even-as-possible strongly touch-typable code, substantially optimal with respect to lookup error and query error rates is qwe r t yu i o p as d f g hjk l zxc vb n m with lookup error every 668 words, and query every 35.5 words, clearly strongly touch typable with respect to a large class of typists and keyboard uses. In FIG. 20 this code is shown in a preferred arrangement. A typable device with a keyboard as described in this figure would be suitable for note-taking, composing electronic mail, and the like. It would be readily typable with no or minimal learning by anyone familiar with the standard Qwerty keyboard, and, even built with full-sized keys, it would fit easily into a pocket.

It is to be noted that in terms of lookup and query error rates, the cost of adhering to the Qwerty convention is high, even when the convention is adhered to but approximately. In the code given above 17 keys are devoted to letter symbols. If we now allow for arbitrary assignments of letters to 17 keys, we find codes such as w r t bu gi ov p af s d ej ky l hz cx n mq with a lookup error rate of 7483 words/lookup error, and a query error rate of 290 words/query. This is equivalent to one lookup error every 30 pages of typed text, and less than one query per page of typed text. It is difficult to imagine a use with respect to which this keyboard would not be strongly touch typable.

With reference to FIG. 21, we see that this code can be laid out in such a way that 18 letters at or very close to their Qwerty positions, these letters are indicated in bold face. In this arrangement, to maximize the conservation of typing gestures typing on the Qwerty keyboard, the fingers should be placed on the home row of this optimized Qwerty-like keyboard such that the index finger of the left hand is on the (space) key and the index finger of the right hand is on the (ej) key. Notably by bringing both the space key and the 'e' to the home row, this layout makes a step from the Qwerty layout in the direction of anatomic fidelity as well as conservation of conventional gestures, in that the weight on the home row is increased relative to Qwerty, and the weight on the strongest fingers is increased relative to the Qwerty weight. By suitable assignments of symbols to keys, any ambiguous code can be brought into optimal coherence with the Qwerty (or other conventional) keyboard.

It is to be noted that by allowing some departure from strict Qwerty ordering, a very substantial gain has been made in terms of functional conservation of Qwerty gestures and layout. When the rows are slightly displaced relative to one another, such as they are in the standard Qwerty layout, much or most of the finger gestures required to operate the various keys of this Qwerty-like keyboard is the same or similar to the finger gestures required to operate the standard Qwerty keyboard. This illustrates a tradeoff between the constraints of preservation of a conventional ordering, and the constraint of preservation of conventional function.

Labeling to Optimize Cross-Platform Compatibility

In view of the many competing constraints which might be optimized, and the variety of user populations and their needs, it would be motivated in practical implementations of such devices to allow users the choice between the optimized Qwerty-like keyboard and other corresponding keyboards optimized or optimized as well with respect to a selection of other constraints, such as lookup and query error rates. This choice would be facilitated if the labeling of the keys could be changed in software. This object could be attained if each key were equipped with a display means capable of displaying at least one symbol at a time. Such display means could for instance comprise an light-emitting diode array, or a liquid-crystal display, etc, the labeling of the keys could thereby be changed in software, eliminating the need to fixedly label the keys with indicia corresponding to all of the alternate layouts It will be appreciated by those skilled in the art that the keyboard design method used to prepare the present embodiment could be applied to the conservation or partial conservation of other conventional keyboard designs, such as the Azerty keyboard used in France.

Numeric Keypad-like Keyboards This embodiment has the object of making the advantages of an ambiguous keyboards available to most computer users, with minimal cost and with no change in their existing hardware. These advantages notably include the advantage of one-hand typability, and the advantage of potential compatibility with ambiguous keyboards designed for hand-held devices. Standard 101-key keyboards for workstations and personal computers include a numeric keypad, typically to the right of the part of the keyboard laid out in a Qwerty arrangement, though it may be included as a subset of the keys in the Qwerty arrangement. This is the usual case for laptop computers Typically, there is included a set of arrow keys, or other input means effective for moving the cursor, near the numeric keypad.

Referring now to FIG. 22 we present an ambiguous code optimized for a common numeric keypad layout 600 taken together with the means for moving the cursor 601 where such is available. Said numeric keypad 600 has in this example 17 keys of various sizes. Depending on other design constraints, some or all of these keys could be used for punctuation, or other symbols, and these other design constraints could influence the choice of the number of keys to be assigned to letters, the distribution of letters and other symbols over modes and so on. The essential features of this embodiment are:

assignment of an ambiguous code to a plurality of keys in the numeric keypad optional use of the thumb-actuatable auxiliary input means to change modes.

It will be appreciated by those skilled in the art that said assignment of an ambiguous code to a plurality of keys in the ambiguous keypad can be achieved in software; there is no need for special-purpose hardware. However, if it is desired to have the keys thus assigned be labeled with the elements of the ambiguous code, then some modification of the keyboard labeling may be required. To give a concrete example of the use of an ambiguous code in this setting, we choose an ambiguous code in which letters are assigned to 17 keys in such a way as to minimize lookup error and query error rate, with respect to our standard corpus. The code illustrated in FIG. 22 af bu cx d ej gi hz ky l mq n ov p r s t w has a lookup error rate of 7483 words/lookup error, and a query error rate of 290 words/query. This same code has already been discussed above. Here the code is laid out in such a way as to preserve in part an alphabetic order. The given code has not been optimized relative to alphabetic ordering; it has only been optimized with respect to lookup error rate and query error rate. The procedure is the same as in the construction of the nearly Qwerty-ordered keyboard discussed above: first optimize for lookup and/or query error rate, and then rearrange to obtain, as well as possible, the desired order of the letters. According to the teachings of this invention, it would be possible to simultaneously optimize with respect to lookup error rate, query error rate, alphabetic ordering, and/or other constraints.

To illustrate the use of the thumb-actuated auxiliary input means for mode changing, we refer again to FIG. 22. We assume for the sake of this illustration that the auxiliary input means is comprised of 4 keys: up 602, down 603, left 604, and right 605 arrow keys. These functionalities are typically implemented with 4 depressible keys, but they are sometimes implemented as a touchpad, a joystick, or some other device capable of generating multiple, different signals as a function of manipulation by the user. It is to be noted that in FIG. 22 a plurality of keys are labeled with symbols other than those of the ambiguous code, in this case digits. These other symbols can be obtained by depressing a specified one of the four keys of the auxiliary input means. A possible assignment of modes to input means in the auxiliary keypad is

602(up) Shift key for upper case letters.

603 (down) numeric/punctuation mode.

604 (left) left symbol on key.

605 (right) right symbol on key.

It will be appreciated that 1) other assignments of modes and/or symbols to the auxiliary keypad are possible, and in accordance with the teachings of this invention, and 2) with a more complex set of auxiliary input means, additional modes and symbols can be assigned to the auxiliary input means. Assignment of symbols to modes will be discussed in more detail in reference to another embodiment. That discussion is applicable to other embodiments, including this embodiment.

Objects and advantages of 13-letter-key codes Several related embodiments of the teachings of this invention exploit the surprising benefits of optimizing ambiguous codes for keyboards in which the number of keys devoted to strongly correlated symbols is substantially half of the number of strongly correlated symbols. In particular, if we take the set of strongly correlated symbols as the set of letters [a-z] used in English, then the preferred number of keys is 13. The surprising benefits of a 13-letter-key code for English include:

strong touch-typability, ergonomic, touch-typable, unambiguous text entry.

ergonomic, touch-typable, querying.

compatibility with standard keyboard layouts (Qwerty keypad, numeric keypad, and telephone keypad), providing for conservation of typing skills from 1- to 2-handed typing, providing for an integrated mouse/keyboard.

providing a mechanism to reduce typing injuries.

Further objects and advantages will become clear in detailed specification below, which takes up in turn each of the above-listed objects and advantages.

Strong touch typability Referring again to FIGS. 11 and 12, we see that with respect to word-based disambiguation, ambiguous codes on 13 keys can be found which are strongly touch typable, even for an accomplished typist. Using the directed-random-walk method described above, we find, for instance, the code aw bn ck du of go hv ip js ly mx qt rz with a lookup error rate of 515 words/lookup error, and a query error rate of 21 words/query, (level C) strong touch typability. This code is shown in a preferred arrangement in FIG. 25. As discussed above, this query error rate can be reduced further by adjustment of a parameter which controls how important queries must be to require user attention. In the limit where querying is turned off entirely, the lookup error rate controls touch typability. With this code, lookup errors will occur on average approximately once every two pages of typed text, that is to say, at a rate much less than the rate of typing errors of even very skilled typists. Thus, 13-key codes exist which are suitable for a wide range of touch typing tasks, for a wide range of users.

Ergonomic, touch-typable unambiguous text entry With any ambiguous keyboard, and any disambiguation mechanism, it may be advantageous to provide a mechanism by which it is possible to enter information in an unambiguous manner, for instance, to add information to the disambiguation database. For all uses of ambiguous keyboards it is advantageous for the unambiguous text entry mechanism to be as ergonomic as possible, ergonomic meaning in this case simple to operate. For ambiguous keyboards meant to be touch typed, it is advantageous if, further, the keyboard can be operated in unambiguous text-entry mode in a touch-typable manner.

One strategy often employed in the prior art to achieve unambiguous text entry using a small number of keys is to use a chording method. In satisfying their urge to maximally reduce the number of keys, chording keyboard designers have consistently taught away from providing a sufficient number of keys so that chording patterns can be kept simple. By an elementary combinatorial argument, the number of keys cannot be less than ½ the number of symbols to be encoded if the complexity of a chord is never more than 2, that is, if it is never required to active more than 2 input means substantially simultaneously in order to unambiguously encode a symbol. The present invention teaches, by contrast to the prior art, to provide a number of keys no less than ½ the number of symbols to be encoded, if a simple mechanism for unambiguous encoding of those symbols is to be provided. In particular, the present invention teaches to provide at least 13 keys to represent the letters [a-z], and at least one mode changing key. Said mode-changing key such that when activated by a user in combination with one of the letter-assigned keys serves to uniquely and unambiguously encoding one of the letters associated to said one letter-assigned key In an ambiguous keyboard, some keys represent a plurality of symbols with a single keystroke. To use the same keyboard in an unambiguous mode, said single keystroke must be combined with at least one other keystroke, perhaps of the same key, to permit each individual symbol associated to the key to be singled out. For ergonomics, it is preferable that said combination of keystrokes be as simple as possible, and for a touch typability, it is preferable that substantially the same combination of keystrokes is used for unambiguous entry of all symbols. These two constraints are best satisfied if 1) the same number of symbols is associated with each ambiguous key, and (an even-as-possible partition) 2) the number of symbols on each ambiguous key is small. Taken together, these constraints imply that the preferred number of keys for an ambiguous code which is to be touch typed is one-half of the number of symbols to be represented ambiguously. And, in the case where the symbols to be represented are the 26 letters in the alphabet, the constraints taken together imply that 13 keys are preferred, in the absence of any further constraints One way this observation can be exploited to produce an ergonomic, touch-typable ambiguous keyboard with an ergonomic, touch-typable unambiguous text entry mode is described in reference to FIG. 23, and in reference to the case of ambiguous representation of the letters of the English alphabet with 13 keys. In this figure, each of the subset of keys used to ambiguously represent the letters 700, encodes exactly two letters. The typable device further comprises a mode key 701 and a means for placing the device in either ambiguous or unambiguous text-entry mode. The means for placing the typable device in ambiguous or unambiguous text-entry mode could be a software means which detects, depending on context, which of these modes is required at any given instant, or a key devoted to this mode change, or a particular pattern of input on other input means, such as a double tap on the mode-changing key 701, a long or short press of any of the keys, or many other means well-known in the art to allow a given key to correspond to several encoding symbols. When in unambiguous text-entry mode, activation of the 701 key causes one a selected symbol from the two symbols associated with a key in the plurality 700 to be encoded when said key in the plurality 700 is activated substantially simultaneously in combination with the 701 key. It is preferable to think of the pair of symbols on each key in the plurality 700 to be composed of a left symbol and a right symbol, and to label the keys with the left symbol on the left and the right symbol on the right. Then one of these, without loss of generality, the left of these, is associated with activation of the 701 key whereby unambiguous text entry can be achieved. In other words, when a key in the plurality 700 is activated in combination with the 701 key, the left symbol is selected unambiguously, and if the same key in the plurality 700 is activated without the 701 key being substantially simultaneously activated, then the right symbol is selected unambiguously. If the keyboard is designed to incorporate additional modes, then this same method of unambiguous text entry could be used also in reference to the symbols in the other modes.

Touch-typing oriented querying Even with an optimal ambiguous code, coupled to unlimited computing power and ultimate, yet-to-be discovered artificial-intelligence techniques for disambiguation, some ambiguous sequences may be generated in the course of typing a text which require intervention of a human operator to effect full disambiguation.

True touch-typists type without looking at the keyboard, keeping their eyes focused on the text being produced, or the copy being transcribed. For the touch typists, then, it is preferable to have all querying for alternate interpretations of ambiguous sequences done in such a way that 1) their eyes are not diverted from the text-display screen and 2) queries can be answered in a simple, stereotypical manner from the keyboard. These objects can be accomplished by reserving a key for advancing in a list of candidate words, and highlighting the ambiguous word on the screen. Users scroll through the list of candidate words using this scroll key, and as soon as a key other than the "scroll" key is pressed, the word in the scroll box is considered selected.

With reference to 23 and 24, we explain in detail the software underlying touch-typing-oriented querying, and the visual display it controls. In the first step 800 a query has been detected, that is, the disambiguation mechanism has discovered that more than one meaningful decoding sequence in the database corresponds to the input encoding sequence. Entrance in the query mode causes a means to draw the users attention to the decoding under query to be display. These means could be visual means such as the framebox 702 shown in FIG. 23. The possible decodings are then ordered according to their likelihood (step 802). Then, (step 804) the most-likely decoding is displayed on the screen, in context with the text previously entered, in a place indicated by the attention means. The software is then prepared to detect either input from the scroll key, or some other key (step 806). If some input is received from some other key, then the means to draw attention to the user is removed (step 808), the decoding is added to the text previously entered (step 810), and ambiguous text entry mode is reentered.

On the other hand, if input from the scroll key is detected at step 806, then a test is performed to see if there exists any other meaningful decodings in the data base 812. If there is, the current decoding is replaced with the next most probable decoding (step 814), and step 806 is returned to. If there is no next-most-probable decoding, then, preferably, the typable device enters unambiguous text entry mode as described above (step 816), when the decoding sequence has been unambiguously entered, the means to draw attention to the user is removed (step 808), the unambiguously entered decoding is added to the existing text (step 810) and ambiguous text entry mode is reentered (step 818).

While this method for in situ presentation of alternatives has been presented in terms of touch-typing-oriented querying, it will be appreciated that the same method could be applied in other contexts, such as when the "decodings" are words with related meanings, and the database is a thesaurus, or when the "decodings" are various possible translations of a word into a foreign language, and the probabilities of the decodings are supplied by an automatic translation program.

Conservation of design across platforms as a constraint: a mouse/keyboard Consider a user of a small typable device equipped with a one-handed touch-typable keyboard, such as a personal digital assistant. In the course of a typical day, the user might also type on his or her desktop computer equipped with a two-handed keyboard. If both of these devices are to be effectively touch typable for that user, the motor patterns used in the one- and two-handed keyboards must be as similar as possible. The shorter the interval between the uses of the two keyboards, the stronger the requirement for conservation of typing skills. To sharply draw the object of conservation of typing skills across platforms, and the means by which this invention achieves this object, we now turn to an embodiment in which 1- and 2-handed keyboards may be used in rapid alteration.

This embodiment concerns a one-handed keyboard suitable for entry of data into forms, such as spreadsheets or web-based forms. It will be of use for interaction with a program, such as a game or a drawing program, 1) which requires quick alternation of typing and cursor movement, and/or 2) where the symbol set which is appropriate for entry may vary depending on where the cursor is on the screen. Using the standard computing configuration of a Qwerty keyboard and a mouse, users must remove their hands from the keyboard to move the mouse. In tasks which involve both typing and mouse manipulation in rapid succession, such as labeling a design presented on the computer screen, or filling in a form, such as an HTML form, this alternating use of mouse and keyboard can be quite slow and laborious. In this embodiment, a one-handed keyboard is mounted in a frame which may be moved over a surface and thus perform the functions of a mouse as well as a keyboard. Since users may prefer to use a two-handed keyboard for predominantly text-entry tasks, and intermix usage of the one-handed keyboard with use of the one-handed keyboard, it is desirable to have the layout of keys on both keyboards be as similar as possible, so as to permit seamless transfer of touch-typing skills from the two-handed to the one-handed keyboard.

Referring now to FIGS. 25, 28 and 26, we see how this object can be attained by the choice of an ambiguous code which is such that it can be laid out on the one-handed keyboard so that the movements of the fingers and the thumb of one hand (in this case the right hand) are the same, whether that hand is typing on the one-handed or two-handed keyboard, and that, further, the typing movements of the other hand are similar to the movements of the hand chosen for one handed typing.

The design strategy is as follows:

Choose a 13-key code with substantially minimal lookup error rate and query error rate.

Choose a physical layout for the 13 keys. A layout with 5 keys in the top row, 5 keys in the middle (home) row, and 3 keys in the bottom row is a preferred arrangement.

Choose which hand will actuate the one-handed keyboard.

Arrange the keys such that, in the one-handed layout, and relative to the hand chosen in the previous step: where
- weight on the home row is maximized.
- weight on the strongest fingers is maximized.
- weight on the top row is higher then weight on the bottom row.

Then, to obtain a layout for the two-handed keyboard, pair each key actuated with the left-hand to a key actuated by the right hand. Preferably, the pairing is done so that members of the pair are laid out symmetrically, with respect to a symmetry plane which cuts the keyboard at the center, and runs from the bottom to the top of the keyboard.

Of the two symbols associated to each of the 13 original keys, associate one symbol to one of the keys in each pair chosen in the previous step. This can be done in a way favoring the one-handed keyboard, or in a way favoring the related two-handed keyboard.

- If favoring the one-handed keyboard: retain the higher-probability letter on the chosen-hand side of the two-handed keyboard, and place the lower-probability letter on the opposite side of the keyboard.
- If favoring the two-handed keyboard: for each of the 13 keys, choose to place either the lower or the higher probability letter on a given side of the two-handed keyboard so that the summed probability on each half of the keyboard is as equal as possible.

Beginning with the 13-key code selected to illustrate the teachings of this embodiment, and choosing to favor the right hand, one constructs the keyboard layout described in FIG. 25. When this one-handed keyboard is expressed as a two-handed keyboard, the resulting layout is shown in FIG. 26. On this keyboard, the right hand types approximately 84 percent of the letters, while the left hand types approximately 16 percent of the letters. This asymmetry is desirable in that the large majority of keystrokes will be performed in exactly the same manner whether the one-handed or the two-handed keyboard is used.

Conversely, if most typing is done with a two-handed keyboard, and only occasionally with a one-handed keyboard, it may be desirable to have as even as possible weight on the two hands when used to operate the two-handed keyboard. This object can be achieved with an alternate layout of the two-handed keyboard as shown in FIG. 27. It will be appreciated that substantially 50 percent of the typing motions used in typing on the two-handed version of this keyboard are the same as the typing motions used on the one-handed keyboard, whether the one-handed keyboard is typed with the right or the left hand.

It will be appreciated that for a 13-key ambiguous code there are $2^{13}$ different ways of pairing homologous left- and right-hand keys of a two-handed keyboard. This number is small enough that the symmetry of the weights assigned to the two hands in each set of pairings can be evaluated, and depending on whether a most-symmetric or most-asymmetric weighting is desired, or some intermediate value, the appropriate assignment can be selected.

Referring now to FIG. 28, a detailed view of the one-handed keyboard, we see how the objects of this embodiment are achieved by equipping the keyboard with a plurality of keys 300, a thumb-actuatable input means 301, mouse keys 302, a palm grip 303, and a display 304. The keyboard may be further equipped with a communication means to enable symbol selections by means of the keyboard to be communicated to the computer. This communication means could be simply a wire, or a wireless communication means such as an infrared communication means. The keyboard is slidably supported on a support means, such as a desktop, whereby the keyboard can be moved over the support means by means of pressure from the base of the palm of the hand actuating the keyboard. The keyboard is preferably equipped with a means for palm grip means for engaging said base of the palm to allow said pressure to be effective in moving the keyboard. Said means for engaging said base of palm of the hand operating the keyboard are preferably formed means where the form is such that slight pressure is effective to move the keyboard in any desired direction. For instance, the form could be an indentation in the body of the keyboard which securely engages the base of the palm. By moving the keyboard in this way, the fingers of the hand actuating the keyboard are free to move in a way effective to actuate the keys, even while the keyboard is in motion. Thus this keyboard can be used in situations, such as for playing computer games, in which motion needs to be simultaneously input along with symbol sequences such as text.

It is to be noted that while this device performs the functions of a mouse, it bears little physical similarity to a mouse. Its form factor is determined by the anatomy of the hand in a comfortable position for touch typing. The device must therefore be considerably larger than a standard mouse, and the means for moving the device substantially different.

To communicate motion of the keyboard 305 to the computer, said keyboard is equipped with a motion sensing means, such as a trackball, familiar to those skilled in the art. Preferably, the keyboard 305 can be further equipped with a biasing means, such as springs, to lift the keyboard away from the support means when the weight of the hand on the keyboard is lessened, thus facilitating movement. In contradistinction, when the substantially full weight of the hand is applied to the keyboard, the keyboard remains relatively stably fixed to the support means whereby typing is facilitated.

The two-handed keyboard may thereby be used for long typing episodes, uninterrupted by the need to move a mouse, and the one-handed keyboard for quick typing/mouse movement alternation.

Visual Representation of the Keyboard It will be appreciated that when using a single device which supports more than one ambiguous codes, or more than one mode, it may be helpful to the user to have a representation of the current association of keys with symbols at any given moment displayed on the displayed device. While such a representation could be of value for any typable device, it is of particular utility for touch-typable devices, since for such devices, some or all of the keys are hidden from view (typically by the fingers of the operator) while in use. Thus, any display means integrated into the keys is of limited utility for the touch typist. The most useful visual representations are those in which the physical layout of the keyboard is represented in the visual display. Such a device 304 is shown in FIG. 28, but could be incorporated in many of the embodiments described in this disclosure.

Reduction of typing injury Typing injuries (repetitive stress syndrome) afflict many keyboard users. Numerous keyboards have been designed in an attempt to attenuate the stress of the repetitive motions involved in typing. It has long been recognized that the most effective means to reduce typing injuries is for the typist to take regular breaks from typing. This is seldom practical, however, as typists are often under time pressure to complete their typing work. The one-handed keyboard just described offers a solution to this problem. While the one-handed version of the present embodiment has been described as being used with the right hand, it is evident that the same design methods lead to a left-handed one-hand keyboard as well. Each of these keyboards is capable of encoding all of the same symbols. A therapeutic typable device equipped with both a right-handed and a left-handed keyboard, such as both a left and a right-handed mouse/keyboard as described above, could be operated with either the left or the right hand in alteration. With such a pair of keyboards, a user wishing to reduce repetitive-stress injuries could type for some period of time, for instance, for 15 minutes, using one of the keyboards, and then switch for the next period of time to the other keyboard, whereby the user gives each hand a resting period, with no decrement to typing productivity. If desired, the typable device could be equipped with a locking means which would alternately lock one or the other of the keyboards, enforcing alternating use. It is to be appreciated that when therapy is completed, the user could return to a two-handed version of the keyboard, with no relearning of typing skills required.

Foldable PDA We saw in the smart-card embodiment described above that it is convenient and ergonomic to place the text screen of a typable device based on ambiguous codes in such a way that part of the keyboard is manipulated by the fingers of one or both hands and the thumb may be used to actuate further input means, in particular, mode-changing input means, in the region above the thumb or thumbs and to the side of the finger-manipulated part of the keyboard. The present embodiment concerns a typable device at a somewhat larger scale which uses the same concept in conjunction with a folding concept in order to design a twice-foldable information appliance which may ergonomically perform different functions when it is unfolded, once folded, and twice folded.

This twice-foldable design is a surprising consequence of ambiguous codes. It is remarkable that typable devices built by the methods taught by the present invention permit keyboards which are at once 1) effective for the coding of natural language, 2) use substantially full-size keys, and 3) are small enough to be placed in a pocket or a small hand bag. This embodiment is based on building a hand-held computing device from substantially same-sized elementary units which are the size of a keyboard designed for an ambiguous code, said units being configurable in a variety of ways depending on the instant needs of a user. The elementary units can be foldably and/or detachably connected to each other in each of a variety of configurations. In this way the computing device can alternately play the role of a laptop computer, a personal digital assistant, a telephone, a gaming device, and so on.

With reference first to FIG. 29 we specify in detail a twice-foldable computer built from four substantially same-sized parts, each of which is adapted to perform a specified function and are connected to each other in a foldable and/or detachable way. FIG. 29 shows such a device in the unfolded state. It is thus revealed that one of the parts 900 has a first surface which functions as a first visual display, while 901 has a first surface which functions as a first keyboard and 902 has a first surface which functions as a second keyboard. Preferably, the keyboard layout on said first and second keyboards is a 13-letter-key keyboard, though many other choices are possible. The final part 903 has a first surface which functions as a pair of mode-changing thumb switches, to be used in combination with the said first and second keyboards. The first keyboard is meant to be operated with the right hand. It will be evident to those skilled in the art that a similar configuration exists which is typable with the left hand, and that this similar configuration can be obtained by simple rearrangement and reattachment of the four parts. Indeed, a two-handed keyboard can be obtained from by detachment and rearrangement of the four units as shown in FIG. 33.

FIG. 30 shows the unfolded twice-foldable computer in a bottom view. Part 904 is a telephone keypad 905 and corresponding second visual display 906. Part 907 is a third visual display, and part 908 a third keyboard. Parts 904, 905, 906, 907 form the second surfaces of parts 900, 901, 902, 903 respectively.

Folding the computer along the line 908 shown in FIGS. 29 and 30 we obtain the configuration shown in FIG. 31. In this configuration the third keyboard is exposed for typing, and the third visual display is used as the corresponding display. Here the keyboard layout is a 12-key keyboard, but many other choices are possible. This configuration might be used when, due to time or space limitations, the user is unable or unwilling to open the computer to its full extent. It might also be used to supply a different functionality than the fully unfolded computer, such as a gaming functionality.

Finally, the computer can be folded along the fold 909 shown in FIG. 31 to provide the twice-folded configuration shown in FIG. 32. This is the configuration in which the computer would be typically kept for transportation; in this configuration the device could be small enough to fit into a pocket. Further, in this twice-folded configuration the telephone functionality is exposed for use. For many users, this will be the most frequently used configuration of the device. It will be noted that we have shown the telephone keypad with the ambiguous code of a previous embodiment, though many other choices are possible.

To recapitulate: thanks to ambiguous codes, we can design a portable communication and computing device which functions alternately as a telephone, a personal digital assistant, and a laptop computer.

It will be appreciated by those skilled in the art that if each of the elementary units, including the keyboard units, are built from touch-screens, then the variety of configurations and uses of this device could be further increased. What would be lost, however, is the tactile feedback from the keyboards built from standard, depressable keys. Many other variants are possible, consistent with the teachings of the present invention.

Software embodiment for a typable device comprising a touchscreen This invention permits software as well as hardware embodiments. In particular, the methods of the present invention can be used to design typable mechanisms for devices comprising touch screens, such as the series of personal digital assistants built by the 3Com corporation and sold under the trademark PALM PILOT, as well as other trademarks, For the sake of illustration, we will focus on the PALM PILOT class of devices, which includes hand-held computers capable or running a variety of applications programs, though the methods herein described could be applied to any typable device comprising a touch screen.

In reference to FIG. 34, we note that devices of the PALM PILOT class typically comprise: a touch screen 1000, a touch-sensitive region 1001 which is used for entering characters via hand-writing recognition software. Said touch-sensitive region may be a subregion of the touch screen, or may be implemented separately.

One of the essential and surprising features of the present embodiment is that by use of a touch-typable keyboard in a device comprising a touch screen, we design a radically new user interface for information appliances such that keyboards need not compete for limited screen space with applications programs. The same touch screen area can be used both for the application program and for the keyboard.

The crucial observation is that if the keyboard=has fixed letter assignments to keys, then the keyboard does not need to be displayed to the user to be operative. The user's fingers "know" where the keys are, without visual referents. Thus, the keyboard can be used to enter data into which ever application program is currently displayed on the touchscreen. If, further, the keyboard is strongly touch typable, then the keyboard can be used to produce high quality text, even if no screen space is used for querying feedback to the user.

With reference to FIGS. 34 and 35, some of the particular features of the PALM PILOT class of devices which are accounted for in the present embodiment are:

The ability of the touch screen 1000 to easily present alternate keyboard layouts.

The ability of a touch screen to present images of different levels of intensity and/or in different colors.

The placement of the region for entering characters 1001 at some remove from the touch screen, or in a non-central region of the touch screen.

The use of the personal digital assistant to run a variety of programs, such as scheduling programs or address-book programs, which may compete for space on the touch screen with a keyboard.

The ability of touch screens to easily present alternate keyboard layouts is used in this embodiment to enable a given input means to represent many different symbols or groups of symbols, depending on the "mode" of the keyboard at any given time. When a touch screen is used to embody a keyboard, each input means is associated with a specified region of the touch screen. The dual function of the touch screen as a visual display and as a plurality of mechanically activated input means is exploited to give each input means different functions and different labels depending on mode. It will be appreciated, however, that the same effect could be obtained with mechanical keys of a traditional, depressable structure by equipping each mechanical key with its own display device. In this way, the methods for mode changing here specified in reference to a touchscreen comprising device could be applied to devices comprising mechanical keys, such as many of the other devices specified in the present disclosure.

Mode Selection One strategy in keyboard design to increase the number of symbols which can be encoded given a fixed number of keys is to augment the keyboard with a number of mode-changing keys. Pressing a mode-changing key changes the symbol encoded by a plurality of other keys. The canonical example is the shift key of the standard typewriter keyboard which changes the symbol encoded by the letter keys from lower case to upper case. Upper-case letters could in principle be encoded on a separate set of keys from the keys encoding lower-case letters, and if upper-case letters occurred with the same frequency as lower-case letters in typical communications, then this could be a defensible choice. Also in principle, having upper- and lower-case letters accessible in different modes does not imply that an upper-case letter must be assigned to the same key as the corresponding lower-case letter. The same-key assignment is chosen in practice because there are strong conventional, conceptual and statistical relationships between lower- and upper-case letters.

Thus there are three principles which guide the assignment of symbols to modes and of symbols to keys within modes: adherence to statistical relationships, adherence to conventional relationships, and adherence to conceptual relationships between symbols. In the design of typable devices employing ambiguous codes the problems associated with the design of modes are particularly acute since a plurality of keys must already carry the burden of encoding more than one letter symbol on each key, and the number of keys available to encode symbols is typically sharply limited. However, the same methods which have been above applied to produce ambiguous codes for letter symbols can also be applied to non-letter symbols such as punctuation, provided that these non-letter symbols are strongly correlated.

The collection of symbols to be encoded by a keyboard will be divided into subsets corresponding to modes. Modes can be at least partially ordered according to how much manipulation is required on the part of the user to obtain each mode and/or how frequently the symbols in each mode are used. Thus we can speak of primary, secondary, tertiary modes and so on in order of increasing amounts of manipulation required to obtain each mode and/or decreasing probability of the symbols in the mode.

Letter symbols are preferably placed in the first mode or modes. The subtle design issues have to do with methods for assigning non-letter symbols to modes, and arranging the spatial layout of each mode.

A first statistical measure to be taken into account is the probability of non-letter symbols. Some of these non-letter symbols, such as punctuation marks and digits, are essential to communication and may occur with a frequency rivaling or exceeding those of letter symbols. These punctuation marks are candidates for inclusion in the primary or secondary symbol set in any effective keyboard design. Next to be considered are correlations which arise from non-letter acting in concert with other non-letter symbols. Some non-letter symbols have conventional and conceptual relationships with other non-letter symbols, for example, the symbol (left parenthesis) is related to the symbol) (right parenthesis), as the two symbols act together to express meaning. The symbol . is related to the symbol , as the two symbols express similar meanings (end of a phrase or sentence). These are examples of global relationships, common to most uses of the language, in these cases including languages such as English. There are other, more local, relationships which could be accounted for in keyboard designs for specialized purposes, such as the relationship between : and / in the expression :/ commonly used in site addresses on the World Wide Web (URLs or Universal Resource Locators).

Non-letter symbols may also have statistical, conventional, and conceptual relationships with letter symbols. For some symbols, it is possible to analyze their statistical relationships with each other with reference to a corpus. For others, user studies are needed, or specialized software to capture these symbols for statistical analysis, since the symbol may never appear in a text. Examples here are "backspace", "page up", and other symbols which are used to edit, examine, or otherwise manipulate a text.

Given reference statistics constructed in this way, a next step in the assignment of symbols to modes is to arrange the symbols in such a way that the statistical, conventional, and conceptual relationships are best satisfied. A further constraint which could be taken into account is the mnemonic potential of the arrangement. Preferably, all symbols are arranged within and across modes in a way that "makes sense", that is, that the symbol pattern is simple, familiar, preferably visually well structured. Even well-trained touch typists may revert to a visual scanning mode to find infrequently used symbols on a keyboard. Thus, mnemonic potential may be the overriding concern in the arrangement of modes devoted to less-frequently used symbols. It is to be appreciated that mnemonic potential can be quantified using experimental protocols for memorization tasks well-known to psychologists.

To illustrate the approach, an example layout of letter symbols [a-z], digits, and the 32 nonletter symbols

~!@#$%^&*( )_-+={[]|\:;"'<,>.?/ found on a standard keyboard is provided. This arrangement comprises three mode changing keys, and 3 modes, each mode containing 16 symbol keys, as shown in FIG. 36A-C. This layout is designed for PALM PILOT class machines. It has not been shown to be optimal by psychological testing.

The first mode (FIG. 36A) contains an ambiguous code for the letters, a space/backspace key, a basic punctuation key, and a key for shifting modes in either the forward or the backward directions.

The second mode (FIG. 36B) contains keys for the digits, and certain punctuation marks, arranged so that this mode can function either as a telephone, or as a rudimentary calculator/numeric keypad.

The third mode (FIG. 36C) contains additional punctuation marks, arranged so that 1) a shift key relates symbols with related meanings, such as open and closed parentheses, or, if there is no related meaning, related symbol shapes, as an aid to remember the symbol placements. A convention is applied whereby "hard" symbols, more angular symbols, are on the left, while "soft" symbols, more curved symbols, are on the right. Since all or most keys have exactly two symbols, ergonomic disambiguation mechanisms as described above can operate in each mode.

Selectable transparency of the keyboard Currently, typically implementations of a keyboard displayed on a touch-screen device in the PALM PILOT class comprise a keyboard occupying one part of the screen, while the rest of the screen is devoted to an application program which receives input from the keyboard, such as an address book application. Since display real estate in such devices is extremely limited, sharing the display between keyboard and application program results in both keyboard and application program being very small. Keyboards used in present devices are not meant to be practically touch typable, nor could they be, given their extremely small size. However, application of the methods of this invention produces keyboards which are small enough to be touch typable, even in the limited environment of the touch screen of a personal digital assistant. The important observation is that since the keyboard is touch-typable, it does not have to be displayed to the user. The user's fingers "know" where the keys are, without the user having to see them. Thus the keyboard can be made transparent, occupying the entire touch screen, while the application program can be opaque, and also occupy the entire touch screen. Displayed in this way, the user types directly on the application program to produce input to it. In FIG. 35 a keyboard displayed in this way 1003 is shown with an application program 1002 in this case a drawing program displaying a drawing. Since it is impossible to draw a transparent keyboard, the keyboard is indicated in this figure in a shade of gray, while the application program is shown in black. Indeed, it would be possible to allow the user to select the level of transparency of the keyboard, for example, as a function of his or her level of touch typing skill.

It has already been pointed out that different modes may contain symbols of different levels of familiarity to the user. To account for these differences, the transparency of the keyboard could also be adjusted as a function of mode, becoming increasingly less transparent as the unfamiliarity of the symbols in the mode increases. It is to be noted that the same effect of distinguishing the keyboard for the applications program could be accomplished by adjusting other visual factors, such as the color of the image, in addition to its transparency.

Hybrid Chording/Ambiguous Keyboards The important observation on which this aspect of the present invention is based is that chording patterns which require but two keys to be activated substantially simultaneously, such as the chording pattern which causes a Qwerty keyboard to encode capital letters, are readily learnable and can therefore be adopted by a large user community. However, the prior art has proven that chording patterns any more complex than this will not become generally accepted.

It has been noted that there are two main prior-art approaches toward typable devices with a small number of keys: chording methods and ambiguous-code methods. One aspect of the present invention is to teach how to synergistically combine these two methods.

We can distinguish two kinds of chording methods 1) methods in which a key or keys are reserved for the function of forming chords, an example is the familiar shift key used for keying uppercase letters by a chording combination of the shift key with a letter key, and we will generally refer to such keys as shift keys, 2) methods in which chords are formed by activating a plurality of letter keys substantially simultaneously. In the present embodiment the first of these methods is used, in a subsequent embodiment, the second of these methods is used.

The essential insight of this aspect of this invention is that substantially simultaneous activation of a pair of input means is readily unified into a single gesture by a human user. Thus, a pair of keystrokes is no or little more difficult to master than a single keystroke, yet, a pair of keystrokes contains substantially more information than a single keystroke, and thus can be used to create easily operable, low-ambiguity codes and typable devices based on these codes. Thus, to make the keyboard easy to learn, chords must require no more than a pair of keys to be activated substantially simultaneously. Such an ambiguous code which uses a maximum of two keystrokes (encoding symbols) to encode any given letter (decoding symbol) will be referred to as a max-2 ambiguous code, (see FIG. 50). In this embodiment, one of the pair being a key reserved for forming chords. Such an encoding symbol will be referred to as a combining encoding symbol, see FIG. 51), and the other encoding symbol of the pair is generated by a key corresponding to at least one decoding symbol. Such a key will be referred to as a decoding-symbol-assigned key or letter-assigned key. Rare symbols may still require more than two keys to be activated substantially simultaneously, and very frequent symbols could be associated with a single input means without exceeding the scope of this invention.

It is preferred that at least one of the decoding symbols is a strongly correlated symbol. In this way, should a chord be formed improperly, when a shift key is activated when it should not be or not activated when it should be, the disambiguation software may be able to correct for this error.

Thus, while chording and ambiguous codes could a priori be combined in any number of ways, according to the teachings of this embodiment, preferred combinations are such that no more than 2 input means need be substantially simultaneously activated in order to encode any substantially probable symbol. That is, a max-2 ambiguous code is preferred, see FIG. 50.

lookup error and/or query error is optimized, chording is accomplished using a mode-shift key, that is, a combining encoding symbol, (preferably) such that the probability of using the mode-shift, key is minimized, that is, combining encoding symbol plus decoding-symbol-assigned-key combinations are less frequently activated than decoding-symbol-assigned keys in isolation.

When chording and ambiguous-code methods are combined according to these teachings, surprising and synergistic results are obtained as will be demonstrated by the present embodiment in which a hybrid chording/ambiguous-code method is applied to a telephone embodying the standard ambiguous code. We have already seen that the standard ambiguous code has rather poor lookup error and query error rate. It is therefore quite extraordinary that using a hybrid method a keyboard based on the standard ambiguous code can be made (level C) strongly touch typable, and the standard ambiguous code with 6 effective keys is transformed into a code with 13 effective keys The objects of this embodiment are to produce a keyboard which is strongly touch typable, fully compatible with standard telephones embodying the standard ambiguous code, simple to operate, simple to learn, and uses a minimal number of keying gestures.

A standard telephone embodying the standard ambiguous code is shown in FIG. 38. It is seen that a plurality of keys 10000 are used to encode letters and digits, there are eight of these. Two keys 10001, 10002 encode only digits, and two keys 10003,10004 encode the non-letter symbols * and # respectively. In this embodiment, one of the keys selected from the group consisting of 10001, 10002, 10003, 10004 will be used as a mode-changing key, generating a combining encoding symbol, preferable key 10001 encoding the digit 1. This selected key will be referred to as the shift key, for reasons which will become evident, though any means of generating a combining encoding symbol could be used. Key 10001 can be conveniently activated by the thumb of the left hand while the telephone is held in the left hand, while the right hand is used to activate the other keys. For an embodiment in which the right thumb is used to active the shift key while the telephone is held in the right hand, key 10004 can be used as the shift key.

For each of the keys in the plurality 10000 the corresponding letters will be divided into two subsets, which will be referred to as the shift set and the nonshift set respectively. That is, the shift set contains max-2 sequences of encoding symbols which consist of one combining encoding symbol and one key-assigned encoding symbol, whereas the non-shift set contains a single key-assigned encoding symbol. Note that elements of both shift- and non-shift sets of encoding symbol sequences could correspond to more than one decoding symbol under the ambiguous code.

Letters will be assigned to the (shift, nonshift) sets so that lookup error is minimized, queries are minimized, one of the sets, without loss of generality, the shift set, contains exactly one letter per key, That is, we make the further limitation that the combining encoding symbol and key-assigned encoding symbol pairs in the shift set are unambiguously mapped to a single decoding symbol so that when the pair of encoding symbols is input the associated decoding symbol is explicitly and unambiguously selected for output, see FIGS. 51 and 52 the probability of activating the shift key is minimized.

As is usually the case, simultaneous optimization with respect to lookup error rate, query error rate, and other constraints implies compromise. For instance, one could potentially achieve better lookup error rates and query error rates by removing the limitation just made that one of the (shift, non-shift) sets is mapped to a single decoding symbol, so that only a single letter per key and allow, rather, the number of letters in the shift set to vary from key to key. However, regularity of the partition into shift and non-shift sets makes the keyboard easier to learn, a constraint which is here given high priority. Learnability could be further improved by selecting the singletons such that the collection of singletons is easy to remember, perhaps by mnemonic. This selection, however, could compromise lookup error rates and query error rates.

There are 11664 different pairs of shift/non-shift sets obeying the constraint that the shift set contains but one letter per key. This number is small enough that all possibilities can be tested for their properties.

The results of testing all such codes are shown in FIG. 39, where lookup error rate is plotted vs. query error rate, for all 11664 codes, as well as the standard ambiguous code SAC. It is to be noted that while all of the codes are belief than the standard ambiguous code, most are belter by a small multiple. However, this distribution is quite large, and the best code CEHLNSTY with a lookup error rate of 431 words/lookup error and query error rate of 21 words/query is 15 times better than the standard ambiguous code in terms of lookup error and 10 times better in terms of query error. This best code is abC dEf gHi jkL mNo pqrS Tuv wxYz where the elements of the shift set are written with uppercase letters. It is to be emphasized again that this code is the best code with respect to our reference statistics, other statistics may yield other best codes, though it appears to be among the best for statistics drawn from many alternate corpora of English. It should be further appreciated that the same hybrid chording/ambiguous code method could be applied to arbitrary ambiguous codes in which the underlying ambiguous code is not constrained to be the standard ambiguous code, indeed is not constrained to be in alphabetic ordering, or only 8 keys, or with an even-as-possible partition. By allowing more freedom to choose codes, hybrid chording/ambiguous codes can be found of such high quality in terms of lookup error rate and query error rate that other constraints, such as minimizing use of the shift key, could be profitably combined with optimization of lookup error rate and query error rate. These optimizations are beyond the scope of the present embodiment, which seeks full compatibility with existing telephones, they are however, well within the scope of the present invention.

To further facilitate the learnability and operability of this keyboard, the letters which form the shift set are preferably represented on the corresponding key using an uppercase letter, while the letters in the nonshift set are represented as a lowercase letter, as shown in FIG. 38. Alternately, the two sets could be indicated by lettering varying in size, color, typeface etc.

Use of this device is simple. When the text to be typed contains a letter in the shift set, then the shift key must be operated substantially simultaneously with the corresponding letter key, this letter will be represented unambiguously. By contrast, when a letter in the nonshift set is required, the corresponding letter key is operated, and the letter is represented ambiguously.

In view of the teachings of this invention, it will be appreciated that the disambiguation mechanism corresponding to this embodiment could be physically located within the telephone, at the sending end of the communication, and or at the receiving end of the communication, for instance at a central computer which the user contacts by telephone.

As we have seen, on the standard telephone keypad there are 4 keys available to encode non-letter information such as mode changes. Using the method of synthesized encoding symbols described above, the number of non-letter symbols encodable using a telephone keypad can be further increased. In particular, added shift keys can be provided if even lower levels of ambiguity are required. For instance, with 4 shift keys, each associated to one letter on each letter key, totally disambiguous text entry can be achieved, albeit while increasing the number of keystrokes per letter. In short, many associations of subsets of decoding symbols with shift keys can be imagined. One particular class of assignments is considered in a later section on internationalization of these teachings, up to now described in detail mainly with respect to English.

It will be appreciated that using the shift key in combination with the remaining non-letter keys, in the preferred arrangement the *, # and 0 keys, can be used to encode at least 6 non-letter symbols, such as punctuation symbols, mode-shift symbols, and the like.

Error correction using the standard ambiguous code Especially when used by a novice user, the keyboard of the present embodiment could be operated in such a manner that the shift key is pressed at times when it should not be to encode the in tended text, and at other times the shift key will not be pressed when it should be. Often, such a manipulation will result in a meaningless decoding if the disambiguation device is expecting correctly typed encoding sequences in the hybrid chording/ambiguous code. In these cases, rather than issuing a query, an alternate disambiguation can be attempted in which the shift key activation is ignored, and the encoding sequence is interpreted as being an encoding sequence in the standard ambiguous code. Often, this interpretation will recover the text intended by the user.

It is to be noted that in the device shown in FIG. 38 a strongly correlated symbol (space) is paired on the same key with a weakly or uncorrelated symbol (backspace). This pairing potentially allows disambiguation software to correct errors in which (space) is meant but (backspace) keyed by the user, or vice versa.

Touch-typing-oriented querying It is preferable in this embodiment to use the selected shift key as the scroll key for querying, when querying is permitted, as described above. It will be appreciated that whether the key functions as a shift key or a scroll key at any given moment can be determined automatically given the appropriate software.

When the device is in querying mode the key functions as a scroll key, and otherwise functions as a shift key.

Alternate placement of shift keys Referring again to FIG. 38, we note that this embodiment has been designed to be operable using existing, standard, telephones. If telephones are manufactured with use of this embodiment in mind, they are preferably equipped with additional key or keys 1005 to function as the shift key. It is preferred to place these additional keys on the sides of the telephone, where they can be actuated by the thumb of the hand holding the telephone; such a placement is shown in FIG. 38. Additional keys to be actuated by the fingers of the hand holding the telephone (either the left or the right hand) may also be used 10006.

Culling infrequent words in queries It is often the case that a very frequent word is ambiguous with a very infrequent word. For instance, in the case of CEHLNSTY for English, the very frequent word "for" is ambiguous with the very infrequent word "fop". By eliminating these very infrequent words from the dictionary, the effective query error rate can be improved with very little effect on how well that dictionary represents the language in question. For instance, the query error rate for CEHLNSTY can be improved to 1 query every 46 words, by eliminating words whose total probability is less than one part in 50 thousand. This culling can be achieved for instance by application of a "gap factor" given by the ratio between two words in the query, e.g. the most frequent and the least frequent. If, for instance, the gap factor is set to 500, the distribution of FIG. 39 is obtained, two codes, the standard ambiguous code (SAC) and the CEHLNSTY code are particularly pointed out in this drawing.

Internationalization There are two main issues in internationalization of the present embodiment, both of which are readily solved by a person skilled in the art in application of the teachings of this invention. These are 1) handling accents, and 2) creation of generalized codes which are applicable to many languages at once. Both of these issues will be briefly discussed.

Handling accents. Many languages are written with letters which may appear in both an accented and an unaccented form. For example, in French, "e" may be written as "e", "è", or "é". It is generally important to distinguish these accented letters. Without accents, for instance, the word "èlève" (meaning "student") can be ambiguous with the word "èlevé" (meaning "raised"). One natural approach is to use another shift key, which we can call an accent-shift key which has the function of selecting an accented version of a letter when used in combination with a key encoding that letter. For instance, to treat French using CEHLNSTY, we can key the accent shift key in combination with the "def" key to encode either "e" or "'e", and then rely on a disambiguation mechanism to decide which of these two accents is appropriate for a given word. Using this approach, we find that with some set of word-frequency statistics for French, a (lookup, query) rate of (38,3) for CEHLNSTY without an accent-shift key, but (584,24) with an accent shift key. For the telephone keypad, any of the keys on the bottom row could be used as an accent shift key, for example. In specially built keypads, an additional key could be provided to supply the accent-shift function. For ergonomic reasons, it is preferable that this accent-shift key be operated in a manner similar to the way the usual shift key is operated, e.g. such that thumb motion in one direction is used to encode a regular shift operation, while thumb motion in an opposite direction is used to encode the accent-shift operation.

Multi-Language Ambiguous Codes Since the statistics of one language are typically different from the statistics of another language, a code which is substantially optimal with respect to one language may not be substantially optimal with respect to another language. A code which is strongly touch typable with respect to one language may not be strongly touch typable with respect to another language.

For example, CEHLNSTY, optimized for English, performs less well for French than a code specifically chosen for its optimality with respect to French. In this particular example, CEHLNSTY remains strongly touch typable with respect French, though this will not be the case with respect to all languages.

In order to gain economies of scale, manufacturers may wish to produce a single machine operable in many local linguistic environments. Since a typable device, for instance, a mobile phone, may preferably have keys labeled with the ambiguous code for which it is designed, it is useful to have a single code which applies to many languages, so that this labeling can be done in the same way for all machines in a production run, regardless of the target linguistic community.

Applying exactly the same techniques as have been already described, it is possible to produce ambiguous codes which are simultaneously optimized with respect to several different languages. In a multi-language optimization method, the step of weighting constraints with respect to each other can include as a sub-step the step of weighting multiple languages with respect to each other. Different weighting schemes are appropriate in different circumstances. For instance, one may choose to simultaneously optimize with respect to statistics of English and German, and yet weight performance of the code with respect to English as more important than performance with respect to German.

A preferred weighting method is one in which the minimum performance is maximized, such a procedure will be referred to as a mini-max procedure.

Consider optimizing with respect to a set of languages l1, l2, . . . , ln, and a set of ergonomic constraints, e1, e2, . . . , em. Given two ambiguous codes c1, c2, and for each constraint em, we rate c1 as better than c2 if for c1 the minimum of em over the languages ln is greater than the minimum of em over the languages ln for c2. When several constraints must be optimized against, it may happen that one code is better than another in the mini-max sense with respect to one constraint, but worse with respect to another constraint. In this case the constraints must be weighted with respect to each other as has already been described in detail.

As an example of these teachings, consider optimizing with respect to lookup error and query error for a set of languages. In this example will we allow non-alphabetic orderings, and use 8 regular input means, and a auxiliary input means and an accent-shift auxiliary input means, so that the 8 regular input means can be used in combination with one of the auxiliary input means in a hybrid chording/ambiguous code embodiment as has been previously described.

First consider optimizing with respect to the set of languages consisting of French, Italian, Portuguese and Spanish, each language represented by a set of reference statistics.

Using the directed random walk method, one readily finds codes such as joz m bhx a kn r pw d iy l gq t ev c fu s with (lookup error rate, query error rate) of (3250,265), (11400, 3800), (4720,505), and (6280,400) with respect to French, Italian, Portuguese and Spanish respectively. This code has relatively poor performance on Dutch, English, and German, with values of (65,4.8),(93,10), and (360,13) respectively.

Using a similar amount of computing time, but optimizing now with respect to Dutch, English, and German, one can find codes such as cjk r biy l fv e mo a sz p hx g to d qw n which yields (1220,44), (816,44), (480,47) on these languages respectively. This same code yields (253,20),(306,50),(525, 36), (4236,272) for French, Italian, Portuguese and Spanish respectively. And while these results are respectable for the out of sample languages, they are not nearly as good as the results obtained when ambiguity with respect to these languages is explicitly optimized. These results suggest that the more different the languages are from each other, the less performance on one language generalizes to performance on another language.

In practical circumstances, the decision as to which languages to include in a multi-language optimization scheme are more commercial then conceptual. The important inventive concept taught by this disclosure is that even the minimal performance over the selected languages should be such that the code is should be typable. In the cases examined above, optimization with respect to French, Italian, Portuguese and Spanish discovered a code which is level C strongly touch typable with respect to these languages, but the minimal performance is barely level A strongly touch typable with respect to Dutch, English, and German.

Strongly touch typable handheld device which is typable using one hand. In the hybrid chording/ambiguous code embodiment described above, it was shown how a distinguished input means (combining encoding symbol) can be used to form chords with input means encoding ambiguously coded symbols (decoding symbol-assigned encoding symbols) in order to reduce the ambiguity of the overall system. This present embodiment shows how decoding-symbol-assigned encoding symbols can be used both for chord formation and for encoding ambiguously encoded symbols. That is, a given encoding symbol can play the role of a combining encoding symbol and of a decoding-symbol-assigned encoding symbol. This permits the ambiguous code to be expressed as a multi-level code: a first sequence of encoding symbols serves to select a first subset of decoding symbols, a second sequence of encoding symbols serves to select a second subset of decoding symbols, and so on. Preferably, the second subset is a subset of the first subset, the third subset a subset of the second subset (and thus a subset of the first subset), and so on. This is a "divide and conquer" approach, as such well known to those in the art. However, it is not been heretofore understood that a) While it is typical in a divide-and-conquer approach that the final subsets contain unique solutions, the number of successive subdivisions of the set of symbols can be limited by making the smallest subsets contain more than one symbol, and these smallest subsets can be used to define an ambiguous code, nor b) that the manner of subdivision can be chosen so as to minimize the ambiguity (lookup error and or query error) of the final ambiguous code, nor that c) ambiguity reduction can be optimized while simultaneously optimizing other constraints, such as conservation of convention, nor d) that the transition between levels in the hierarchy can be accomplished with chords consisting of pairs of key presses only, where elements of the pair can be combining encoding symbols and/or decoding-symbol-assigned encoding symbols, depending on context A concrete manifestation of these discoveries will now be described in detail, with reference to FIGS. 39 to 47. It will be understood that this is but one of an infinite number of devices that can be built according to the teachings of this invention: any typable device which relies on a divide and conquer approach to code construction, while minimizing ambiguity and/or some other constraint such as adherence to convention, fits well within the scope of this embodiment.

This embodiment is a device which is strongly touch-typable with a single hand. It has the additional desirable characteristics of 1) permitting a fully unambiguous text-entry mode.
2) permitting a substantially optimal, strongly touch typable, ambiguous text-entry mode.
3) permitting a minimal-keystroke mode for data-retrieval.
4) is such that the above three modes are maximally compatible.

Preferably, this device can be configured such that, in addition to the above-stated constraints, a new constraint, scan time, is also optimized. Optimization of scan time will be discussed in a section below.

An overview of the method for constructing a typable device based on multi-level ambiguous codes is described in reference to FIG. 39.

In the first step 150, a set of second-level decoding symbols are selected. These are the symbols that are to be represented by the ambiguous code, and might include, for example for English, the letters a through z.

In the next step 151, a constraint is selected for the over-all multi-level code. This constraint could be, for example, strong touch typability in general or lookup error or query error alone. In general, many constraints of the multi-level code could be simultaneously selected. In the next step 152, the second-level decoding symbols are divided into subsets. An encoding symbol is assigned to each second-level subset in such a way that the overall code is optimized with respect to the selected constraints. Up to this point, the construction is not different from the construction of any optimized ambiguous code. However, there may be additional constraints, for instance on the allowed number of encoding symbols, such that the next step of construction can be executed. In this next step 153, the second-level encoding symbols are collected into groups. These groups are treated as decoding symbols for a first-level ambiguous code. Otherwise said, the encoding symbols of the second-level code become decoding symbols for the first-level code. Hence, a first-level encoding symbol is assigned to each group, forming a first-level ambiguous code. Additional optimization of constraints can be performed in the assignment of second-level symbols into groups. In general, each level in a multi-level code can be optimized with respect to different constraints. These constraints may be the same, or may be different from, the constraints with respect to which the over-all multi-level code is optimized. In the final step 154, the multi-level code thus constructed is embodied in a typable device.

The construction of the second-level code was just described as proceeding the construction of the first-level code. When a device embodying a multi-level code is used, the codes are applied in the reverse of the order in which they were constructed: first an element of the first-level code is selected by a first user activation of the keyboard, then an element of the second-level code is selected by a second user activation of the keyboard.

This is the essence of the divide-and-conquer approach. It will be evident to one skilled in the art that this construction could be continued in the same way to include third- and higher-level codes.

In practice, properties of each level of the multi-level code must be simultaneously optimized to achieve desired properties of the over-all multi-level code. The present embodiment is presented to concretely illustrate how this simultaneous optimization can be planned and executed.

The overview of the method of construction of this embodiment is shown in FIG. 40. To help exhibit the procedure in full generality, three constraints are selected for the over-all multi-level code, two constraints for the first-level code and three for the second-level code which together comprise the multi-level code. In this embodiment the three constraints applied to the multi-level code as a whole are strong touch typability, optimized query error, and optimized lookup error. The first-level code is optimized relative to anatomic fidelity, and alphabetic ordering, and the second-level code is optimized relative to evenness of partition, anatomic fidelity,. and substantial alphabetic ordering.

The first step 3100 in the construction of this embodiment is the selection of (second-level) decoding symbols. These are the letters a-z. Then strong touch typability, optimization of query error, and optimization of lookup error are selected as constraints for the multi-level code in steps 3101, 3102, and 3103 respectively. Then, in step 3104, anatomic fidelity is selected as a constraint. Since this device is meant to be typable using the fingers of the hand holding the device, anatomic fidelity is maximized when there are 4 input means and 4 corresponding first-level encoding symbols, one for each finger.

Anatomic fidelity is chosen as a constraint for the second-level code in step 3105. Each encoding symbols in the first-level code will correspond to several encoding symbols for the second-level code. Anatomic fidelity of the second-level code is maximized if each of the 4 first-level symbols corresponds to 4 second-level encoding symbols, so the number of second-level encoding symbols should be 16 for anatomic fidelity to be maximized. 16 second-level encoding symbols can be associated with second-level decoding symbols such that evenness of partition is maximized if the 26 second-level decoding symbols are distributed over the second-level encoding symbols such that either 1 or 2 second-level decoding symbols are associated with each of the 16 second-level encoding symbols. This distribution implies, in turn, that between 4 and 8 second-level decoding symbols will be ultimately associated with each of the 4 first-level decoding symbols.

Next, in step 3106, alphabetic ordering is selected as a constraint for the first-level code. Optimizing with respect to this constraint requires simultaneous optimization of both the first- and second-level codes. What is required is that the letters a-z must be displayable in alphabetic order on the displays corresponding to the input means associated with each finger respectively. Since these displays are arranged in order of the fingers, this implies in turn that letters from the first part of the alphabet must be associated to second-level decoding symbols which are in turn associated to the first-level encoding symbol which is associated to input means associated to the first finger. In the same way, a second group of letters, following the first group in alphabetic order, must be assigned to second-level encoding symbols associated to the first-order encoding symbol associated with the input means associated to the next finger, and so on for the other two first-level encoding symbols. Optimizing with respect to alphabetic ordering thus corresponds to choosing an ordered partition of the 26 letters, in the same way as has been discussed for other embodiments of this invention. This time, each of the 4 elements of the ordered partition must have between 4 and 8 subelements, so that all of the constraints listed can simultaneously optimized. As will be shown in the detailed description of the best mode for this embodiment, codes with even-as-possible partitions, even for the first-level code, can be found, while optimizing as well with respect to all of the other constraints considered.

Finally, in step 3107, substantial alphabetic ordering is chosen as a constraint of the second-level ambiguous code. This means that it should be possible to lay out the letters as well as possible in alphabet ordering, given all of the other constraints on the assignment of letters to second-level encoding symbols. Divergences from strict alphabetic ordering can be measured in any number of ways, for instance by the number of pairwise permutations required to bring a given ordering into strict alphabetic ordering.

In reference now to FIGS. 41-47, we describe a strongly touch typable handheld device, typable using one hand, encoding at least the letters [a-z], and embodying a code constructed according to the above described method. In order for a device built according to the present embodiment to be touch typable, the division of the symbols into subsets, subsets of subsets, and so on must be fixed, that is, not changing depending for instance on which symbols have been previously entered. This fixedness pertains only to the requirement of touch typability, and the teachings of this invention could be applied in a broader context. For instance, allowing word completion mechanisms can significantly reduce the number of keystrokes. But since the behavior of the word-completion mechanism is complex and difficult to predict, a machine with word-completion is not in any strict sense touch-typable. Nonetheless, the same optimizations that lead to strongly touch typable codes lead to effective word completion mechanisms, since the lower the ambiguity, the better word completion can be effected. Thus, augmenting a strongly touch typable code with word-completion mechanism does not transport the device beyond the scope of the present invention.

For the present embodiment we make the further limitation that the symbol-input typable part of the device must be able to be held in one hand, and be typable by the hand holding the device, and that hand only. To limit the requirement for digit motion, most of the symbols can be input though sequences of manipulation of but 5 input means: 4 input means operable by the fingers of the hand holding the device 2100-2103 and 1 input means operated by the thumb of the hand holding the device 2104. The device shown in FIG. 41 is meant to be held in the left hand; it is evident that the symmetric device designed to be held in the right hand or an ambidextrous device operable by either hand could also be constructed.

Preferably, associated with each of the input means 2100-2103 is a visual display 2106-2109 showing the elements of the subset currently associated with the given input means. Operating the input means selects the corresponding subset. The input means 2104 can be used to further refine the subset selection and/or be used to select other subsets of symbols. For example, the single symbol "space" can be associated with the input means 2104; this or other symbols associated with input means 2104 can be preferably displayed on display means 2110. The letters [a-z] can be distributed over the 4 input means 2100-2103. The distribution of letters over the input means is preferably chosen so as to minimize the ambiguity (lookup error rate and/or query error rate) of the resulting code, while simultaneously adhering to the convention of alphabetic ordering. This adherence aids the novice user in finding a needed letter by simply scanning the candidate letters.

FIG. 42 shows an arrangement of the letters [a-z] in which the letters [a-f] are associated with the first input means 2100, [g-l] with the second input means 2101, [m-r] with the third input means 2102, and finally [s-z] with the fourth input means 2103. These associations constitute first-level subsets in a first-level code. In general, it will be preferred to associate 4-8 letters with each of these 4 input means:

thereby the subset of letters associated to each input means can be further subdivided into 4 subsets, each of which contains no more than two letters. The utility of this limitation will become evident shortly, and it will be evident to one skilled in the art how to extend the teachings of this embodiment to languages with a different number of symbols, and a different number of input means.

An example set of second-level subsets which divide the first-level subsets shown in FIG. 42 is shown in FIG. 43. FIG. 43 is a table of four columns and four rows. The columns are labeled by the input means activated at the first step, the rows by the symbols associated to each input means at the second step. Thus, for instance, if input means 2100 is first activated, then at the second step, the symbols ac will be associated to input means 2100, be to the input means 2101, etc. This assignment is chosen to minimize lookup error and query error rates, given the constraints on subset size described above. The lookup error and query error rates for this code are (1100,69) using our reference statistics. It is to be noted very carefully that in this example, the letters in the first level subsets are arrangeable in alphabetic ordering, but the letters in the second-level subsets are only partially arrangeable in alphabetic ordering. It was decided for this example to loosen the alphabet ordering constraint at the second level in order to permit better query and lookup rates, and to produce a code which is as strongly touch typable as possible. This shows that alphabetic ordering can be optimized, or not, just like any other constraint, and that weighting of optimization properties can be different at different levels in a multi-level ambiguous code. The advantage, again, of alphabetic ordering is that it reduces scan time, especially for novice users. Since the number of symbols displayed at the second level is small, scan time is in any case small, and can be further reduced by mechanisms to be discussed presently.

To type a given desired letter, the user first activates one of the input means 2100-2103 corresponding to first subset containing the desired letter. The user then selects one of the second-level subsets by again activating one of the input means 2100-2103 corresponding to a set of letters containing the desired letter. FIG. 44 shows an example operation of the device in which the user types the letter e. With reference to FIG. 42 we see that e is associated with input means 2100 by the first level code. The user activates this input means, and the display becomes that shown in FIG. 44. Now the letter e is associated with the input means 2101. When this input means is manipulated, the letter e is output. The same sequence of manipulations of input means serves also to select the letter b, so the code is ambiguous. As in the other embodiments, which of the letters b or e is intended is determined from context by a disambiguation mechanism. Words are entered by successively selecting the required letters in this manner, and terminating the word by activation of the input means 2104 associated with the thumb, two-hand operation. It should be noted that since a two-stroke method is used to encode each letter, and max-2 sequences of encoding symbols are used this input method can form the basis of a one-hand/two-hand embodiment. More explicitly, if one hand is used to indicate the first stroke of each letter, and the second hand is used to indicate the second stroke of each letter, then first and second-stroke information could be input simultaneously. There are numerous physical embodiments which could be based on this remark. For instance, the "fingering" mechanism of [4] could be the physical substrate upon which a one-hand/two-hand embodiment could be based. The code proposed by [4] is based on motion sensors capable of sensing several positions per finger, to encode each letter unambiguously. This requires relatively sophisticated sensors. However, using a two-handed variant of the present embodiment, simpler sensors could be used. These sensors would need only record binary (up/down) information for each finger. Both software and hardware complexity could be reduced in this manner. In addition, a machine build according to the teachings of this invention would be simpler for the user to learn and operate.

Visual Cache Scan time is the time it takes to visually locate a desired letter from a set of letters. The hunt-and-peck typist visually scans the keyboard to find a next letter and then presses the corresponding key. Scan time is determined by a number of factors, including the user's familiarity with the layout of a keyboard. The hunt-and-peck typist may know basically where the desired key is, and is using visual scanning only for confirmation, or precise localization. It is to improve scan time, through the familiarity of typical users with an alphabetic ordering, that alphabetic ordering was chosen for the first-level code of this embodiment. In a variant of alphabetic ordering, certain letters are selected from the group of letters on a given key for display in a distinguished, selected area of the visual display associated with the key. These letters are the most likely-to-be-selected letters at any given moment, and placing them in a distinguished position makes them easier to find. The principle is analogous to the cache used in some computer processors to store recently-used data in registers where they can be gotten at quickly, under the hypothesis that data recently used is more likely to be used again. Here, letters are placed in cache not on the basis of their recent use, but on the basis of their likelihood to be used next, given the statistics of the language. Still, the term "visual cache" seems appropriate.

One embodiment of a visual cache will now be described in the context of the current embodiment. It will be appreciated that this invention permits a wide variety of modifications without modification of its essential quality, for instance, modifications in the size and location of the cache, how the cache is organized, how it is labeled, and the like.

From analysis of our standard statistics, we find that of the letters [a-f] associated to input means 2100 by the first-level code, "a" is the most likely to be the first letter of a word. Similarly, of the letters [g-l] associated to input means 2101 , "i" is the most likely to be the first letter of a word, "o" the most likely from [m-r] associated with input means 2102, and "t" the most likely from the letters [s-z] associated to input means 2103.

By placing the letters a, i, o, t in a distinguished portion of the display, for instance the upper-left hand corner of the display area associated with each input means. This makes these letters the first-encountered letters in a standard left-to-right, top-to-bottom visual scan of each associated display. Preferably, other than this selection of a single letter out of alphabetic order, alphabetic ordering is maintained for the other letters in the subset. The distinction between the letter in cache and the rest of the letters can be further marked by selecting a different color, size, style, etc. of font for the cached letter than for the rest of the letters.

Referring now to FIGS. 45 and 46, we see how this observation can be exploited to reduce scan time. FIG. 45 shows how the word "think" is entered without the use of a visual cache, and FIG. 46 shows the same word entered using a visual cache. Thus, in FIG. 45, the letter "t" is entered by first activating the first input means 2103 corresponding to the letter "t". Before the first input means is activated, the display as shown in the second column of the figure. Once 2103 is activated, the display changes to that shown in the third column. When the input means 2101 is then activated, the letter "t" is output. The displays change similarly as the other letters of the word "think" are entered.

In FIG. 46, the distinction between letters in and not in visual cache is marked by writing letters in the visual cache in upper case letters, while letters not in visual cache are displayed using lower-case letters. For our reference statistics, we find that 42 percent of first letters of words are either a,i,o, or t. Thus 42 percent of the time a user beginning to enter a word will find the required letter immediately in cache.

As a word is entered the most-likely next letter changes as context is created by the entering of the word. Thus, the letter selected to be cached should change as a word is entered, and will depend on which word is being entered.

In the case of the word "think" The letter "t" is found in visual cache both before activation of the first input means, and before activation of the second input means, as shown in the first four rows of FIG. 46, each row corresponding to an input means display. Once "t" has been selected. The letters in visual cache are a, h, o, w, as shown in the second set of 4 rows in FIG. 46. After the first input means (input means 2101) is selected to begin entering the letter "h", there are only two possible letters which form parts of words according to the reference statistics, these are the letters "h" and "i", both of these appear in visual cache in the second display. Continuing in this way for the letters, i, n, k, we find that the desired letter is always in visual cache for this word. Indeed, after the first input means manipulation for entering the letter "i", there is only one possible letter which could have been intended if the user is in fact entering a word in the database. In this case, then, a second input means manipulation is redundant, and the letter "i" could be output immediately after the first input means manipulation.

Explicit disambiguation and inputting of additional symbols. As has already been pointed out, it is generally desirable to provide a completely unambiguous method for inputting symbols in a typable device based on ambiguous codes. In the present embodiment, one simple way to provide unambiguous input is by provision of an additional unambiguous input means 2105 shown in FIG. 41 in a position where it is easily activatable by the thumb, which is the preferred position. Other positions, however, could be chosen.

In the present embodiment, it was chosen to limit the size of second-level subsets to at most 2 symbols. Thus the disambiguation mechanism will always either choose the desired symbol correctly, or it will chose the other, incorrect, symbol to which it is paired. Any disambiguation software could generate a signal to indicate which of the two symbols it would choose were the corresponding input means to be selected by the user. This signal could be used to provide feedback to the user, for instance by highlighting the letter to be chosen. If the letter to be chosen is not the desired letter, the user has the option of activating the explicit disambiguation input means 2105 shown in FIG. 41 to force the choice of the other, non- highlighted symbol.

An example use of this unambiguous text entry mechanism is shown in FIG. 47. As in FIGS. 45 and 46, this figure shows how the word "think" is entered. Here the fourth column gives the letter that would be output were the unambiguous input means 2105 to be activated after activation of the first and second input means used to enter the letters of the word "think". For example, if input means 2103 and then input means 2101 had been activated to enter the letter "t", then further activation of input means 2105 would select the letter "u". Then "u" would become the first letter of the word. All possible letters can be entered unambiguously in this way. When the second-level subsets contain but one letter, this one letter will be entered unambiguously even without activation of the input means 2105, and thus input means 2105 is inapplicable. For the given code, the letters d, f, h, l, n, and p are always entered unambiguously.

Strong Touch Typability: Measurement and Thresholds Strong touch typability is a new, inventive concept describing a definite class of machines. The breadth of this concept has been pointed out through a variety of embodiments placed near the boundaries of this class, and thus indicating its extent.

To further add definiteness to the disclosure of strong touch typability, this section will present an alternative numerical characterization of strong touch typability which will allow the strong touch typability of any ambiguous code to be measured, and to thus decide if that code falls within the scope of this invention or not.

Language Statistics It has already been mentioned that representing a language in terms of a corpus of text is a topic of research among linguists. For the sake of numerical definiteness, define a representative corpus as a collection of at least 10 million words drawn at random from a general-interest newspaper in the target language.

Key Number We need to define three kinds of key numbers: physical key number, chording key number and effective key number. Physical key number: the number of inputs used to encode symbols. A minimal Qwerty keyboard has 26 keys labeled with a letter, a shift key and a space key, it thus has a physical key number of 28. Chording key number: the number of distinct combinations of keys which encode symbols. For the minimal Qwerty keyboard, the shift key can be combined with any of the letter keys to form a capital letter, therefore this keyboard has a chording key number of 28+26−1=53, since the shift key alone does not encode any symbols. Otherwise said, a keyboard which is fully equivalent to the minimal Qwerty keyboard could be build with 53 physical keys, each one encoding a single symbol, either an upper case or a lower case letter. Indeed, some early typewriters were of this structure.

Effective key number: Given a set of symbols to represent in an ambiguous code, a set of language statistics, and a number of physical keys, P, there exists an optimal ambiguous code which has the best possible lookup and query error rates, given that key number is the only constraint on the code. Let us call these rates Pl and Pq respectively. Any ambiguous code on any number of physical keys will have an effective key number of P if its lookup rate and query error rate are equal to Pl and Pq respectively. It is impossible for a keyboard with a physical number of keys less than P to support an ambiguous code with an effective key number equal to or greater than P. It is perfectly possible, and usually the case, that an ambiguous code on a physical number of keys P has an effective key number less than P. It is an experimental observation that the lookup error rates and query error rates of substantially optimal ambiguous codes are substantially related by a power law, as shown for example, by the experimental results of FIG. 11. Here it is shown that for English, the log of the substantially optimal query error rate is linearly related to the log of the substantially optimal lookup rate.

This observation allows us to define a single number relating the lookup error rate and query error rate of a code: the projection of the point (lookup error rate, query error rate) of the code onto the best-fit line in a log-log plot.

Consider, for example, the standard ambiguous code. This code has (lookup error rate, query error rate) of (29,2.2). Projecting this point onto the best-fit line of FIG. 11 and linearly interpolating, we find the value 5.96, which is thus the effective key number of the standard ambiguous code.

Though the standard ambiguous code is defined on 8 physical keys (and with a chording key number also of 8, since no chording is involved), it is equivalent in ambiguity to a substantial optimal code on 5.96 physical (or chording) keys. Of course fractional physical keys are not possible in practice, but these results indicate that a substantially optimal code on 6 keys could be found which has lookup error rates and query error rates better than the standard ambiguous code.

These considerations allow us to define a precise, albeit arbitrary, numerical threshold for substantial optimality of combined lookup error rate and query error rate: a code will be said to be substantial optimal with respect to these rates if its effective key number is within 0.01 of its chording key number, if there are no other ergonomic constraints on the system. We can also define a precise, albeit arbitrary, threshold for strong touch typability: an ambiguous code for English can be defined as strongly touch typable if its effective key number is at least 10. We can extend this definition to other languages by requiring that for a code to be strongly touch typable, it must have a lookup error rate and a query error rate greater than or equal to those of a strongly touch typable code for English. Since the effective key number of the standard ambiguous code is less than 10, it is not strongly touch typable by the considerations of this section.

By measuring the effective key number, any ambiguous code can be screened for possession of the strong touch typability property. For instance, the hybrid chording/ambiguous code: ab c df e gi h jk l mo n pqr s uv t wxz y discussed above has 9 physical keys: the 8 letter keys of the standard telephone keypad plus 1 shift key. It has a chording key number of 16; it is equivalent to an ambiguous code on 16 independent keys with no shift key. Without application of a gap factor, its (lookup,query) error rates are (431,21) corresponding to a effective key number of 12.8. With a gap factor of 500, this improves to (440,46), corresponding to a effective key number of 13.75. With or without a gap factor, this code is strongly touch typable by the considerations of this section. It should be noted that for this code the effective key number is less than the chording key number, still, this code is substantially optimal given the additional constraint of alphabetic ordering. In the same way, the one-handed hybrid chording/ambiguous code embodiment has a code with (lookup, query) rates of (1100,69), yielding an effective key number of 15, though its physical key number is 4 and its chording key number is 16. It is a strongly touch typable code, and the difference between the chording key number and effective key number is due to the additional constraint of alphabetic ordering of the first-level code. Taking into account this additional constraint, the code is substantially optimal. By contrast, the 14-physical key code of Sugimoto U.S. Pat. No. 5,847,697, pn gt cr zk wj a e hi so ud xf ym vl qb, has (lookup, query) rates of (105,4), and an effective key number of 8.47. This code is neither substantially optimal nor strongly touch typable, despite the fact that its physical number of keys is greater than 10.

Although illustrative embodiments of the present invention have been described herein with reference to the accompanying drawings, it is to be understood that the invention is not limited to those precise embodiments, and that various other changes and modifications may be effected therein by one skilled in the art without departing from the scope of the invention.

Literature Cited

[1]U.S. Pat. No. 5,847,697 Single-handed keyboard having keys with multiple characters and character ambiguity resolution logic, Masaktsu Sugimoto, Dec. 8, 1998.

[2] U.S. Pat. No. 5,818,437 Reduced keyboard disambiguating computer. Grover et al. Oct. 6, 1998

[3] U.S. Pat. No. 5,953,541, Disambiguating system for disambiguating ambiguous input sequences by displaying objects associated with the generated input sequences in the order of decreasing frequency of use, King et al. Sep. 14, 1999.

[4] "Body Coupled Fingering": Wireless Wearable Keyboard, CHI 97 Electronic Publications: Papers, by FUKUMOTO, Masaaki and TONOMURA, Yoshinobu NTT Human Interface Laboratories 1—1 Hikari-no-oka, Yokosuka-shi, Kanagawa-ken, 239 JAPAN web reference: http://www.acm.org/turing/sigs/sigchi/chi97/proceedings/paper/fkm.htm#U21.

What is claimed is:

1. An apparatus comprising: encoding symbols; decoding symbols; a keyboard comprising a plurality of keys responsive to user activation to generate sequences of said encoding symbols, said keyboard comprising a plurality of keys; an output which selectively outputs sequences of said decoding symbols in response to said user activation of said keyboard; an ambiguous code which maps said sequences of said encoding symbols to said sequences of said decoding symbols, wherein at least one of said sequences of said encoding symbols is mapped to a plurality of said sequences of said decoding symbols, said ambiguous code characterized in that it is strongly touch typable; a plurality of decoding-symbol-assigned keys formed by an assignment of said decoding symbols to said keys, said assignment characterized in that it is not even-as-possible, given the number of said decoding-symbol-assigned keys.

2. An apparatus comprising: encoding symbols; decoding symbols; a keyboard comprising a plurality of keys responsive to user activation to generate sequences of said encoding symbols, said keyboard comprising a plurality of keys; an output which selectively outputs sequences of said decoding symbols in response to said user activation of said keyboard; an ambiguous code which maps said sequences of said encoding symbols to said sequences of said decoding symbols, wherein at least one of said sequences of said encoding symbols is mapped to a plurality of said sequences of said decoding symbols, said ambiguous code characterized in that it is maximally touch typable in that at least one of the conditions is true of said ambiguous code, said conditions selected from i) its lookup error rate is at least of level C, ii) its query error rate is at least of level B, iii) its effective key number is at least 10, given statistics drawn from a representative corpus of a language.

3. An apparatus comprising: encoding symbols; decoding symbols; a keyboard comprising a plurality of keys responsive to user activation to generate sequences of said encoding symbols, said keyboard comprising a plurality of keys; an output sequences of said decoding symbols in response to said user activation of said keyboard; an ambiguous code which maps said sequences of said encoding symbols to said sequences of said decoding symbols; wherein at least one said sequences of said encoding symbols is mapped to a plurality of said sequences of said decoding symbols, said ambiguous code characterized in that it substantially satisfies at least one constraint selected from the group consisting of anatomic fidelity, conservation of conventional gestures, conservation of convention, cross-platform compatibility, learnability, and scan time; an assignment of a plurality of said decoding symbols to said keys, said assignment characterized in that it is not even-as-possible.

4. An apparatus comprising: encoding symbols; decoding symbols; a keyboard comprising a plurality of keys responsive to user activation to generate sequences of said encoding symbols, said keyboard comprising a plurality of keys; an output which selectively outputs sequences of said decoding symbols in response to said user activation of said keyboard; an ambiguous code which maps said sequences of said encoding symbols to said sequences of said decoding symbols, wherein at least one of said sequences of said encoding symbols is mapped to a plurality of said sequences of said decoding symbols, said ambiguous code characterized in that it is substantially optimal with respect to at least one of lookup error rate and query error rate; an assignment of said decoding symbols to said keys, said assignment characterized in that it is not even-as-possible, given the number of said keys to which said decoding symbols have been assigned by said assignment.

5. An apparatus comprising: encoding symbols; decoding symbols; a keyboard comprising a plurality of keys responsive to user activation to generate sequences of said encoding symbols; an output which selectively outputs sequences of said decoding symbols in response to said user activation of said keyboard; an ambiguous code which maps said sequences of said encoding symbols to said sequences of said decoding symbols, wherein at least one of said sequences of said encoding symbols is mapped to a plurality of said sequences of said decoding symbols, said ambiguous code characterized in that said sequences of said encoding symbols are max-2 sequences of length at most two, comprising at least one max-2 sequence of length 2; and said sequences of said decoding symbols are max-1 sequences of length 1 whereby said ambiguous code is a mapping between said max-2 sequences of said encoding symbols and subsets of said decoding symbols and whereby input of one of said max-2 sequences of said encoding symbols explictly selects for ambiguous output one of said subsets of said decoding symbols.

6. The apparatus of claim 5 wherein said keys are laid out spatially and a plurality of said decoding symbols are associated with said keys substantially following a conventional order in space.

7. The apparatus of claim 5 wherein a plurality of said max-2 sequences of said encoding symbols are input in response to a substantially simultaneous said user activation which consists of activating two of said keys substantially simultaneously in that activation of a second of said keys occurs within the duration of activity of a first of said keys.

8. The apparatus of claim 5 wherein physical motions are operative to input said sequences of said encoding symbols comprising, but not limited to, any motion of body parts selected from the set of arm, hand, fingers, thumb, leg, foot, toes, head, and eye.

9. The apparatus of claim 5 wherein said decoding symbols are symbols used to represent a natural language, comprising, but not limited to, the letters, digits and punctuation marks commonly used to write said natural language.

10. The apparatus of claim 16 wherein said decoding symbols are explicitly selected so as to optimize at least one of lookup error rate and query error rate.

11. The apparatus of claim 5 further characterized in that it is strongly touch typable, whereupon said ambiguous code is a strongly touch typable ambiguous code.

12. The apparatus of claim 11 wherein said strongly touch typable ambiguous code is a multi-level ambiguous code, said multi-level ambiguous code characterized in that it comprises a first-level ambiguous code and a second-level ambiguous code; wherein a first of said encoding symbols in one of said max-2 sequences of said encoding symbols is drawn from said first-level ambiguous code, and a second of said encoding symbols in said one of said max-2 sequences of said encoding symbols is drawn from said second-level ambiguous code.

13. The apparatus of claim 5 further characterized in that it substantially satisfies at least one constraint selected from the set consisting of specified partition structure, anatomic fidelity, conservation of conventional gestures, conservation of convention, cross-platform compatibility, learnability, and scan time.

14. The apparatus of claim 13 wherein said conservation of convention comprises substantial conservation of qwerty order and said keys are arranged in at least three rows and one to ten columns, and wherein said decoding symbols comprise letters comprising a through z, and said three rows comprise a top row; a middle row; and a bottom row; said apparatus further comprising an assignment of said letters to said keys, so that said keys comprise letter-assigned keys, said letters in order q, w, e, r, t, y, u, i, o and p are assigned by said assignment to a plurality of said letter-assigned keys in said top row of said three rows, said letters in order a, s, d, f, g, h, j, k, and l are assigned by said assignment to a plurality of said letter-assigned keys in said middle row of said three rows, said letters in order z, x, c, v, b and m are assigned by said assignment to a plurality of said letter-assigned keys in said bottom row of said three rows, futher characterized in that the number of said letter-assigned keys in each of said three rows monotonically decreases from said top row to said bottom row, in that said number of said letter-assigned keys in each of said three rows decreases or remains constant from said top row to said middle row and from said middle row to said bottom row, said assignment satisfying an even-as-possible partition given said number of said letter-assigned keys in each of said three rows and wherein said keys are laid out in a format including as a subpart one of standard numeric keypad format and standard telephone keypad format with corresponding indicia for digits so as to substantially satisfy said cross-platform compatibility.

15. The apparatus of claim 14 wherein said ambiguous code is substantially optimal with respect to at least one of lookup error rate and query error rate.

16. The apparatus of claim 5 wherein a plurality of said subsets of said decoding symbols contain a single of said decoding symbols, whereby input of one of said max-2 sequences of said encoding symbols which is mapped by said ambiguous code to one of said single of said decoding symbols serves to explicitly select for unambiguous output said single of said decoding symbols, whereupon said single of said decoding symbols is an element of a plurality of explicitly selected unambiguous said decoding symbols.

17. The apparatus of claim 16 characterized in that a plurality of said max-2 sequences of said encoding symbols consist of one element drawn from a plurality of combining said encoding symbols, and one element drawn from a plurality of key-assigned said encoding symbols, any single element of said plurality of said key-assigned said encoding symbols being designated a key-assigned encoding symbol, wherein said user activation of one of said keys to which one of said key-assigned said encoding symbols has been assigned inputs said key-assigned encoding symbol, and further characterized in that a plurality of said decoding symbols are key-assigned said decoding symbols, any single element of said plurality of said key-assigned said decoding symbols being designated a key-assigned decoding symbol, such that when one of said key-assigned said encoding symbols is input, an element of a first subset of said key-assigned said decoding symbols is output, and when one of said combining said encoding symbols is input in combination with one of said key-assigned said decoding symbols, then an element of a second subset of said key-assigned said decoding symbols is output.

18. The apparatus of claim 17 wherein at least one of the group consisting of said first subset and said second subset consists of said explicitly selected unambiguous said decoding symbols.

19. The apparatus of claim 17 characterized in that said first subset and said second subset comprise letters selected from the set a through z and their accented counterparts.

20. The apparatus of claim 19 characterized in that said first subset comprises said letters selected from the set consisting of c, e, h, l, n, s, t, x, y.

21. The apparatus of claim 19 characterized in that said letters are assigned to said keys following a substantially alphabetic order.

22. The apparatus of claim 21 characterized in that said letters are assigned to said keys following a standard assignment of letters to a telephone keypad.

23. The apparatus of claim 16 further comprising a display coupled to a processor through appropriate interfacing circuitry, wherein said processor receives input sequences of said encoding symbols from said keyboard and manages output of sequences of said decoding symbols to said display; a memory coupled to said processor, wherein said memory comprises disambiguation software, said disambiguation software effective to map said sequences of said encoding symbols to sequences of said explicitly selected unambiguous said decoding symbols; a database of disambiguation rules which associate said sequences of said encoding symbols with said sequences of said decoding symbols.

24. The apparatus of claim 22 wherein said keys are responsive to said user activation mediated by one of the physical senses of sight, hearing, touch, taste, and smell and said display is selected from the group consisting of visual, auditory, tactile, gustatory and olfactory displays.

25. The apparatus of claim where said disambiguation software is selected from the set comprising word-based, sequence-based, prefix-based and any combination thereto.

26. The apparatus of claim 25 where said disambiguation software is operative to apply a selecting plurality of said disambiguation rules in said database of disambiguation rules, elements of said selecting plurality of said disambiguation rules characterized in that said sequences of said decoding symbols in said selecting plurality of said disambiguation rules include at least one of said explicitly selected unambiguous said decoding symbols.

27. The apparatus of claim 26 where elements of said selecting plurality of said disambiguation rules are such that said explicitly selected unambiguous said decoding symbols may occur at the beginning, interior, or end of said sequences of said decoding symbols.

28. An apparatus comprising: encoding symbols; decoding symbols; a keyboard comprising a plurality of keys responsive to user activation to generate sequences of said encoding symbols; an output which selectively outputs sequences of said decoding symbols in response to said user activation of said keyboard; an ambiguous code which maps said sequences of said encoding symbols to said sequences of said decoding symbols, wherein at least one of said sequences of said encoding symbols is mapped to a plurality of said sequences of said decoding symbols; said ambiguous code characterized in that it is strongly touch typable; an assignment of said decoding symbols to said keys; said ambiguous code together with said assignment characterized in that they substantially satisfy at least one constraint selected from the group consisting of anatomic fidelity, conservation of conventional gestures, conservation of convention, cross-platform compatibility, learnability, and scan time.

29. The apparatus of claim 28 further comprising a thumb actuatable input, said thumb actuatable input being effective to input a plurality of unambiguous said decoding symbols formed by an unambigous association of a plurality of said encoding symbols with a plurality of said decoding symbols; a palm grip, said palm grip permitting said apparatus to be slide along a surface by pressure from the palm while the hand is in a comfortable position for typing; and a display, said display being effective to display said plurality of said decoding symbols as they are input.

30. The apparatus of claim 28 wherein said ambiguous code is substantially optimal with respect to at least one of lookup error rate and query error rate.

31. The apparatus of claim 28 wherein said keys are laid out in one of a standard numeric keypad format and standard telephone keypad format whereby said conservation of convention is substantially satisfied.

32. The apparatus of claim 28 further characterized in that a plurality of said keys are decoding-symbol-assigned keys, such the number of said decoding-symbol-assigned keys is approximately half of the number of said decoding symbols, and not less than half of the number of said decoding symbols.

33. The apparatus of claim 32 further characterized in that said plurality of said decoding symbols consists of the letters a through z.

34. The apparatus of claim 28 wherein said conservation of convention comprises substantial conservation of qwerty order and said keys are arranged in at least three rows and one to ten columns, and wherein said decoding symbols comprise letters comprising a through z, and said three rows comprise a top row; a middle row; and a bottom row; said apparatus further comprising an assignment of said letters to said keys, so that said keys comprise letter-assigned keys, said letters in order q, w, e, r, t, y, u, i, o and p are assigned by said assignment to a plurality of said letter-assigned keys in said top row of said three rows, said letters in order a, s, d, f, g, h, j, k, and l are assigned by said assignment to a plurality of said letter-assigned keys in said middle row of said three rows, said letters in order z, x, c, v, b and m are assigned by said assignment to a plurality of said letter-assigned keys in said bottom row of said three rows, futher characterized in that the number of said letter-assigned keys in each of said three rows monotonically decreases from said top row to said bottom row, in that said number of said letter-assigned keys in each of said three rows decreases or remains constant from said top row to said middle row and from said middle row to said bottom row, said assignment satisfying an even-as-possible partition given said number of said letter-assigned keys in each of said three rows and wherein said keys are laid out in a format including as a subpart one of standard numeric keypad format and standard telephone keypad format with corresponding indicia for digits so as to substantially satisfy said cross-platform compatibility.

35. The apparatus of claim 34 wherein said ambiguous code is substantially optimal with respect to at least one of lookup error rate and query error rate.

36. The apparatus of claim 28 characterized in that said assignment of said decoding symbols to said keys is partitioned across said keys according to a specified partition structure.

37. The apparatus of claim 36 wherein said specified partition structure is not even-as-possible.

38. The apparatus of claim 36 characterized in that said specified partition structure is an even-as-possible partition given the number of said keys to which said decoding symbols are assigned by said assignment of said decoding symbols to said keys.

39. The apparatus of claim 28 wherein said conservation of convention comprises substantial conservation of at least one of alphabetic order and qwerty order in said assignment of said decoding symbols to said keys.

40. The apparatus of claim 39 wherein said conservation of convention comprises substantial conservation of said qwerty order and said keys are arranged in at least three rows and one to ten columns.

41. The apparatus of claim 40 wherein said decoding symbols comprise letters comprising a through z, and said three rows comprise a top row, a middle row, and a bottom row, and said keys comprise letter-assigned keys, said letters in order q, w, e, r, t, y, u, i, o and p are assigned by said assignment to a plurality of said letter-assigned keys in said top row of said three rows, said letters in order a, s, d, f, g, h, j, k, and l are assigned by said assignment to a plurality of said letter-assigned keys in said middle row of said three rows, said letters in order z, x, c, v, b, and m are assigned by said assignment to a plurality of said letter-assigned keys in said bottom row of said three rows.

42. The apparatus of claim 41 wherein the number of said letter-assigned keys in each of said three rows monotonically decreases from said top row to said bottom row, in that said number of said letter-assigned keys in each of said three rows decreases or remains constant from said top row to said middle row and from said middle row to said bottom row.

*43. An ambiguous keyboard disambiguating system for a natural language, comprising:*

*a) encoding symbols and decoding symbols;*

*b) an ambiguous keyboard having at three rows of keys and one to ten columns of keys, both of said three rows and one to ten columns having indicia that denote one or more letters assigned to one or more keys, wherein said one or more letters are used to write common words in said natural language, wherein:*

*each of said one or more keys corresponds to one of said encoding symbols; and*

*each of said one or more letters corresponds to one of said decoding symbols,*

*the total number of said keys having at least one letter assigned to them being less than the number of said one or more letters in an alphabet used to form words in said natural language such that at least one key of said keys must have more than one letter of said alphabet assigned to it;*

*c) said assignment of respective said one or more letters assigned to respective said keys permitting a partial conservation layout of said indicia in that in said partial conservation layout at least a ratio of 18/26 of said indicia are at or adjacent to their respective ordered positions in a letter indicia layout of a conventional typewriter keyboard for said natural language, while respecting said assignment, where said ordered positions are ordered in a conventional presentation order for said conventional typewriter keyboard;*

*wherein said conventional typewriter keyboard layout is a non-alphabetic order for said natural language, wherein said non-alphabetic order includes at least one letter assigned to one or more keys of said ambiguous keyboard violating an alphabetic order for said natural language;*

*wherein said ambiguous keyboard has:*

*1) a same set of letters, assigned to at least one row or one column of said ambiguous keyboard as are assigned to a corresponding row in a conventional typewriter keyboard;*

*2) wherein an order of reading of said same set of letters on at least one row or at least one column of said ambiguous keyboard admits an order of reading of said same set of letters on at least one corresponding row or one corresponding column of said conventional typewriter keyboard, wherein said admittance comprises:*

*i) an order of reading of keys of said at least one row or said at least one column of said ambiguous keyboard that is in a same order as a reading of keys of said at least one row or said at least one column of said conventional typewriter keyboard,*

*ii) wherein said ambiguous keyboard could be relabeled with said letter indicia presented in the same order along each row as the corresponding indicia on a corresponding row of said conventional typewriter, without repetition and without violating said assignment of said letters to said keys;*

*d) an output which selectively outputs sequences of said decoding symbols in response to user activation of said ambiguous keyboard;*

*e) an ambiguous code which maps a sequence of said encoding symbols to one or more sequences of said decoding symbols;*

*f) wherein at least one of said sequences of the encoding symbols is mapped to a plurality of said sequences of said decoding symbols.*

*44. The ambiguous keyboard of claim 43, wherein said ambiguous keyboard has a strongly touch typable property in:*

*1) having fixed symbol assignments,*

*2) being based on an ambiguous code, and yet*

*3) such that in a normal mode of operation, a touch typist can use the typable device to produce text at an acceptable level of accuracy.*

*45. The system of claim 44, wherein said strongly touch typable property is measured relative to a corpus containing at least 10 million words drawn at random from a general-interest newspaper in said natural language.*

*46. The system of claim 44, wherein said lookup rate error is equal to or greater than 50/29 times a lookup error rate for a standard telephone keypad for said natural language where both said lookup error rate and said lookup error rate for said standard telephone keypad are measured on a same given corpus of text representative of said natural language.*

*47. The system of claim 44, wherein said strongly touch-typable property is equal to or greater than level "A", in that it has an acceptable level of accuracy for a user who,*

*1) accepts a query error rate of one query every 5 words on average, and;*

*2) accepts a lookup error rate of one error every 50 words on average.*

*48. The system of claim 44, wherein said strongly touch-typable property is equal to or greater than level "B" in that it has an acceptable level of accuracy for a user who,*

*1) accepts a query error rate of one query every 10 words on average, and*

*2) accepts a lookup error rate of one error every 100 words on average.*

*49. The system of claim 44, wherein said strongly touch-typable property is equal to or greater than level "C" for a user who,*

*1) accepts a query every 20 words on average, and*

*2) accepts a lookup error every 200 words on average.*

*50. The ambiguous keyboard of claim 44, which has an effective key number greater than the effective key number corresponding to the point (50,5) in the (lookup error rate, query error rate) plane where lookup error rate and query error rate are normalized such that the standard ambiguous code for said natural language corresponds to the point (29, 2.2) in said (lookup error rate, query error rate) plane, and said lookup error rate and said query error rate are measured relative to a text corpus representative of said natural language.*

*51. The system of claim 43, wherein a count of letter-assigned said keys on each of said rows decreases monotonically from top to bottom said rows.*

*52. The system of claim 43, wherein said assignment of letters to said keys is an even as possible assignment on at least one of said rows, given the number of letter-assigned keys in said at least one row and the number of said letters assigned to said letter-assigned keys in said at least one row.*

*53. The system of claim 43, wherein said assignment is not substantially optimal, because in a count of four random trials it is more likely than not to find an other assignment with better values of lookup error rate where said lookup error rate is measured relative to a same corpus representative of said natural language for both said assignment and said other assignment.*

*54. The system of claim 43, wherein said assignment of said letters to said keys is not an even as possible assignment, given the total number of letter-assigned said keys of said ambiguous keyboard.*

*55. The system of claim 43, wherein said assignment of said letters to said keys is a not even as possible assignment on at least one of said rows, given the number of letter-assigned said keys in said at least one row and the total number of said letters assigned to said letter-assigned keys in said at least one row.*

*56. The system of claim 43, wherein said ambiguous keyboard will be substantially optimal with respect to a property if it is among the best codes with respect to that property given other constraints imposed on said ambiguous keyboard.*

*57. The system of claim 56, wherein said property is a lookup error rate.*

*58. The system of claim 56, wherein said property is a query error rate.*

*59. The system of claim 43, wherein said ambiguous keyboard is substantially optimal given a constraint of even as possible for letter assignments for a given row, given that said conventional typewriter keyboard is a Qwerty conventional typewriter keyboard.*

*60. The system of claim 56, wherein said constraint is a lookup error rate.*

*61. The system of claim 56, wherein said constraint is a query error rate.*

*62. The system of claim 56, wherein substantially optimality includes being within 5% of an absolute best of said lookup error rate, given specified constraints.*

*63. The system of claim 56, wherein said constraint is a lookup error rate.*

*64. The system of claim 56, wherein said constraint is a query error rate.*

*65. The system of claim 43, wherein said assignment exceeds a threshold of "level A" touch typability of 1.724 in lookup error rate, when measured in units of the lookup error rate of the standard ambiguous code for said natural language for a given corpus representative of said natural language.*

*66. The system of claim 43, wherein said assignment exceeds a threshold of "level A" touch typability of 2.27 in query error rate, when measured in units of query error rate of the standard ambiguous code for said natural language for a given corpus representative of said natural language.*

*67. The system of claim 65, wherein said conventional typewriter keyboard is a qwerty conventional typewriter keyboard.*

*68. The system of claim 65, wherein said ambiguous keyboard letter assignments are as even as possible on at least one row.*

*69. The system of claim 66, wherein said ambiguous keyboard has 5 columns of letter-assigned keys in a top of said three rows and 5 columns of letter-assigned keys in a middle of said three rows.*

*70. The system of claim 66, wherein said conventional typewriter keyboard is a Qwerty conventional typewriter keyboard.*

*71. The system of claim 70, wherein said assignment is an even as possible letter assignment for a selected row.*

*72. The system of claim 71, wherein said conventional typewriter keyboard is a qwerty conventional typewriter keyboard and said assignment is even as possible.*

*73. The system of claim 72, wherein said system is cross platform compatible, as it can transition between a telephone keyboard and a typewriter keyboard.*

*74. The system of claim 73, wherein the number of said letters is as near as possible to being twice the number of letter-assigned keys for said ambiguous keyboard, given qwerty letter-to-row assignments.*

*75. The system of claim 43, wherein said ambiguous code is a multi-level code wherein a first sequence of encoding symbols serves to select a first subset of decoding symbols, a second sequence of encoding symbols serves to select a second subset of decoding symbols.*

*76. The system of claim 43, wherein said ambiguous keyboard has a first set of letters qwertyuiop on a first row of said three rows, a second set of letters asdfghjkl on a second row of said three rows, and a third set of letters zxcvbnm on a third row of said three rows.*

*77. The system of claim 43, wherein said ambiguous keyboard includes said set of letters in any given order: abcdefghijklmnopqrstuvwxyz.*

*78. The system of claim 43, wherein a number letter-assigned said keys has a cardinality of a nearest whole number to half of a cardinality of said letters, given qwerty letter-to-row assignments, wherein said assignment is as even as possible letter assignment for a selected row.*

*79. The system of claim 78, wherein said letters are a-z of the English alphabet.*

*80. The system of claim 43, wherein said ambiguous keyboard is foldable.*

*81. The system of claim 43, wherein said ambiguous keyboard is included in a steering wheel.*

*82. The system of claim 43, wherein said ambiguous keyboard is incorporated into a computer mouse.*

*83. The system of claim 43, wherein said conventional order is selected from a group that includes at least one of:*

*a qwerty order; and*

*an azerty order.*

*84. The system of claim 43, where said conventional typewriter keyboard for said natural language is a qwerty conventional typewriter keyboard.*

85. The system of claim 43, wherein said conventional typewriter keyboard for said natural language is a close variant to a qwerty conventional typewriter keyboard.

86. The system of claim 43, wherein a "presentation order" is a direction in which that letters are read in it its natural language; and wherein said "reading order" is a directional pattern in which words are conventionally read in said natural language, along lines and from line to line.

87. The system of claim 86, wherein said: assignment permits a layout of indicia in which said indicia may be read in a reading order for said natural language in the same way as said indicia are read on said conventional typewriter keyboard for said natural language.

88. The system of claim 43, wherein said ambiguous keyboard has a strongly touch typable property in:

a) having fixed symbol assignments, b) based on an ambiguous code, and yet c) such that in a normal mode of operation, a touch typist can use the typable device to produce text at an acceptable level of accuracy, wherein a corpus of words used by which said strongly touch typable is measured is with at least 10 million words of a general purpose newspaper, wherein said look up rate error is equal to or greater than 50/29 times the lookup error rate of the standard ambiguous code for said natural language wherein said strongly touch-typable property is equal to or greater than level "A", in that a user, a) accepts a query error rate of one query every 5 words on average, and;

b) accepts a lookup error rate of one lookup error every 50 words on average.

89. The system of claim 43, wherein said ambiguous keyboard has a first set of letters qwertyuiop on a first row of said three rows, a second set of said letters asdfghjkl on a second row of said three rows, and a third set of said letters zxcvbnm on a third row of said three rows, wherein the number of said letter-assigned said keys is no less than half of the number of said letters.

90. The system of claim 89, in which said assignment is even as possible.

91. The system of claim 89, wherein the number of letter-assigned said keys is as close as possible to half the number of said letters.

92. The ambiguous keyboard of claim 91, wherein said ambiguous keyboard has a strongly touch typable property in:

1) having fixed symbol assignments, 2) being based on an ambiguous code, and yet 3) such that in a normal mode of operation, a touch typist can use the typable device to produce text at an acceptable level of accuracy.

93. The system of claim 91, wherein said strongly touch typable property is measured relative to a corpus containing at least 10 million words drawn at random from a general-interest newspaper in said natural language.

94. The system of claim 91, wherein said lookup rate error is equal to or greater than 50/29 times a lookup error rate for a standard telephone keypad for said natural language where both said lookup error rate and said lookup for a standard telephone keypad are measured on a same given corpus of text representative of said natural language.

95. The system of claim 91, wherein said strongly touch-typable property is equal to or greater than level "A", in that it has an acceptable level of accuracy for a user who, 1) accepts a query error rate of one query every 5 words on average, and;

2) accepts a lookup error rate of one error every 50 words on average.

96. The system of claim 91, wherein said strongly touch-typable property is equal to or greater than level "B" in that it has an acceptable level of accuracy for a user who, 1) accepts a query error rate of one query every 10 words on average, and 2) accepts a lookup error rate of one error every 100 words on average.

97. The system of claim 91, wherein said strongly touch-typable property is equal to or greater than level "C" for a user who, 1) accepts a query every 20 words on average, and 2) accepts a lookup error every 200 words on average.

98. The ambiguous keyboard of claim 91, which has an effective key number greater than the effective key number corresponding to the point (50,5) in the (lookup error rate, query error rate) where lookup error rate and query error rate are normalized such that the standard ambiguous code for said natural language corresponds to the point (29, 2.2) in said (lookup error rate, query error rate) plane, and said lookup error rate and said query error rate are measured relative to a text corpus representative of said natural language.

99. The system of claim 91, wherein a count of letter-assigned said keys on each of said rows decreases monotonically from top to bottom said rows.

100. The system of claim 99, wherein said assignment of letters to said keys is an even as possible assignment on at least one of said rows, given the number of letter-assigned keys in said at least one row and the number of said letters assigned to said letter-assigned keys in said at least one row.

101. The system of claim 91, wherein said assignment is not substantially optimal, because in a count of four random trials it is more likely than not to find an other assignment with better values of lookup error rate where said lookup error rate is measured relative to a same corpus representative of said natural language for both said assignment and said other assignment.

102. The system of claim 101, wherein said assignment of said letters to said keys is not an even as possible assignment, given the total number of letter-assigned said keys of said ambiguous keyboard.

103. The system of claim 43, wherein no said key has more than two said letters assigned to it.

104. The system of claim 103, further comprising a first mode and a second mode, wherein said letters are said decoding symbols in said first mode, and digits are said decoding symbols in said second mode.

105. The system of claim 104, where said digits correspond to indicia arranged such that said second mode can function as a conventional telephone.

106. The system of claim 43, where said ambiguous keyboard is substantially optimal given a constraint of even as possible for letter assignments for letter-assigned keys and given a constraint that said conventional typewriter keyboard is a qwerty conventional typewriter keyboard.

107. An ambiguous keyboard disambiguating system for a natural language comprising:

a) encoding and decoding symbols;

b) an ambiguous keyboard having at least three rows of keys and four to ten columns of keys, both of said three

*rows and four to ten columns having indicia that denote one or more letters assigned to one or more keys, wherein said one or more letters are used to write common words in said natural language, wherein:*

*each of said one or more keys corresponds to one of said encoding symbols; and*

*each of said one or more letters corresponds to one of said decoding symbols, the total number of said keys having at least one letter assigned to them being less than the number of said one or more letters in an alphabet used to form words in said natural language such that at least one key of said keys must have more than one letter of said alphabet assigned to it;*

*wherein said ambiguous keyboard could be relabeled with said letter indicia presented in continuous alphabetic order along each row without repetition and without violating said assignment of said letters to said keys;*

*wherein said indicia may be presented in continuous alphabetic order along each row without violating said assignment of said letters to said keys;*

*d) an output which selectively outputs sequences of said decoding symbols in response to user activation of said ambiguous keyboard;*

*e) an ambiguous code which maps a sequence of said encoding symbols to one or more sequences of decoded symbols;*

*f) at least one of said sequences of the encoding symbols is mapped to a plurality of said sequences of said decoding symbols.*

*108. The system of claim 107, wherein said keyboard has a strongly touch typable property in:*

*1) having fixed symbol assignments,*

*2) being based on an ambiguous code, and yet*

*3) such that in a normal mode of operation, a touch typist can use the typable device to produce text at an acceptable level of accuracy.*

*109. The system of claim 108, wherein said strongly touch typable property is measured relative to a corpus containing at least 10 million words drawn at random from a general-interest newspaper in said natural language.*

*110. The system of claim 107, wherein a count of letter-assigned said keys on each of said rows decreases monotonically from top to bottom said rows.*

*111. The system of claim 107, wherein said assignment of said letters to said keys is not an even as possible assignment, given the total number of letter-assigned said keys of said ambiguous keyboard.*

*112. The system of claim 107, wherein said assignment of said letters to said keys is a not even as possible assignment on at least one of said rows, given the number of letter-assigned said keys in said at least one row and the total number of said letters assigned to said letter-assigned keys in said at least one row.*

*113. The system of claim 107, wherein said ambiguous code is a multi-level code wherein a first sequence of encoding symbols serves to select a first subset of decoding symbols, a second sequence of encoding symbols serves to select a second subset of decoding symbols.*

*114. The system of claim 107, wherein said ambiguous keyboard is foldable.*

*115. The system of claim 107, wherein said ambiguous keyboard is included in a steering wheel.*

*116. The system of claim 107, wherein said ambiguous keyboard is incorporated into a computer mouse.*

*117. The system of claim 107, wherein a "presentation order" is a direction in which that letters are read in it its natural language; and wherein said "reading order" is a directional pattern in which words are conventionally read in said natural language, along lines and from line to line.*

*118. The system of 107, wherein no said key has more than two said letters assigned to it.*

*119. The system of claim 107, further comprising a first mode and a second mode, wherein said letters are decoding systems in said first mode, and digits are decoding symbols in said second mode.*

*120. The system of claim 119, where said digits correspond to indicia arranged such that said second mode can function as a conventional telephone.*

* * * * *